United States Patent

Oki et al.

[11] Patent Number: 6,115,471
[45] Date of Patent: Sep. 5, 2000

[54] MEMBER-EXCLUSIVE SERVICE SYSTEM AND METHOD THROUGH INTERNET

[75] Inventors: Hiroshi Oki; Shinji Kamata; Naohito Nakamura; Toshiya Yamazaki; Toshiro Okada, all of Kanagawa, Japan

[73] Assignee: Fujitsu Limited, Kawasaki, Japan

[21] Appl. No.: 08/872,195

[22] Filed: Jun. 10, 1997

[30] Foreign Application Priority Data

Nov. 28, 1996 [JP] Japan ..................................... 8-318113

[51] Int. Cl.[7] .......................................................... H04L 9/32
[52] U.S. Cl. ............................................ 380/242; 713/176
[58] Field of Search .................................... 380/3, 4, 202, 380/242, 201; 375/49

[56] References Cited

U.S. PATENT DOCUMENTS 4,999,806  3/1991  Chernow ................................. 364/900
5,864,620  1/1999  Pettitt ......................................... 380/4

Primary Examiner—Tod R. Swann
Assistant Examiner—Todd Jack
Attorney, Agent, or Firm—Staas & Halsey, LLP

[57] ABSTRACT

A client receives a remote installation service (RIS) activated by a browser through the Internet, and notifies an RIS server of a software number corresponding to an icon pointed to and clicked by a pointing device on a home page. The RIS server provides various services such as software distribution, online shopping, communications service, transaction service, etc. according to the information.

25 Claims, 62 Drawing Sheets

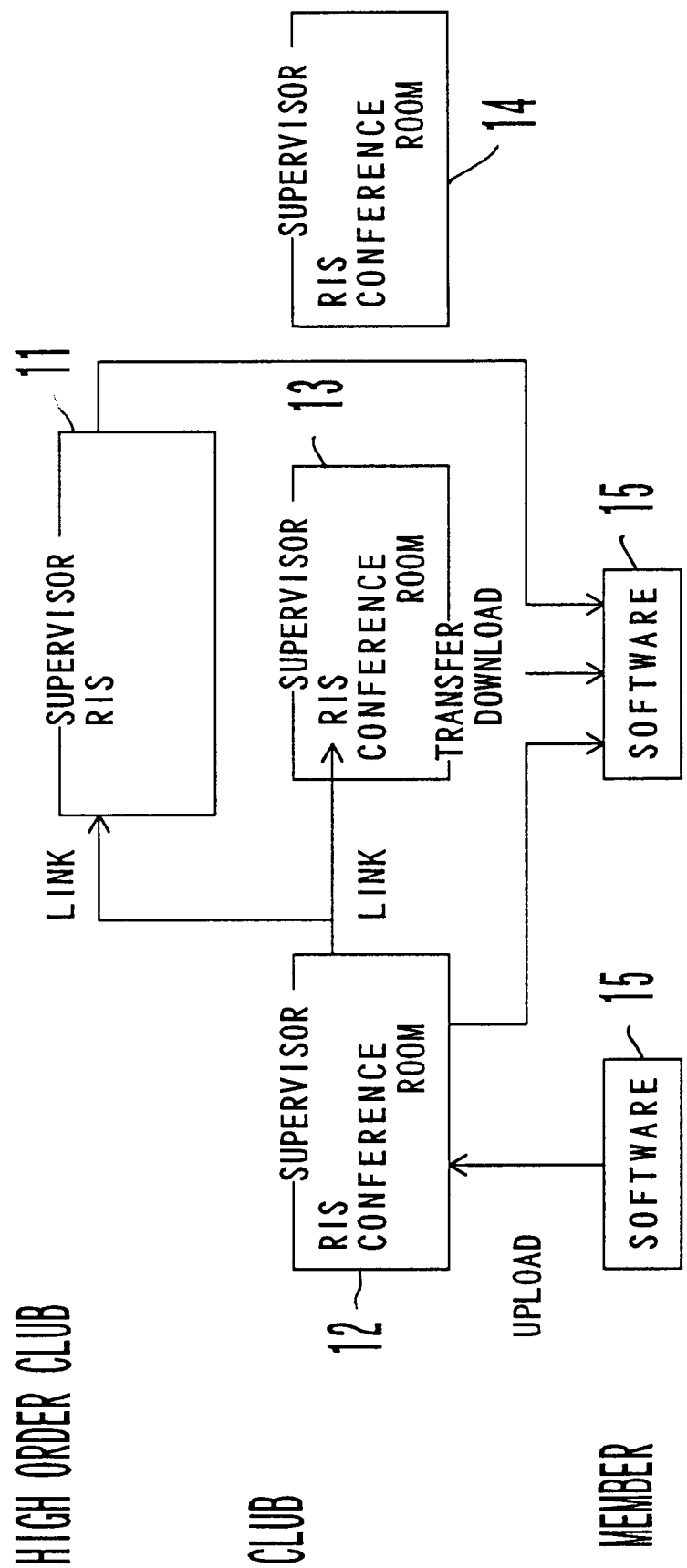

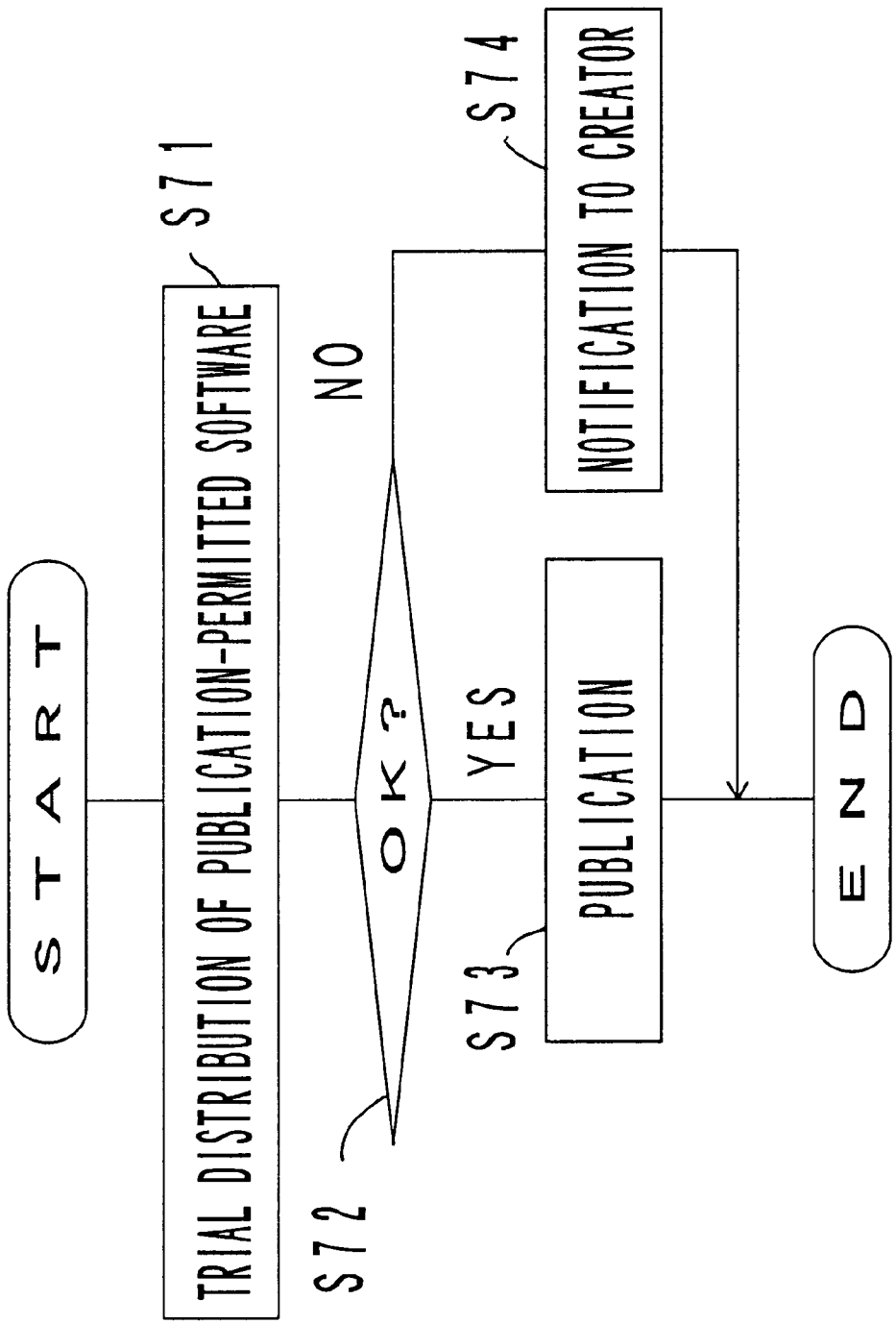
F I G. 3 C

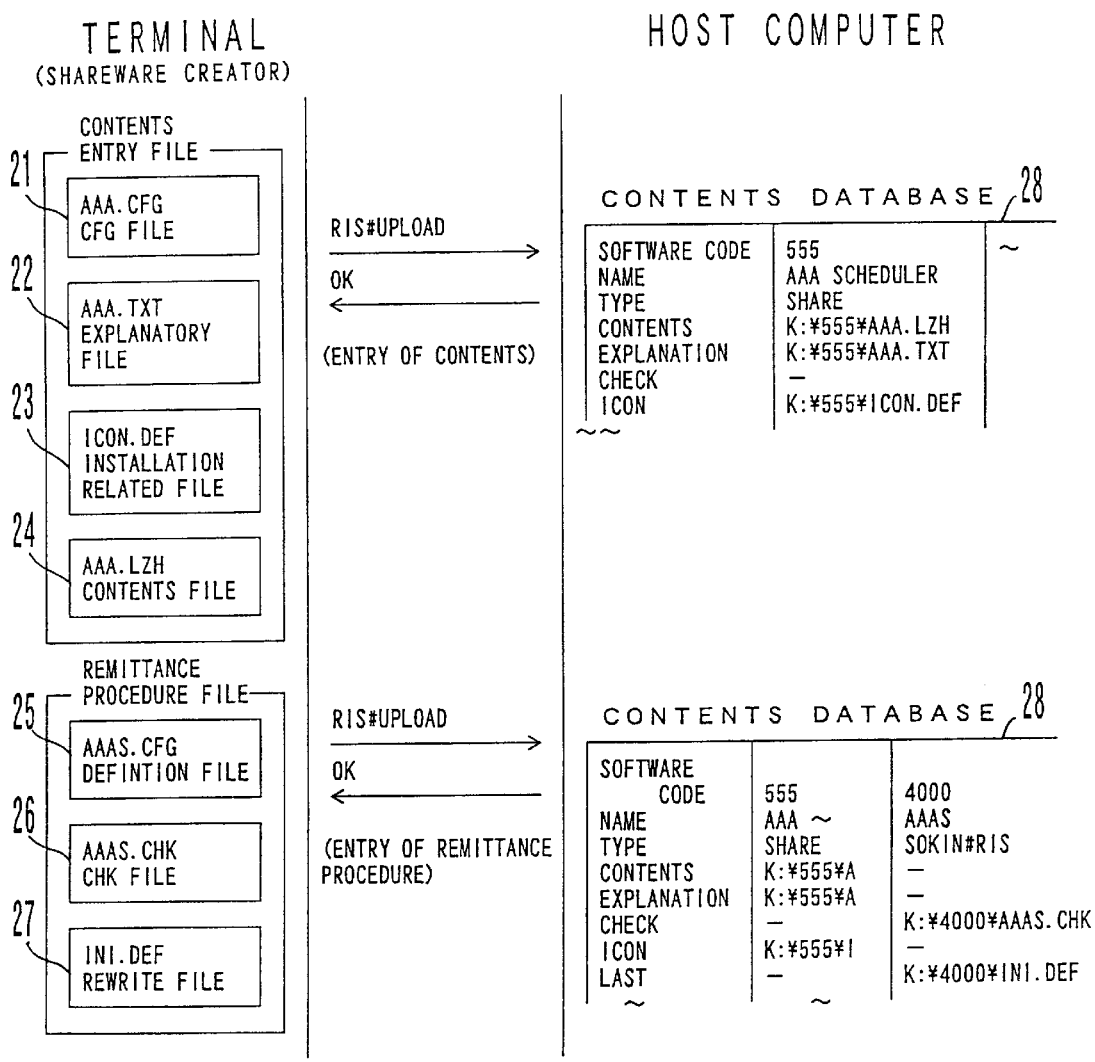
F I G. 4A

TERMINAL                                    HOST COMPUTER

DIALOG BOX

```
SPECIFY DI-          RIS*CHKENV*RESP                    ASKING USER WHETHER
RECTORY OF AAA       RID=6                              OR NOT POSITION OF
  OK   NG            SOFT=4000                          AAA.INI IS E:\AAA
                     ASKCHK:
   ┌─────────┐        TAG="#1#2"
   │ E:¥AAA  │        QUERY="SPECIFY DIRECTORY
   └─────────┘                OF AAA"                        S100
                      TYPE=0x02 *OBTAINING CHARACTER
         30                     STRING FROM TERMINAL
                     ANS:
                       NTYPE=2   *PATH
                       NAME="E:¥AAA¥AAA.INI"
                       ;
                     SOKIN=0x01
```

```
REWRITTEN FILE IS    RIS*CHKENV                         ──→ CONFIRMING THAT
E:¥AAA¥AAA.INI       RID=7                              FILE TO BE REWRITTEN
                     SOFT=4000                          IS E:¥AAA¥AAA.INI
                     RESULT:                            OF USER FILE
IF NOT, RETURN,       TAG="#1#2"                             S101
FOR EXAMPLE,          VAL="E:¥AAA¥AAA.INI"
G:¥GGG¥AAA.INI        ;
```

```
LIMITED FUNCTIONS    RIS*CHKENV*RESP                    NOTIFYING USER THAT
CAN BE RELEASED      RID=7                              SHAREWARE REMITTANCE
BY REWRITING         SOFT=4000                          CAN BE MADE
E:¥AAA¥AAA.INI       JUDGE=0x01  *OK
                     SOKIN=0x01  *RELEASING RESTRIC-
                                  TIONS IMMEDIATELY         S102
                     STRPLACE:
                       WORKDIR="D:¥RISWORK"
                       SOUKODIR"D:¥SOUKO"
                       WORKSIZE=100
                       SOUKOSIZ=100
                       ;
```

FIG. 4D

| TERMINAL | | HOST COMPUTER |
|---|---|---|
| REQUESTING RELEASE OF RESTRICTIONS ON FUNCTIONS | RIS#INSTALL<br>RID=8<br>CNT=1<br>SOKIN=0x01　＊ RELEASING<br>PACK:　　　　RESTRICTIONS<br>　SOFT=4000　　IMMEDIATELY<br>　TYPE=0x01<br>　STRPLACE:<br>　　WORKDIR="D:¥RISWORK"<br>　　SOUKODIR"E:¥AAA"<br>　　WORKSIZE=100<br>　　SOUKOSIZ=100<br>　；<br>；　　　　　　　　S103 →| WITHDRAWING CHARGE |
| DOWNLOAD OF<br>　　　INI.DEF | DLOAD D:¥RISWORK¥INI.DEF ← | TRANSMITTING INI.DEF IN WHICH REWRITING PROCEDURE OF AAA.INI IS DESCRIBED |
| LIMITED FUNCTIONS ARE RELEASED BY REWRITING E:¥AAA¥AAA.INI | CHGINI D:¥RISWORK¥INI.DEF ← | INSTRUCTING TO REWRITE FILE ACCORDING TO PROCEDURE OF INI.DEF |
| DELETING INI.DEF | DEL D:¥RISWORK¥INI.DEF ← | |

F I G.　4 E

TERMINAL　　　　　　　　　　　　　　　　HOST COMPUTER

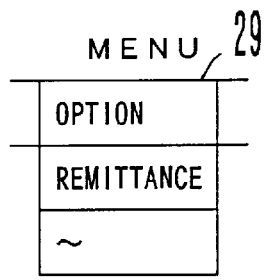

SETTING SHAREWARE
REMITTANCE FLAG
AND STARTING
RETRIEVAL

```
RIS#LIST
RID=4
SPR=0                    S115
CNT=20
MODEL=0x0002
OS=0x02
KTYPE=0x02
SOKIN=0x01   *SETTING
KEY=7         SOKIN FLAG
```

LISTING ONLY
REMITTANCE
SOFTWARE

```
RIS#LIST*RESP
RID=4
TOTCNT=1                 S116
CNT=1
SOFTLIST;
  SOFT=4000
  NAME="AAA SCHEDULER"
~
SOFTLIST;
  SOFT=4001
  NAME="BBB SCHEDULER"
~
;
```

RETURNING ONLY
SOFTWARE OF
TYPE=SOKIN
USING SPECIFIED
KEYWORD

DESIGNATING
SOFTWARE NUMBER
4001

```
RIS#CHKENV
RID=5                    S117
SOFT=4001
SOKIN=0x01  ;
```

F I G.  4 G

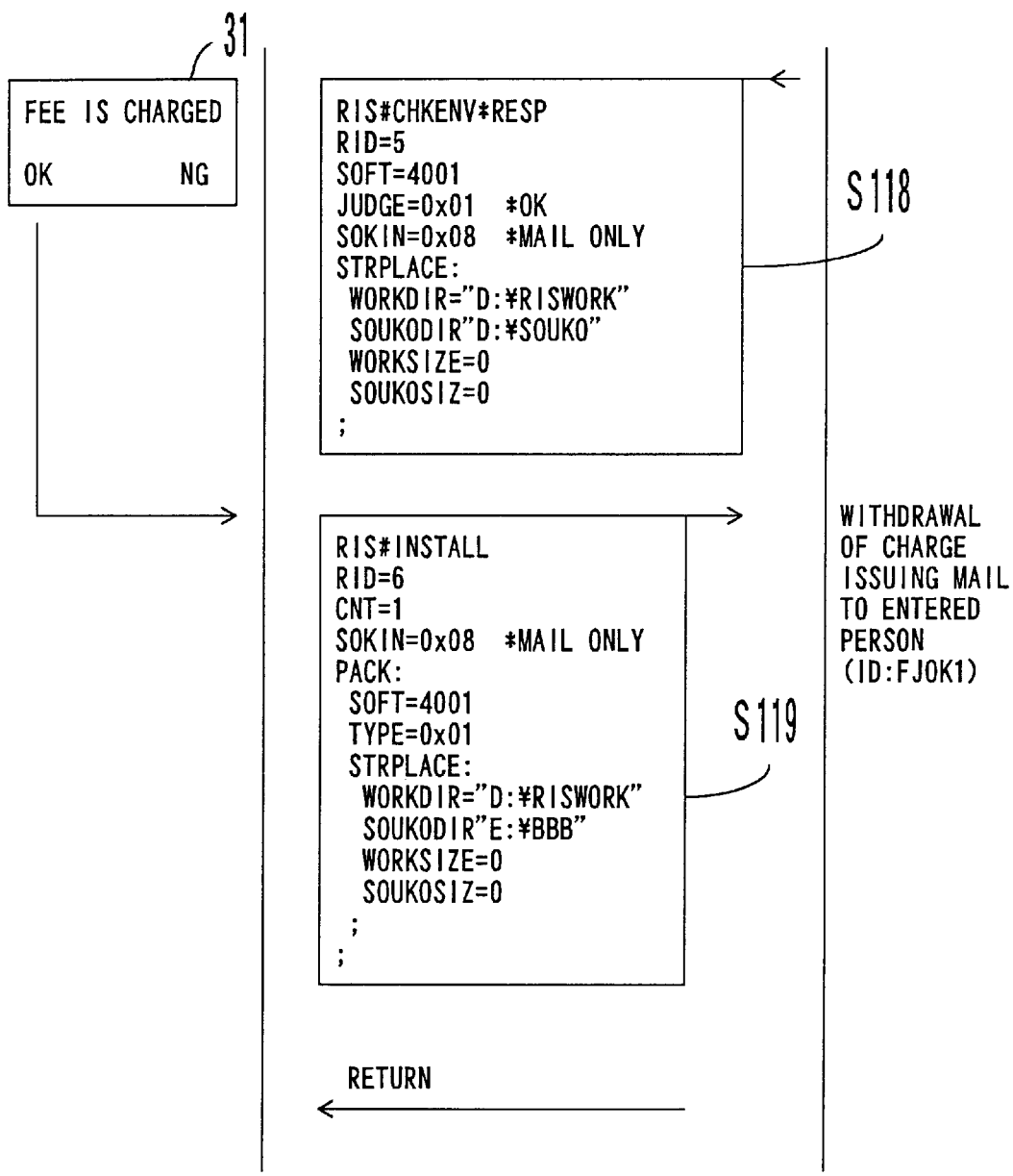
F I G. 4H

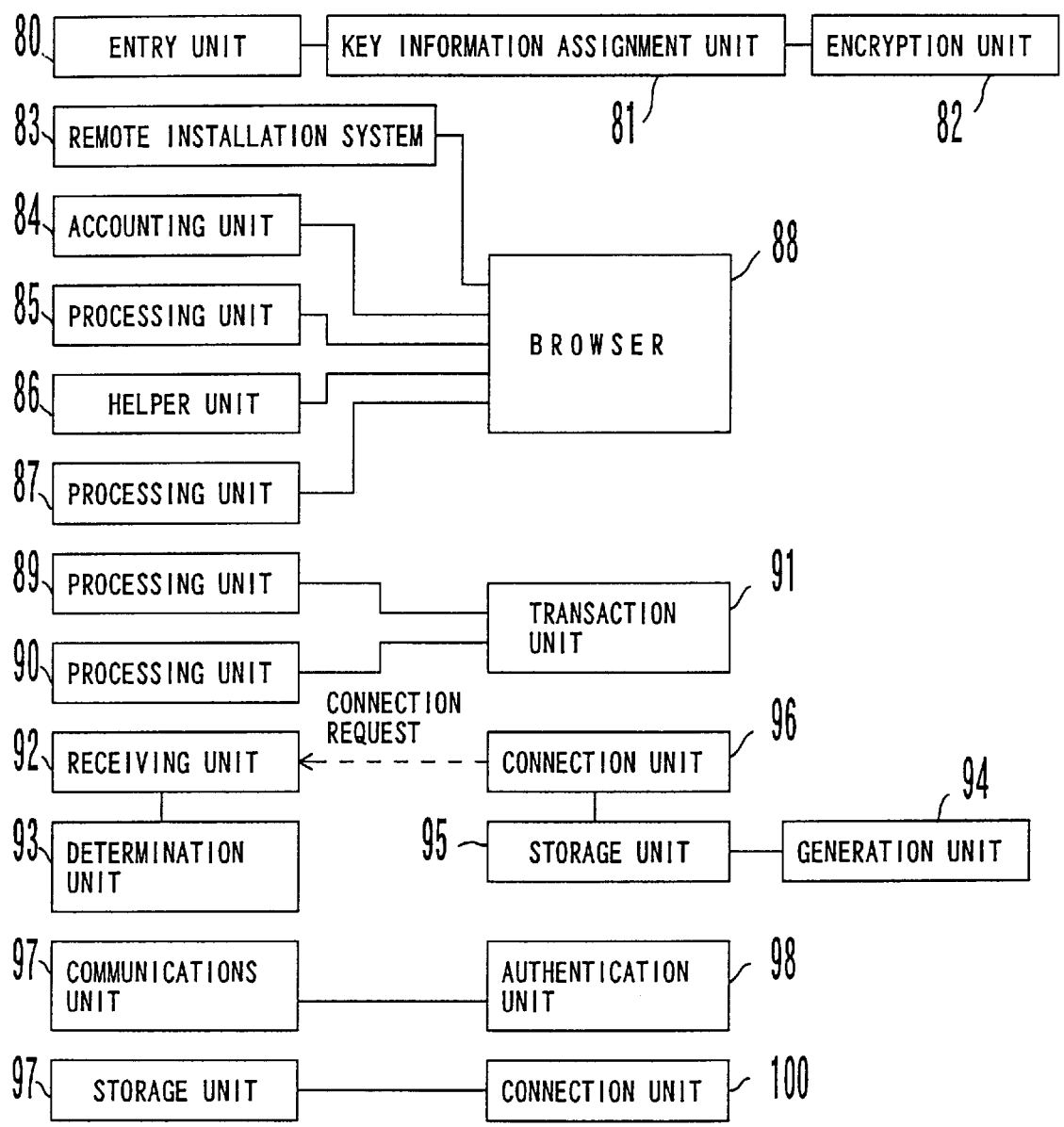
F I G. 5 A

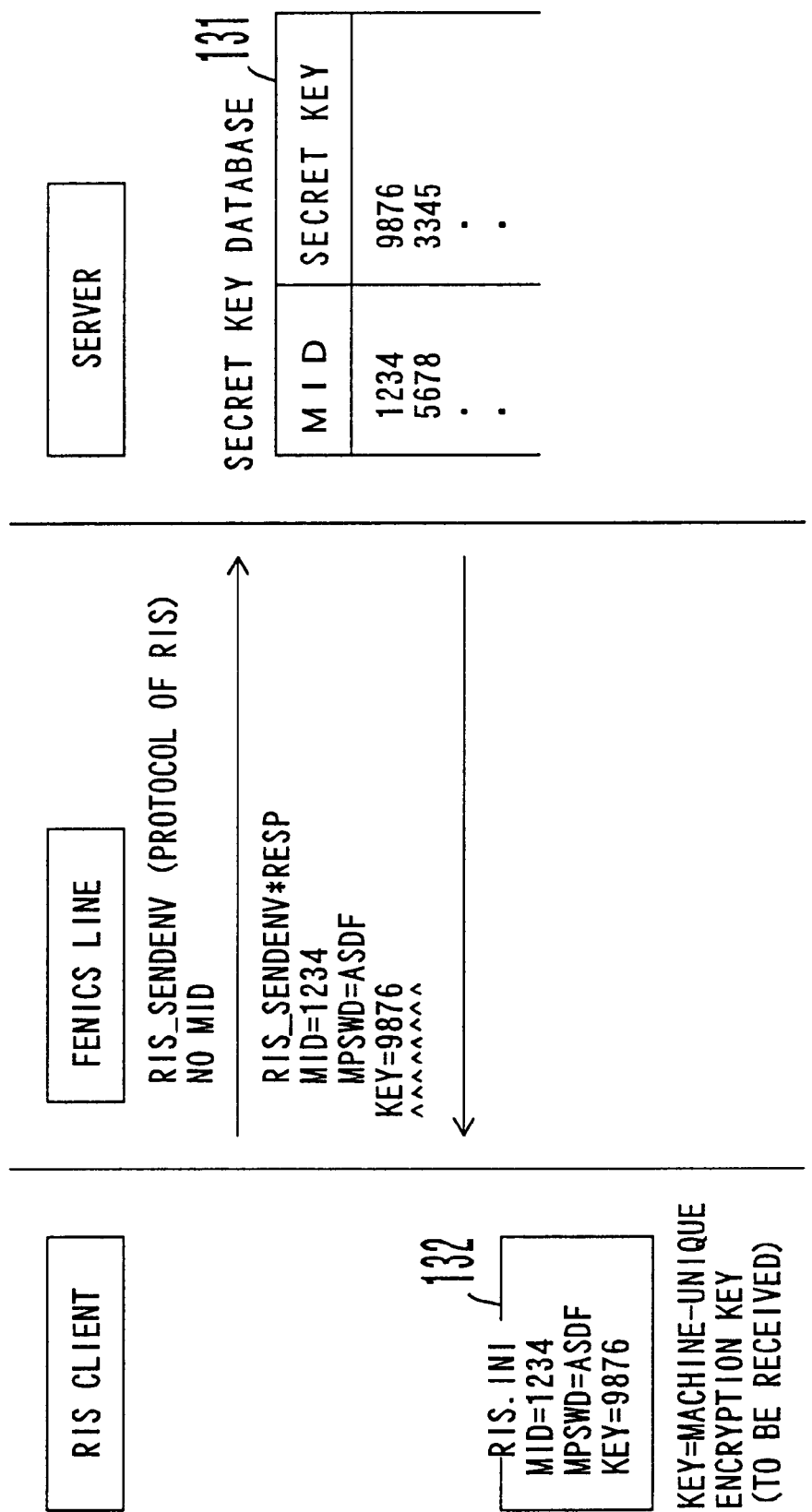
F I G. 6A

132

```
RIS.INI
~
[INET]
HOST=ris.gmsnet.or.jp      *ADDRESS (DOMAIN NAME)
PORT=5021
```

FIG. 6B

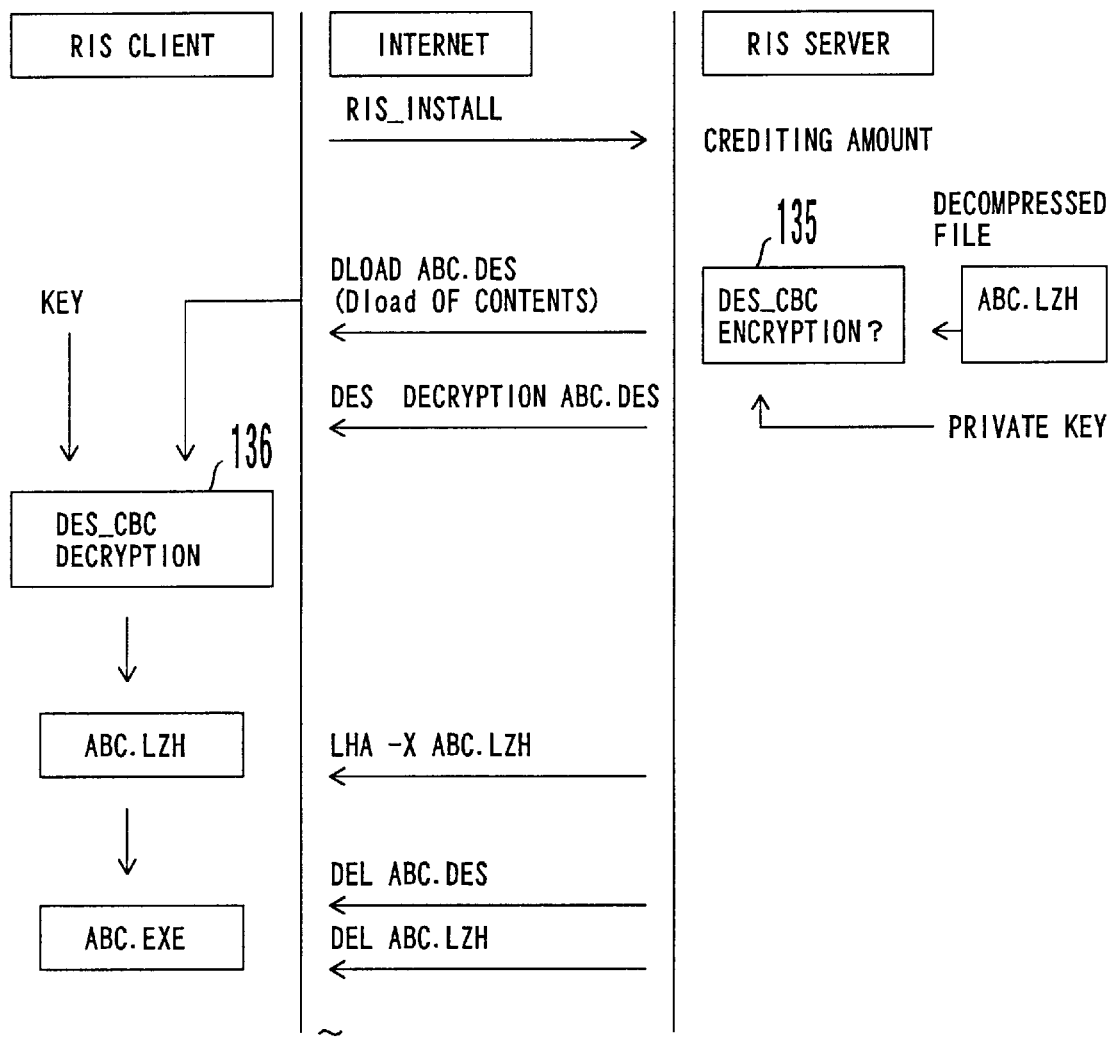
F I G. 7

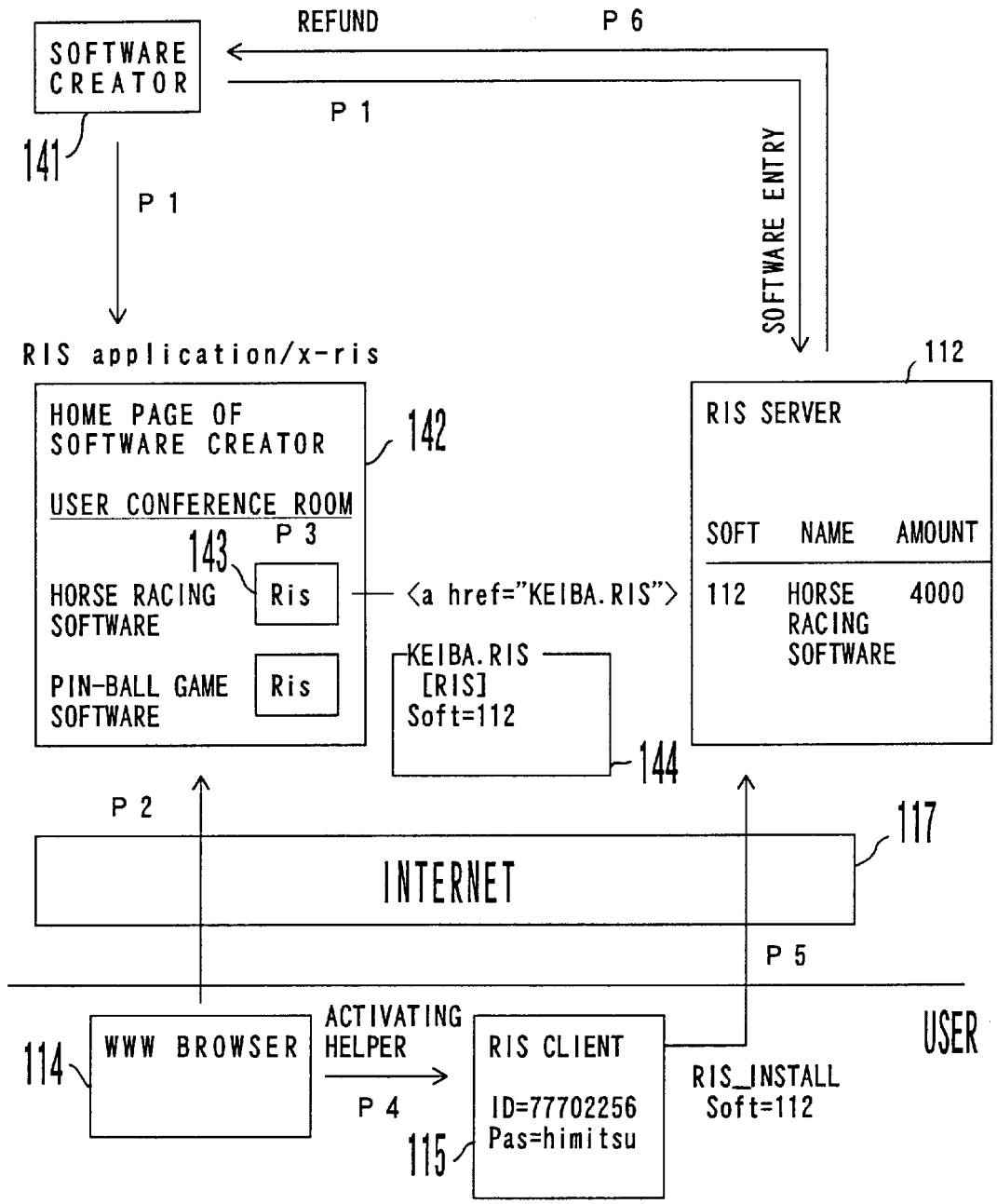
F I G. 8

FIG. 9

```
<html>
<head>
<title>    SOFTWARE CREATOR HomePage</title>
</head>
<body>
~
<b>
HORSE RACING SOFTWARE..FANTASTIC HORSE RACING</b>
<a href="KEIBA.RIS">
<Image src="RISICON.JIF"></a>
<b>
PIN-BALL GAME SOFTWARE...FANTASTIC PIN-BALL GAME</b>
<a href="PACHI.RIS">
<Image src="RISICON.JIF"></a>
~
</body>
</html>
```

144

```
┌─KEIBA.RIS ─────────────────────────────┐
│ [RIS]                                   │
│ Soft=112,"HORSE RACING SOFTWARE"        │
│                                         │
└─────────────────────────────────────────┘
```

FIG. 10

| UID | Soft | ITEM | QUANTITY | UNIT PRICE | DATE | Card_typ | Card_No |
|---|---|---|---|---|---|---|---|
| 77702256 | 112 | HORSE RACING SOFTWARE | 1 | 4000 | 96.10.25 | JCB | |

F I G. 1 2

F I G. 1 3

| USER UID | VENDOR UID | ITEM | UNIT PRICE | QUANTITY | DATE |
|---|---|---|---|---|---|
| 77702256 | 1234567 | HORSE RACING SOFTWARE | 4000 | 1 | 96.10.25 |

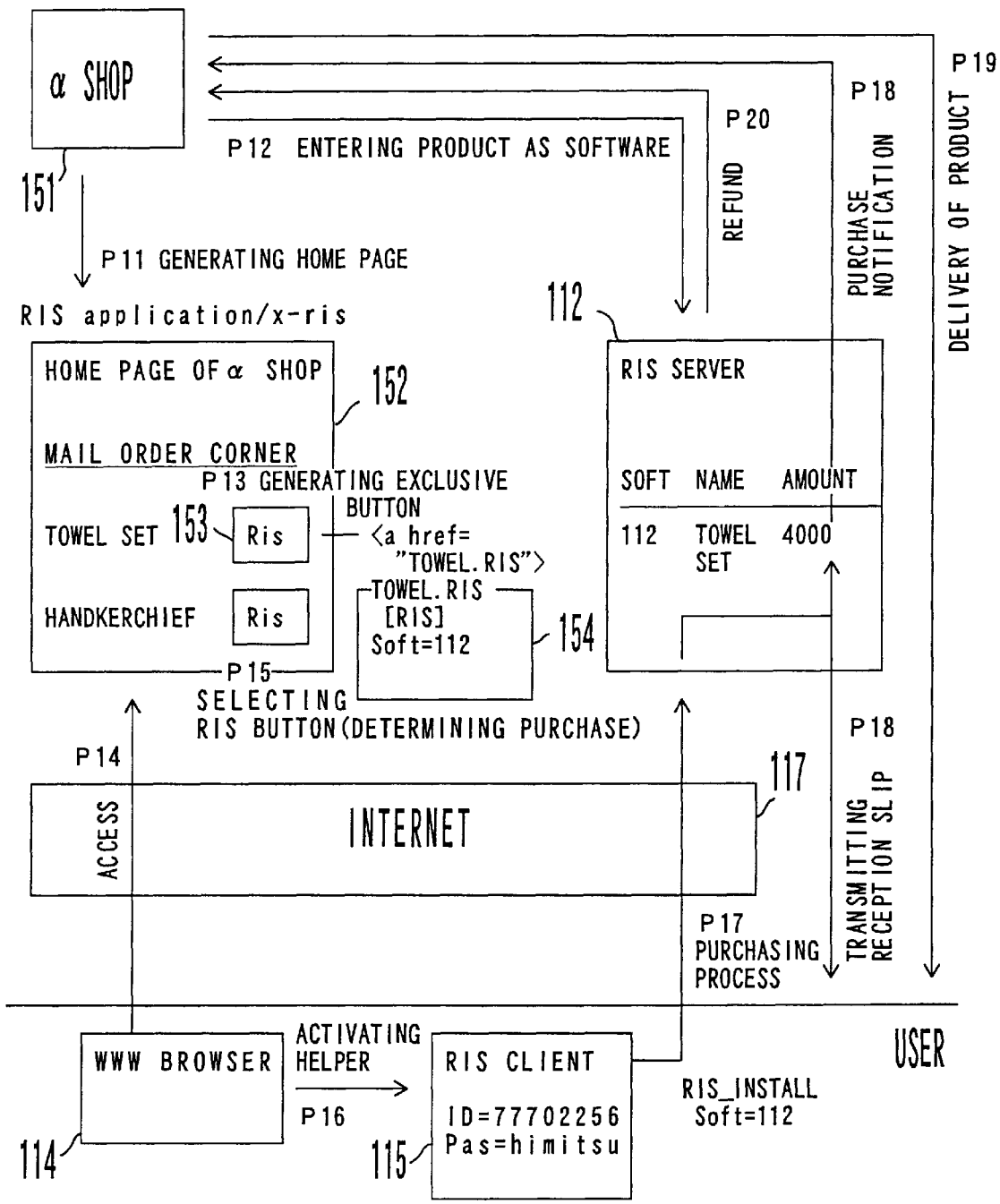
F I G. 1 4

```
<html>
<head>
<title>    FORTUNE TELLER HomePage</title>
</head>
<body>
~
<b>
FORTUNE TELLER TICKET</b>
<a href="FTELL.RIS">
<Image src="ticket.JIF"></a>
<b>
TO FORTUNE TELLER'S ROOM </b>
<form method=GET action="http://www.ura.co.jp/ura.cgi">
PASSWORD⟶<br>         <input name=password><br>
</form>  <Image src="inftell.JIF"></a>
~
</body>
</html>
```

```
┌─ FTELL.RIS ─────────────────────────┐
│ [RIS]                               │
│ Soft=112, "FORTUNE TELLING FOR      │
│           EACH MONTH"               │
│                                     │
└─────────────────────────────────────┘
```

FIG. 18

YOUR PASSWORD IS
9610 zx

FIG. 19

```
┌─WORK URL────────────────────────────┐
│ [URL]                               │
│ URL=<http://www.ura.co.jp/ura.html> │    * IN CASE OF MOSAIC
│                                     │
│ [InternetShortcut]                  │    * IN CASE OF
│ URL=http:////www.ura.co.jp/ura.html │      NETSCAPE / IE
└─────────────────────────────────────┘
```

FIG. 22

RIS SERVER

| SOFT | NAME | AMOUNT |
|---|---|---|
| 170 | HORSE RACING DATA | 1000 |

FIG. 30

```
┌KEIBA.DAT ─────────────────────┐
│[DATA]                         │
│A                              │
│B                              │
│C                              │
└───────────────────────────────┘
```

FIG. 32

```
96. 4. 1      FILE1.LZH
96. 6. 1      FILE2.LZH
96. 8. 1      FILE3.LZH
```

FIG. 33

|          | D | E | F | G |
|----------|---|---|---|---|
| FILE1.LZH | ○ | ○ | ○ | ○ |
| FILE2.LZH |   | ○ | ○ | ○ |
| FILE3.LZH |   |   | ○ | ○ |

FIG. 34

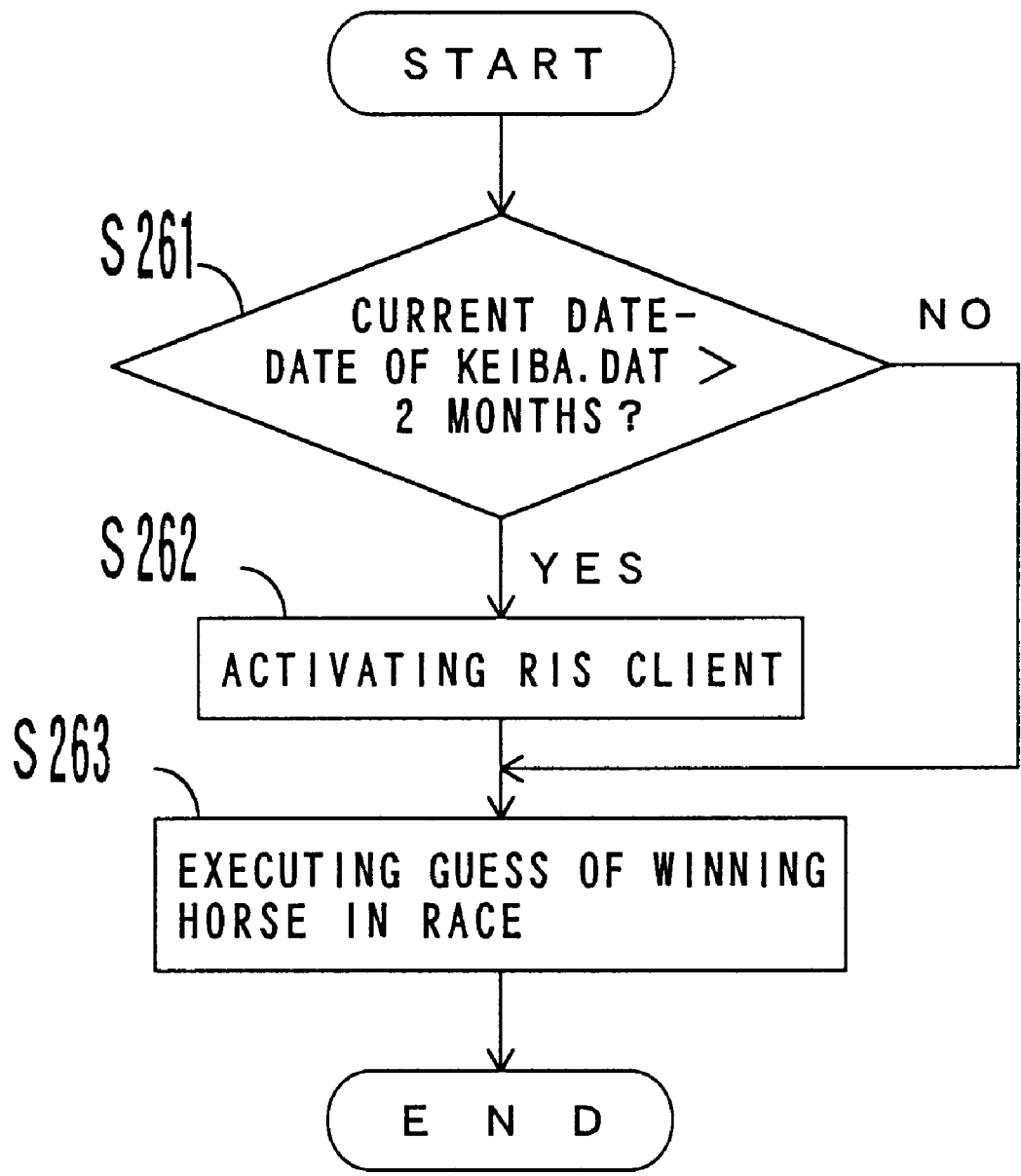
F I G. 3 5

```
 ┌─ R I S. I N I ─────────────────────────────────────────────┐
 │ [SERVER]
 │ 0001
 │ [INFO] ;**********************************************************
 │ ; SOUKODIR : WAREHOUSE DIRECTORY
 │ ; WORKDIR  : WORK DIRECTORY
 │ ; HOSTTEL  : HOST COMPUTER TLELPHONE NUMBER
 │ ; LSCRIPT  : AUTOMATIC LOG-IN SCRIPT (SAME LANGUAGE AS STANDARD TERMINAL)
 │ ; COMPORT  : Com PORT ID
 │ ;
 │ LSCRIPT=-^M [*] C RIS^M [COM] ! [Enter User-ID --->] $ID/P38/V101^M [Enter
 │ Password ->] $PW^M [Accepted/P38/V101]¯
 │ COMPORT=3
 │ RISDIR=C:¥RISW418¥RISWIN32
 │ SOUKODIR=C:¥RISW418¥SOUKO
 │ WORKDIR=C:¥RISW418¥RISWORK
 │ HOSTTEL=044-798-6500
 │ INITFLAG=1
 │ [IDENT] ;**********************************************************
 │ ; UID    : USER ID
 │ ; PASSED : PASSWORD
 │ ;
 │ TELAREA=044
→│ UID=77702256
→│ PASSWD=BAGFDE0FMF0E0EAFNB
 │ KEY=S7FA40972F26A8A6B
 │ [MACHINE] ;**********************************************************
 │ ; MODEL           : MODEL CODE
 │ ; OS              : OS CODE
 │ ; MID             : MACHINE ID
 │ ; MTRANID         : MACHINE TRANSIENT ID
 │ ;
 │ OS=2
 │ MODEL=3
→│ MID=537
 │ MTRANID=001087127712
 │ ;MID=41
 │ ;MTRANID=000091397010
 │
 │ [INET]
 │ InetPermission=Yes
 │ HOST=ris.gmsnet.or.jp
 │ PORT=5021
 │ UsingINET=Yes
 │
 │ [EXTENSION]
 │ RIS.INI=ON
 │ RIS2.INI=ON
 │ RIS3.INI=OFF
 └─────────────────────────────────────────────────────────────┘
```

F I G. 3 7

```
┌─ RIS2.INI ─────────────────────────────────────────────────────────┐
│ [SERVER]                                                            │
│ 0002                                                                │
│ [INFO] ;*********************************************************** │
│ ; SOUKODIR : WAREHOUSE DIRECTORY                                    │
│ ; WORKDIR  : WORK DIRECTORY                                         │
│ ; HOSTTEL  : HOST COMPUTER TELEPHONE NUMBER                         │
│ ; LSCRIPT  : AUTOMATIC LOG-IN SCRIPT (SAME LANGUAGE AS STANDARD TERMINAL) │
│ ; COMPORT  : Com PORT ID                                            │
│ ;                                                                   │
│ LSCRIPT=-^M [*] C RIS^M [COM] ! [Enter User-ID --->] $ID/P38/V101^M [Enter │
│ Password ->] $PW^M [Accepted/P38/V101]¯                             │
│ COMPORT=3                                                           │
│ RISDIR=C:¥RISW418¥RISWIN32                                          │
│ SOUKODIR=C:¥RISW418¥SOUKO                                           │
│ WORKDIR=C:¥RISW418¥RISWORK                                          │
│ HOSTTEL=044-798-6501                                                │
│ INITFLAG=1                                                          │
│                                                                     │
│ [IDENT] ;********************************************************** │
│ ; UID    : USER ID                                                  │
│ ; PASSED : PASSWORD                                                 │
│ ;                                                                   │
│ TELAREA=044                                                         │
→│ UID=11102256                                                       │
→│ PASSWD=BACFDE0FMH0E0EAFNB                                          │
│ KEY=S4FA40972F46A8A6B                                               │
│                                                                     │
│ [MACHINE] ;******************************************************** │
│ ; MODEL         : MODEL CODE                                        │
│ ; OS            : OS CODE                                           │
│ ; MID           : MACHINE ID                                        │
│ ; MTRANID       : MACHINE TRANSIENT ID                              │
│ ;                                                                   │
│ OS=2                                                                │
│ MODEL=3                                                             │
→│ MID=637                                                            │
│ MTRANID=002067127712                                                │
│ [INET]                                                              │
│ InetPermission=Yes                                                  │
│ HOST=ris2.gmsnet.or.jp                                              │
│ PORT=5021                                                           │
│ UsingINET=Yes                                                       │
└─────────────────────────────────────────────────────────────────────┘
```

FIG. 38

```
RIS2.RIS
[RIS]
Start=menu

[SERVER]
0002

[OKEY]
1234
```

FIG. 42

MEMBER-EXCLUSIVE SERVICE SYSTEM AND METHOD THROUGH INTERNET

BACKGROUND OF THE INVENTION

1. Field of the Invention

The present invention relates to a member-exclusive service system and method through a communications network such as the Internet, etc.

2. Description of the Related Art

With an increasing use of personal computers, users can receive various services through communications lines. "REMOTE INSTALLATION AND METHOD of U.S. patent application Ser. No. 08/585,017, and Japanese Patent Laid-open H8-190472" is an example of the conventional technology of automatically distributing software through communications lines.

The conventional remote installation service system (RIS system) is composed of a host computer installed in a software distribution center, a user terminal, and a communications line connecting the host computer and the user terminal. The host computer stores a group of software including a plurality of pieces of software to be distributed, a first key table, and a second key table for storing a keyword list used in selecting a particular piece of software from the group of software.

If a user requests the host computer for the keyword list from the terminal, the host computer sequentially transmits the first and second key tables, and instructs the display unit of the terminal to display the keywords included in the keyword tables on the screen. The user selects any of the displayed keywords corresponding to a desired piece of software, and notifies the host computer of the selected keyword.

The host computer instructs the display unit to display a menu including several names of software corresponding to the notified keyword. The user selects a desired piece of software from the menu, and notifies the host computer of the selected piece of software. Then, the host computer retrieves contents of the piece of software selected by the user from the group of software, transmits it through the communications line, and stores it in a distribution directory installed onto a hard disk of the terminal.

At this time, an icon for invoking the software distributed to a user is automatically registered, and displayed on a directory window arranged corresponding to the directory on the screen of the display unit. If WINDOWS is installed on the terminal, the distributed software is registered in the program manager of WINDOWS. Then, the user can use the distributed software by simply selecting an icon with an input device such as a mouse, etc.

Provided next is the explanation about a flow of operations of distributing software to a user performed by the conventional remote installation system, by referring to FIGS. 1A through 1C.

In FIG. 1A, a terminal of user A obtains information about an operating environment when terminal software for a communication is installed, and creates an environment file 1 where the obtained information is stored (step S1). At this time, the terminal of the user A obtains information which requires a long time to obtain, such as a machine type of the terminal of user A, a storage location (directory) SOUKO, etc. used for a distribution, etc., or information which requires an inquiry to the user as necessary.

To set "SOUKO" indicating a storage location, the terminal examines whether or not a hard disk includes an empty area equal to or larger than a predetermined capacity. If the empty area exists, a directory for a door-to-door distribution is created at the root. At this time, the terminal automatically generates a directory name, etc., and the user A performs a verifying operation only. Accordingly, user A is not required to enter the directory name, etc.

In this case, for example, it is written to the environment file 1 that the machine type of user A is "TOWNS" and the directory of SOUKO is "D:¥SOUKO" (the directory ¥SOUKO in a drive D). User A may change "D:¥SOUKO" to another directory if necessary.

If there is no empty area of a predetermined size in a partition of the drive specified in advance, the largest empty area is searched for in other partitioned areas, in order to create the directory for a door-to-door distribution. By way of example, if the directory D:¥SOUKO becomes full, the terminal 23 displays a message such as "D:¥SOUKO is full. SOUKO is changed to F:¥SOUKO. Is this OK?" on the screen of a display unit 24.

When the user A answers YES, F:¥SOUKO becomes a new directory SOUKO for the door-to-door distribution. If no hard disk includes an empty area of the predetermined size, a message such as "Disk capacity is insufficient. Add extra disk capacity" is displayed.

When the terminal software is invoked (when access is made to the host computer), information which may have varied after the installation, such as the state of the hard disk or memory, etc. is obtained (step S2). In this case, the hard disk of user A is designated as drive D, and it is written to the environment file 1 that its available capacity is 300M bytes. The contents of the environment file 1 created according to the above described procedure are transmitted to the host computer by a command RIS_SENDENV when user A accesses (connects to) the host computer (step S3).

The host computer stores the received information as a user A environment file 2. The user A environment file 2 includes information such as an OS (operating system) currently being used and its storage location in addition to a machine type, hard disk information HD, and a storage location SOUKO. It is known from this file that the OS running on the terminal of user A is WINDOWS, and D:¥WINDOWS is WINDIR indicating its storage location.

When receiving RIS_SENDENV*RESP OK as a response to the command RIS_SENDENV from the host computer, the terminal requests a first key list with a command RIS_KEYLIST (step S4). In response to this request, the host computer sends back the contents of a first key table 3 with a command RIS_KEYLIST*RESP. In this case, the first key table 3 includes keywords such as an OS/basic software, a development support, a game, etc. corresponding to key numbers starting from 1.

When the keywords are displayed on the screen of the display unit (step S5), user A selects a first keyword from among them, and enters it to the terminal (step S6). Then, the terminal transmits a command RIS_KEYLIST requesting a second key list together with the key number of the first keyword that user A selects, to the host computer (step S7). Since user A selects the game as the first keyword in this case, a key number 3 corresponding to the game is transmitted to the host computer.

The host computer to which a request for the second key list is made obtains a corresponding second key table 4 using a pointer stored in the first key table 3 according to the received key number, and returns the contents of the second key table 4 with the command RIS_KEYLIST*RESP. The second key table 4 includes keywords such as an RPG, an action, a puzzle/quiz, etc. corresponding to key numbers starting from 51.

The second key table 4 includes a plurality of keywords corresponding to the keywords included in the first key table 3. The number of the keywords in the second key table 4 is equal to or less than the number of the keywords in the first table 3. If the number of the keywords in the second table 4 is less than the number of the keywords in the first key table 3, two or more keywords in the first keyword table 3 point to one keyword in the second table.

When the keywords in the second key table are displayed as the second key list on the screen of the display unit (step S8), user A selects the second keyword from the displayed keywords, and enters the selected keyword to the terminal (FIG. 1B, step S9). Then, the terminal transmits a command RIS_LIST for requesting a list of software corresponding to the first and second keywords together with the key numbers of the first and the second keywords selected by user A (step S10). Since user A selects action as the second keyword in this case, a key number 52 corresponding to action is transmitted to the host computer.

The host computer to which the list of software is requested, searches for software having the two key numbers of the first and second keywords within a group of software. At this time, the search is performed without making a distinction between the first and the second keywords as a search condition. Additionally, the search is performed in consideration of a machine type and an OS type labelled as default keys. This prevents a search for software supported by machine types other than the TOWNS.

Then, a list of the names and numbers of the corresponding software are transmitted to the terminal together with a command RIS_LIST*RESP. Since Tetris and a pinball game respectively having the key numbers 3 and 52 correspond to the software in this case, the names of Tetris and the pinball game are transmitted to the terminal together with the software numbers 5, 30, etc.

When the list of software is displayed on the screen of the display unit (step S11), user A selects desired software from the displayed list, and enters it to the terminal (step S12). The terminal then transmits a command RIS_CHKENV requesting to examine if the environment of user A is suitable for operations of the selected software, to the host computer (step S13). In this case, user A selects Tetris. Accordingly, the software number 5 corresponding to Tetris is transmitted to the host computer.

The host computer which receives the software number selected by user A prepares a check script 5 for examining a consistency between the operating environment of the software corresponding to the received number and the environment of the terminal of user A, in order to check the environment.

Since this check is automatically made by the communication between an execution program of the check script 5 and the terminal software of the terminal, user A does not need to be aware that the environment check is performed (step S14). Only when an inquiry should be made to user A, the host computer makes an inquiry.

In this case, as the operating environment of Tetris selected by user A, the OS being used is WINDOWS, the machine type being used is a TOWNS, a PC98, etc., and the name of a directory (DIR) recommended is TET. In the meantime, the user A environment file 2 describes TOWNS as a machine type and WINDOWS as the OS. Comparing these descriptions proves that the machine type and the OS meet the requirements.

Since the check script 5 of Tetris includes a command "ST4 @WINDIR@VBRJP200.DLL" for examining if a file named "VBRJP200.DLL" is stored in the location WINDIR, for indicating the storage location of the OS on the user A side (MQ1), the host computer transmits this command together with a command RIS_CHKENV*RESP. At this time, the host computer references the user A environment file 2, replaces the variable @WINDIR@ with D:¥WINDOWS, and transmits the replacing variable. Additionally, the file VBRJP200.DLL is one of the files required for operations of Tetris.

The terminal which receives this command examines if the directory WINDOWS in the drive D includes the file VBRJP200.DLL, and returns the result as an ANS to the host computer. Since there is no corresponding file in this case, ANS=OFF is returned.

The host computer, which determines that the file VBR200.DLL does not exist in the terminal, transmits an inquiry "Copy VBRJP200?" to the terminal according to the check script 5 (MQ2), and this inquiry is displayed on the screen of the display unit. The user enters an answer to the displayed inquiry, and the terminal returns the entered answer to the host computer. In this case, ANS="YES" is returned, and the host computer accepts a remote installation according to the check script 5 (RIS=OK), and sets a flag F2 instructing to copy the file VBRJP200.DLL to ON (MA2).

If the file VBRJP200.DLL exists in a designated directory in the terminal, ANS=ON is returned. Therefore, RIS=OK at that time (MA1).

As described above, automatically making an environment check prevents the distribution of software unsuitable for the environment of user A. For example, such a problem that a software package does not run due to a lack of a specific driver after it has been purchased via a communications line can be avoided.

The host computer completes the environment check when RIS=OK, and transmits the directory name SOUKODIR of the distribution destination together with the result of the check (JUDGE=OK) to the terminal. To the SOUKODIR, the recommended directory of Tetris TET is added as a subdirectory under the directory D:¥SOUKO of SOUKO stored in the user A environment file.

Simultaneously, information such as whether or not an installation is permitted (RIS), existence/non-existence of an icon registration of an installation program (installer) (ICON), and whether or not downloading is permitted (DLOAD), is transmitted to the terminal. By using the flags RIS, ICON, and DLOAD of these pieces of information, the host computer notifies the terminal which of the installation, the registration of the icon of the installer, and the downloading is possible.

The installation in this case means that software selected by user A is registered in, for example, WINDOWS, and allows the software to be used on the terminal. Accordingly, the installation in this case includes a step where an executable file of the software is registered as an icon in WINDOWS. In the meantime, the registration of the icon of the installer means that a program executing an installation is registered as an icon on the terminal.

In this case, conditions that the installation and the downloading are permitted (RIS=OK, and DLOAD=OK), and the registration of the icon of the installer is not permitted (ICON=NG), are presented. For software having a complicated installation program, it is presented that a registration of an icon of the installer is required for an installation. If a terminal running in WINDOWS requests application software supported by TOS (the operating system for TOWNS), downloading only is permitted.

Then, the terminal software of the terminal assigns priorities to the installation, the registration of the icon of the installer, and the downloading, in this order, sets one of them with a higher priority as a default, and displays it on the screen of the display unit. In this case, the installation whose priority is higher than that of the downloading is set as a default among the installation and the downloading permitted by the host computer, and displayed in an installation method selection window.

User A verifies the displayed installation method, and enters that the verification is completed (step S15). Alternatively, the user A can change the displayed settings at that time. If user A wants to register an icon of an installer, he or she can select and enter "icon registration of the installer" displayed in the installation method selection window.

Basically, if user A wants to perform a ready-made installation without performing a complicated process, he or she must select "system registration". If user A wants to make detailed installation settings, he or she must select "icon registration of the installer". To change a storage location later (to install the system on a terminal of another machine type), user A must select "downloading". Selecting "downloading" allows user A to obtain software for a machine different in type from the terminal, and to determine whether or not the software runs.

Then, the terminal automatically creates on a hardware disk a subdirectory for door-to-door distribution "D:¥SOUKO¥TET" as instructed by the host computer (step S16). If the subdirectory "D:¥SOUKO¥TET" already exists in the terminal, the terminal newly creates a subdirectory, for example, named "D:¥SOUKO¥TET001". If this subdirectory also exists, the terminal creates another subdirectory named "D:¥SOUKO¥TET002".

Program files of Tetris 6 are composed of a file named TET1.LZH (F1) and a file named VBRJP200.DLL (F2). The file TET1.LZH is generated by compressing four files such as TETRIS.EXE, TOWNS.DRV, PC98.DRV, and MAC.DRC. If TET1.LZH is expanded (decompressed) to the uncompressed state, it is divided into these four files. The file TET1.LZH is decompressed after being distributed from the host computer to the terminal.

After creating the subdirectory for door-to-door distribution, the terminal transmits a command RIS_INSTALL requesting to start a remote installation, together with the number of the selected software, to the host computer (FIG. 1C, step S17). Upon receipt of the command and the name of the selected software, the host computer starts the remote installation of the software corresponding to the transmitted number. The remote installation is automatically performed by negotiation between the host computer and the terminal according to the installation script of Tetris created by the host computer (step S18) The installation script 7 includes an instruction for downloading the file TET1.LZH into a storage location of user A, that is, @SOUKODIR@. The host computer replaces @SOUKODIR@ with SOUKODIR=D:¥SOUKO¥TET, and downloads TET1. LZH into the subdirectory D:¥SOUKO¥TET of the hard disk.

When notified from the terminal that the downloading is completed, the host computer replaces @WINDIR@ with D:¥WINDOWS, and downloads the file VBRJP200.DLL into the directory D:¥WINDOWS on the hard disk.

When notified from the terminal that the downloading is completed (OK), the host computer then transmits an instruction LHA X D:¥SOUKO¥TET¥TET1.LZH to decompress the downloaded file TET1.LZH in the storage location @SOUKODIR@ (D:¥SOUKO¥TET). Upon receipt of this instruction, the terminal decompresses the file TET1.LZH to the four files such as TETRIS.EXE, TOWNS.DRV, PC98.DRV, and MAC.DRC. These four files are stored in the same subdirectory D:¥SOUKO¥TET as that including the file TET1.LZH.

When notified from the terminal that the decompression is completed (OK), the host computer moves a file @MACHINE_TYPE@.DRV stored in the location @SOUKODIR@ (D:¥SOUKO¥TET) to the storage location @WINDIR@ (D¥WINDOWS), and transmits an instruction MOVE D:¥SOUKO¥TET¥TOWNS.DRV D:z,1 WINDOWS¥FONT.DRV rename the file to FONT.DRV.

At this time, the host computer references the user A environment file 2, replaces @MACHINE_TYPE@ with TOWNS, and transmits the instruction. Upon receipt of the instruction, the terminal moves the file TOWNS.DRV included in the subdirectory D:¥SOUKO¥TET to the directory D:¥WINDOWS (file move), and renames the file FONT.DRV (renaming).

When notified from the terminal that the file move and the renaming are completed (OK), the host computer then transmits an instruction ICON TETRIS.EXE for registering an icon of a file TETRIS.EXE. Upon receipt of this instruction, the terminal registers the file TETRIS.EXE included in the subdirectory D:¥SOUKO¥TET in the terminal as an icon.

After that, an icon for invoking the file TETRIS.EXE is displayed in a directory window. Clicking the mouse button with the icon pointed to starts the operation of Tetris.

When notified from the terminal that the registration of the icon is completed (OK), the host computer sends back RETURN in order to notify the terminal of the completion of the remote installation, and the sequence of installation operations is completed. After having been notified that the remote installation is completed, the terminal selects the next software and performs its remote installation according to an instruction of user A, or terminates the process (step S19).

The conventional technology of managing software to be distributed using the remote installation system when the software is sold to users can be "IDENTIFIER MANAGING DEVICE AND METHOD IN SOFTWARE DISTRIBUTION SYSTEM, U.S. patent application Ser. No. 08/571,104, and Japanese Patent Laid-open H8-190529"

In this system, the host computer issues a terminal identifier (machine ID: MID) to each user terminal, and issues a user identifier (user ID; UID) other than the machine ID to a terminal user. The host computer sets a terminal password (machine password: MPSW) for each machine ID and a user password for each user ID.

The host computer manages the terminals and the users which receive distributed software programs using the machine ID, the machine password, the user ID, and the user password.

If the software program sold to the user becomes unserviceable for some reason, the host computer restores the software program by referring to the sales record. The host computer also provides an update service for the sold software programs. Furthermore, by dynamically changing the terminal passwords provided for the terminals and checking the terminal passwords, the host computer observes whether or not the installed software program is duplicated into other terminals.

When the terminal is transferred from a user to another user, the software program installed in the terminal may be transferred with the rights to receive an update service and a recovery service for the software program from the host computer. This transfer system protects the software from being illegal copied and is useful for both user and vendor because these rights can be easily transferred through the network.

By referring to FIGS. 2A through 2D, the flow of the processes according to the software distribution system of this embodiment will be described.

FIG. 2A is a flow-chart showing the registration process for user identifier UID. When the process is started, the user connects his terminal with the host computer in the distribution center (step S21), then, inputs his name, the number of his cash card, and personal information of, for example, his address (step S22). Receiving this input information, the host computer issues a temporary user identifier and a temporary user password to temporarily register the user (step S23). After that, the user signs off the connection to the host computer, and waits for the authentication of the cash card (step S24).

After the cash card is authenticated, the distribution center mails an official user identifier UID and an official user password PSW to the user (step S25). Then, the user connects the terminal with the host computer again (step S26), and enters the received official user identifier UID and the received official user password PSW to the host computer from the terminal (step S27).

Receiving these data, the host computer recognizes that the user has received the official user identifier UID and the official user password PSW, registers the user officially, and finishes the process. The user can input another password together with the mailed user password PSW and register these passwords.

FIG. 2B is a flow-chart showing the registration process for the terminal identifier MID. When the process is started, the user connects his terminal to the host computer in the distribution center (step S31) and inputs the registered user identifier UID and the registered user password PSW (step S32). Then, the terminal sends the machine information on the type of the terminal, the OS used in the terminal, and the like, to the host computer automatically (step S33). The host computer issues and attaches the terminal identifier MID and the terminal password MPSW to the received machine information, stores them in the specified format, and sends the terminal identifier MID and the terminal password MPSW back to the terminal (step S34). The issued terminal identifier MID and the issued terminal password MPSW are stored in the terminal.

FIG. 2C is a flow-chart showing the software selling process, in which the software program is sold to a user registered in the distribution center through the network.

When the process is started according to, for example, a request from the user, the terminal of the user is connected to the network (step S41). Then, the host computer checks the user identifier ID and the user password (step S42). If these data is not correct (NG), the process is finished.

If the user ID and the user password are correct (OK), the host computer automatically reads and checks the terminal ID and the terminal password stored in the terminal (step S43). If the terminal ID and the terminal password are not correct, it can be considered that data have been illegally copied, and a process against the illegal action is performed (step S44).

If the terminal ID and the terminal password are correct (OK), the host computer displays the list of software programs to be sold on the screen of the terminal, and the user can choose a software program from the list (step S45). The user selects the program from the list or inputs a request for the recovery of the software program if it is needed.

Next, the host computer determines whether the request from the user is a purchase request or a recovery request (step S46). If the user requests a recovery service, the host computer checks whether or not the user has purchased the corresponding software program before by referring to the purchase information of the user (step S47). If the user did not purchase the software program (step S47, NO), control is returned to step S45 because the user does not have the right to receive the recovery service.

If the user requests a recovery service for the software program the user has purchased before (step S47, YES), the host computer delivers the requested software program to the terminal to install it again (step S49). Then, the host computer demands the payment from the user according to a usage contract (step S50) and finishes the process. If a recovery service is described as a charge-free service according to the contract, the service is provided free of charge.

If the host computer receives the purchase request for the software program from the user in step S46, the host computer decides to sell the chosen software program (step S48) and delivers the software program to the terminal to install it (step S49). Then, the host computer demands the payment from the user (step S50) and finishes the process.

In step S50, the payment is imposed on the user who has been assigned the input user identifier, and the management of the user ID is entrusted to the user. Each user designates the user password to manage the user ID.

If the sales contract for the software program indicates that the software program is sold to the terminal in which the software program is installed and is not sold to the user, the payment is imposed on the terminal in step S50. In this case, the host computer checks whether or not the corresponding software program is sold to the terminal at step S47, and provides the restoration service only if the software program has been sold to the terminal.

The host computer adds a terminal password to the terminal with the terminal identifier and automatically updates the terminal password to manage it every time the terminal is connected to the host computer. If the sold software program is duplicated illegally, access is gained using the terminal password used before the update. Therefore, the host computer can recognize the illegal duplication. The host computer can trace back the terminal identifiers and the terminal passwords.

FIG. 2D is a flow-chart showing the check process and rewriting process for the terminal password in step S43, and the process against an illegal action in step S44.

When the process is started, the host computer compares the terminal password of the connected terminal with the terminal password provided when the terminal was connected the last time (step S51).

If the two terminal passwords match each other, the host computer creates a new terminal password to write it into the terminal and also stores it in the host computer (step S52).

The new terminal password is assigned using a random number, that is, an unpredictable number. The old terminal password is also stored in the host computer to be referred to later (step S53), then the process finishes.

When the two terminal passwords do not match each other in step S51, the host computer decides that an unauthorized duplication has been made, and assigns a new terminal identifier to the connected terminal to manage the terminal (step S54). Furthermore, the host computer continuously compares the terminal password obtained in the current connection with old terminal passwords stored in the host computer to find the date of the last access which was done using this terminal password (step S55), thereby specifying the time at which the unauthorized duplication was made. The date can be obtained by referring to date information stored in the host computer. After step S55, the process is finished.

The prior art technology of entering in the remote installation system the software generated by a user can be "SOFTWARE REGISTERING/MANAGING SYSTEM AND METHOD THEREOF, U.S. patent application Ser. No. 08/724,675, Japanese Patent Application H7-258506."

FIG. 3A is a block diagram showing the structure of locations formed in this system. In the system shown in FIG. 3A, user groups referred to as clubs form virtual places in the host computer for exchanging software information. Users associated with each club are referred to as members, too. In FIG. 3A, clubs 12, 13, and 14 are included in the same hierarchical level. Each of the clubs 12, 13, and 14 has the functions of a conference room and a remote installation system (RIS).

A high order club 11 is disposed in a higher hierarchical level than the clubs 12, 13, and 14. In this example, the number of hierarchical levels is two. However, it should be noted that the number of hierarchical levels is not limited to two. Generally, a software program delivered to a user is uploaded and registered to any club. For example, when a software program 15 is uploaded to the club 12, the software program 15 is first registered to the club 12. Thus, the club 12 becomes the original club. To transfer the software program registered in the original club to another club, there are two methods, namely a linking method and a moving method.

When the linking method is used, the software program can be seen from other clubs than the original club. On the other hand, when the moving method is used, the function of the original club is moved to another club. A member who wants the software program 15 can download it from one of the original club 12 and the linked clubs 11 and 13.

Normally, the member who created the software program 15 has the right to select an original club. However, after the member has uploaded the software program 15 and has given permission to publish it, the right to link the software program or move the authority of the original club to another club is transferred to the supervisor (manager) of the original club. In the practical management of the system, this right should be arranged between a member who uploads a software program and the supervisor of the original club. In the computer system, the duties and rights of the creator of a software program and individual supervisors may be set forth in a contract as follows.

(1) Rights and duties of a creator of a software program
  Right to upload the software program
  Right of the creator to deliver a software program as a test delivery without a fee (namely, the fee for an RIS for testing is free)
  Right to permit publishing of a software program he has created
  Duties of the creator to support a software program that he has uploaded (for example, he should answer questions from the users of the software program, and correct any errors in the software program)
(2) Rights and duties of the supervisor of the original club
  Right to test software programs uploaded to the club without a fee (the fee for using software programs for testing is free)
  Right to publish software programs uploaded to the original club
  Right to permit a linked club to link a software program to the linked club
  Duty to support software programs in the original club
  Duty to permit high order clubs to link software programs to other clubs, unless a justifiable reason exists
(3) Rights and duties of the supervisor of a linked club
  Right to publish software programs that are permitted to be linked
  Duty to support software programs in the club
(4) Rights of the supervisor of a high order club
  Right to publish software programs that are permitted to be linked Since high order clubs can normally link software programs of low order clubs to themselves, members of the highest order club can see all software programs in the system. In addition, under the condition that the supervisor of the linked club supports the usage of a software program and so forth, the software program is linked to the linked club. Thus, in a club where the members can view a software program, the members can receive the support for the software program.

Next, with reference to FIGS. 3B through 3D, the operations of a creator of a software program and supervisors will be described.

FIG. 3B is a flowchart showing the operation of the program creator. In FIG. 3B, when the operation is started, a creator creates a software program and prepares a file group to be uploaded (at step S61). Thereafter, the creator selects a club to which he wants to upload the created program. With the UPLOAD command, the program creator uploads the software program (at step S62) and receives the result of an automatic check (in step S63).

At this point, the host computer automatically performs a malfunction check, a virus check, a copyright check, a trademark check, and so forth. When an error is detected as a result of these check processes (at step S64), the creator corrects errors and uploads only the corrected portions (at step S65). Then, the creator repeats the operation from step S63.

After the automatic checks have been successfully completed, the creator performs a test delivery using the RIS command (in step S66). In the test delivery, it is determined whether or not the uploaded software program can be remotely installed without a problem (in step S67). When an error takes place in the test delivery, the creator corrects the error portion and uploads the corrected portion again (in step S68). Then, the processes in and after step S66 are repeated. When the test delivery is successfully performed, the creator permits the software program to be published using the PUSH command (in step S69). Thus, the creator finishes the operation.

FIG. 3C is a flow chart showing the operation of a supervisor of an original club. When the operation is started, the supervisor performs a test delivery of a software program permitted to be published by the creator thereof (in step S71) and checks whether or not the software program is normal (in step S72). When the test delivery is successfully completed, the supervisor publishes the software program to the members of the original club using the command PUBLISH (in step S73). When the software program has a problem, the supervisor notifies the creator of the problem (in step S74). Thus, the supervisor finishes the operation.

FIG. 3D is a flowchart showing the operation of the supervisor of a linked club. When the supervisor of the linked club finds a desired software program after the operation is started, he or she sends a linking request to the original club (at step S81) and receives the reply of the request (at step S82). When the original club does not permit the linking request, the supervisor finishes the operation. When the original club permits the linking request using the command PERMISSION, the supervisor of the requested club links the software program with the command LINK (step S83). At this point, the supervisor changes keywords so that the members of the club can easily retrieve the software program.

Then, the supervisor of the linked club performs a test delivery of the software program (at step S84) and checks whether or not the software program is normal (in step S85). When the software program is normal, the supervisor of the linked club publishes the software program to the members of the club using the command PUBLISH (at step S86). When the software program has a problem, the supervisor of the linked club notifies the original club of the problem (in step S87). Thus, the supervisor finishes the operation.

There are various types of software distributed in the communications using personal computers. For example, freeware is normally distributed free of charge. Shareware is once distributed free of charge with available functions limited for a predetermined period, and then the limitations are released when a predetermined fee is paid by the user. If a software is sold as a product, it is delivered upon receipt of the fee.

When the delivery center provides software for the users based on the remote installation function, a system of receiving the fees without fail for various services and products is required. An example of settling the payment can be "SOFTWARE CHARGE DETERMINATION SYSTEM AND METHOD, U.S. patent application Ser. No. 08/693,467, Japanese Patent Application H7-258507."

FIG. 4A shows an example of the uploading process of a file group used in this system. The creator of shareware uploads a CFG file 21 (AAA.CFG), an explanatory file 22 (AAA.TXT), an installation related file 23 (an icon file ICON.DEF in this case), and a program file 24 (AAA.LZH) as a program registration file from his or her own terminal.

A host computer registers the uploaded information to a contents database 28. In this case, software code, name, type (TYPE), name of program file, name of explanatory file, name of icon file, etc. of the uploaded software "AAA scheduler" are registered as management information. SHARE in [type] indicates that the type of software is shareware. The contents database 28 is provided in, for example, the host computer or in an external disk unit.

Then, the creator uploads a definition file 25 (AAAS.CFG), a CHK file 26 (AAAS.CHK), and a rewrite file 27 (INI.DEF) as remittance procedure files. By uploading such files, the software code, name, type, name of CHK file, name of file for post-process, etc. of the remittance procedure file AAAS are registered in the contents database 28.

In this case, the name of the rewrite file 27 INI.DEF is registered as the file for a post-process. Additionally, a SOKIN#RIS in TYPE indicates that the type of software is a remittance procedure file for shareware which corresponds to the information in [instype] of the definition file 25 (AAAS.CFG).

The explanation about the remittance procedure for shareware using an uploaded group of files is provided next by referring to FIGS. 4B through 4E. According to the remittance procedure for shareware, a remittance flag is set for a protocol in addition to the procedure for a remote installation. By setting the remittance flag in order to request a software search from a terminal, the remittance procedure for shareware can be selected. Additionally, a menu for setting the remittance flag to ON/OFF is displayed on the screen of the terminal. In this example, it is assumed that the shareware "AAA scheduler" has already been installed in a user system with its functions restricted before the remittance procedure. If a user attempts to purchase this shareware, the following commands/responses are exchanged between a host computer and a terminal.

The terminal transmits a user environment to the host computer (step S91 shown in FIG. 4B). The host computer returns a response upon receipt of the user environment (step S92). When the user requests a keyword list to retrieve software (step S93), the host computer returns the keyword list (step S94).

As shown in FIG. 4C, a menu 29 of option procedures is displayed on the screen of the terminal. The user specifies "remittance" from among the displayed options, and selects a keyword from the keyword list. As a result, the remittance flag SOKIN is set to ON, and an instruction to start retrieving the shareware is transmitted to the host computer (step S95 shown in FIG. 4C).

The host computer searches for the contents database 28 using a specified keyword, and returns the name of software whose type starts with SOKIN, and the software code of its remittance procedure file (remittance software) (step S96). In this case, names such as AAA scheduler, BBB scheduler, etc. and software codes 4000, 4001, etc. are returned.

The terminal lists the remittance software only, and the user specifies a particular piece of remittance software in the listed software (step S97). In this case, the software code 4,000 is specified. The host computer negotiates with the terminal side under the condition of the remittance software having the software code 4000 (step S98). At this time, the host computer instructs the terminal to examine the location of the initialization file AAA.INI stored in the user system using a command ST4. Then, the terminal examines the location of the file AAA.INI, and notifies the host computer that the location is E:¥AAA (step S99). The command ST4 is assumed to be supported on the terminal side.

Then, the host computer makes the terminal display a dialog box 30 on its screen, and asks the user if the location of the file AAA.INI is correct (step S100 in FIG. 4D). If the directory displayed in the dialog box 30 is correct, the user returns that directory as is (step S101). The host computer then determines that a directory path of the file to be rewritten in the user system is E:¥AAA¥AAA.INI.

If the displayed directory is incorrect, the user enters the correct name of the directory. Assuming that the user makes an entry such as G:¥GGG, the terminal returns a directory path G:¥GGG¥AAA.INI to the host computer. Since the storage location of the file AAA.INI is determined, the host computer notifies the terminal that the remittance of the shareware charge can be made (step S102).

Then, the user requests the release of the functional restriction on the shareware (step S103 shown in FIG. 4E). In response to this request, the host computer references

[instype] in the definition file 25 shown, withdraws the charge from the account of the user, and transmits a rewrite file INI.DEF describing the rewriting process of the file AAA.INI. Furthermore, the host computer references [last] in the definition file, and transmits a post-process command CHGINI in order to instruct the terminal to rewrite the file according to the procedure described in the file INI.DEF.

Then, the terminal references the downloaded file INI.DEF, and rewrites the file AAA.INI. Thus, the functional restriction of the shareware "AAA scheduler" is released so that the shareware can run on the user system properly. After that, the host computer deletes the file INI.DEF from the terminal, and terminates the process.

Since the definition file 25 indicates in [instype] that the functional restriction is released immediately when the charge is remitted, the functional restriction of the shareware is released simultaneously with the withdrawal of the charge. Alternatively, like a general personal computer communication center, the host computer may only perform a charge withdrawal and an electronic mail issuance to a person who has registered for shareware.

FIGS. 4F, 4G, and 4H are schematic diagrams showing the procedure for withdrawing a charge for the shareware "BBB scheduler". This process assumes that the shareware "BBB scheduler" is installed on a user terminal and restricted in function. When a user attempts to purchase this shareware, commands/responses are exchanged between the host computer and the terminal as follows.

The terminal first transmits a user environment to the host computer (step S111 in FIG. 4F). The host computer returns a response upon receipt of the user environment (step S112). When the user requests a keyword list for software search (step S113), the host computer returns the keyword list (step S114).

As shown in FIG. 4G, a menu 29 of option procedures is displayed on the screen of the terminal. The user selects "remittance" from the menu, and also selects a keyword from the keyword list. As a result, a remittance flag SOKIN is set so that an instruction to start the shareware search can be transmitted to the host computer (step S115 shown in FIG. 4G).

The host computer searches for a contents database 28 using the selected keyword, and returns the name of shareware whose type begins with SOKIN and the software code of the remittance software (step S116). The terminal lists remittance software only, and the user selects the remittance software having the software code 4001 from the listed software (step S117).

Then, the host computer makes the terminal display a message 31 on its screen, and asks the user if the charge is acceptable (step S118 shown in FIG. 4H). The host computer references [instype] in the definition file BBBS.CFG, changes the value of the flag SOKIN into 0×08 indicating only an e-mail issuance, and returns the value to the terminal.

The user selects OK if the charge is acceptable, or selects NG if the user does not want to purchase the shareware. In this case, OK is selected, and a request to send e-mail to the person who makes the registration is transmitted from the terminal to the host computer (step S119).

Upon receipt of the request, the host computer withdraws the charge from the account, etc. of the user, and transmits the e-mail notifying the person who registers the BBB scheduler that the charge has been withdrawn. The destination address of the e-mail is the remittee FJOKI set in [type] of the definition file.

When the person who makes the registration receives that e-mail from the host computer, he or she notifies the person who purchased the shareware of a method for releasing a functional restriction through e-mail, etc. As a result, the person who purchased the shareware can use all of the functions of the BBB scheduler.

However, the above described conventional remote installation system has the following problem.

Since marketed software normally contains undisclosed information, it should be distributed through a secured line. Therefore, if the software is installed on the Internet through which security is not preliminarily guaranteed, then a countermeasure should be taken against hacking.

A method of linking a world wide web (WWW) browser, which is a software tool for retrieving information through the Internet, and a remote installation system should be prepared in various configurations corresponding to respective services provided for users.

The machine ID of a terminal in the conventional remote installation system is designed/managed on the premise that there is only one host computer. Therefore, if services are provided using a plurality of host computers, each of the host computers may assign the same machine ID to different terminals. In this case, there arises the problem that the host computers cannot correctly identify terminals.

Furthermore, since identification information may be illegally accessed through the Internet, it is very difficult to correctly identify a correspondent in communications. As a result, a third party can pretend to be a host computer of an RIS using illegally acquired identification information. Therefore, the users should be able to detect illegal operations.

SUMMARY OF THE INVENTION

The present invention aims at providing a system and a method of offering secure and appropriate member-exclusive services using the remote installation system through the Internet.

According to the first aspect of the present invention, the service system includes an entry unit, a key information providing unit, and an encryption unit, and provides a software distribution service. The entry unit signs a client up through a secured communications line. The key information providing unit provides key information corresponding to the machine identifier of the client in the above described sign-up process. Then, the encryption unit enciphers at least one of the passwords and the software contents on the Internet using the above described key information.

According to the second aspect of the present invention, the service system includes a remote installation system and a browser, and provides a software distribution service. The remote installation system automatically distributes the software specified by an anchor file on a home page from a server to a client. The browser unit automatically activates the remote installation system when the above described anchor file is accessed.

According to the third aspect of the present invention, the service system includes an accounting unit and a browser, and provides an online shopping service. The accounting unit automatically connects a client to a server, performs an accounting process for a product (commodity) or a service specified in an anchor file on a home page. The browser automatically activates the accounting unit when the above described anchor file is accessed.

According to the fourth aspect of the present invention, the service system includes a processing unit and a browser, and provides a communications service. The processing unit performs an accounting process for a communications service specified in an anchor file on a home page, and automatically transmits from a server to a client the necessary information for using the communications service. The browser automatically activates the processing unit when the above described anchor file is accessed.

According to the fifth aspect of the present invention, the service system includes a helper unit, a processing unit, and a browser, and provides a transaction service. The browser accesses the Internet, and the helper unit is activated by the browser and performs a part of the transaction service. The processing unit is activated by the browser and performs a process related to an assignment of a transaction use-right and accounting in cooperation with the helper unit.

According to the sixth aspect of the present invention, the service system includes a processing unit and a transaction unit, and provides a transaction service. The transaction unit performs a transaction servicing process. The processing unit is activated by the transaction unit and performs a process related to an assignment of a transaction use-right and accounting in cooperation with the transaction unit.

According to the seventh aspect of the present invention, the service system includes a processing unit and a transaction unit, and provides a transaction service. The transaction unit performs a transaction servicing process. The processing unit is activated by the transaction unit, automatically connects a client to a server, and acquires necessary data for the above described transaction service.

According to the eighth aspect of the present invention, the service system includes receiving unit and a determination unit. The receiving unit receives from a client a machine identifier generated by combining a server identifier and a client identifier. Then, the determination unit divides the above described machine identifier into a server portion and a client portion, and checks a server identifier described in the server portion to determine whether or not a connection between the server and the client is correct.

According to the ninth aspect of the present invention, the service system includes a generation unit, storage unit, and a connection unit. The generation unit combines a server identifier and a client identifier to generate a machine identifier of a client. The storage unit stores the machine identifier. The connection unit connects the client to the server using the machine identifier.

According to the tenth aspect of the present invention, the service system includes a communications unit and an authentication unit. The communications unit transmits and receives specified information enciphered by the electronic signature function based on the authentication key of the server. The authentication unit authenticates a server through the specified information.

According to the eleventh aspect of the present invention, the service system includes a storage unit and a connection unit, and provides a remote installation service. The storage unit is provided at the client side, and stores the address information about the server in the Internet. The connection unit automatically connects the client to the server according to the above described address information.

BRIEF DESCRIPTION OF THE INVENTION

FIG. 3A shows the configuration of locations;

FIG. 3C is a flowchart showing the operation of the supervisor of an original club;

FIG. 4A shows an uploading process;

FIG. 4D shows the procedure (3) for shareware;

FIG. 4E shows the procedure (4) for shareware;

FIG. 4G shows the procedure (2) of withdrawing a charge;

FIG. 4H shows the procedure (3) of withdrawing a charge;

FIG. 5A shows the principle of the service system of the present invention;

FIG. 6A shows the sign-up sequence;

FIG. 6B shows the first initialization file;

FIG. 7 shows the distribution of enciphered contents;

FIG. 8 shows the software distribution system through the Internet;

FIG. 9 shows the HTML file of a software creator's home page;

FIG. 10 shows the first anchor file;

FIG. 12 shows the purchase table;

FIG. 13 shows the payment table;

FIG. 14 shows the online shopping system;

FIG. 17 shows the HTML file of the home page of a fortune teller's;

FIG. 18 shows the second anchor file;

FIG. 19 shows the password display screen;

FIG. 22 shows a URL storage file;

FIG. 30 shows the information about an RIS server;

FIG. 32 shows a horse racing data file;

FIG. 33 is a date/file name correspondence table;

FIG. 34 shows the data stored in each file;

FIG. 35 is a flowchart of the second process of guessing a winning horse in a race;

FIG. 37 shows the second initialization file;

FIG. 38 shows the third initialization file;

FIG. 42 shows the third anchor file; and

DESCRIPTION OF THE PREFERRED EMBODIMENTS

Figure 1A:
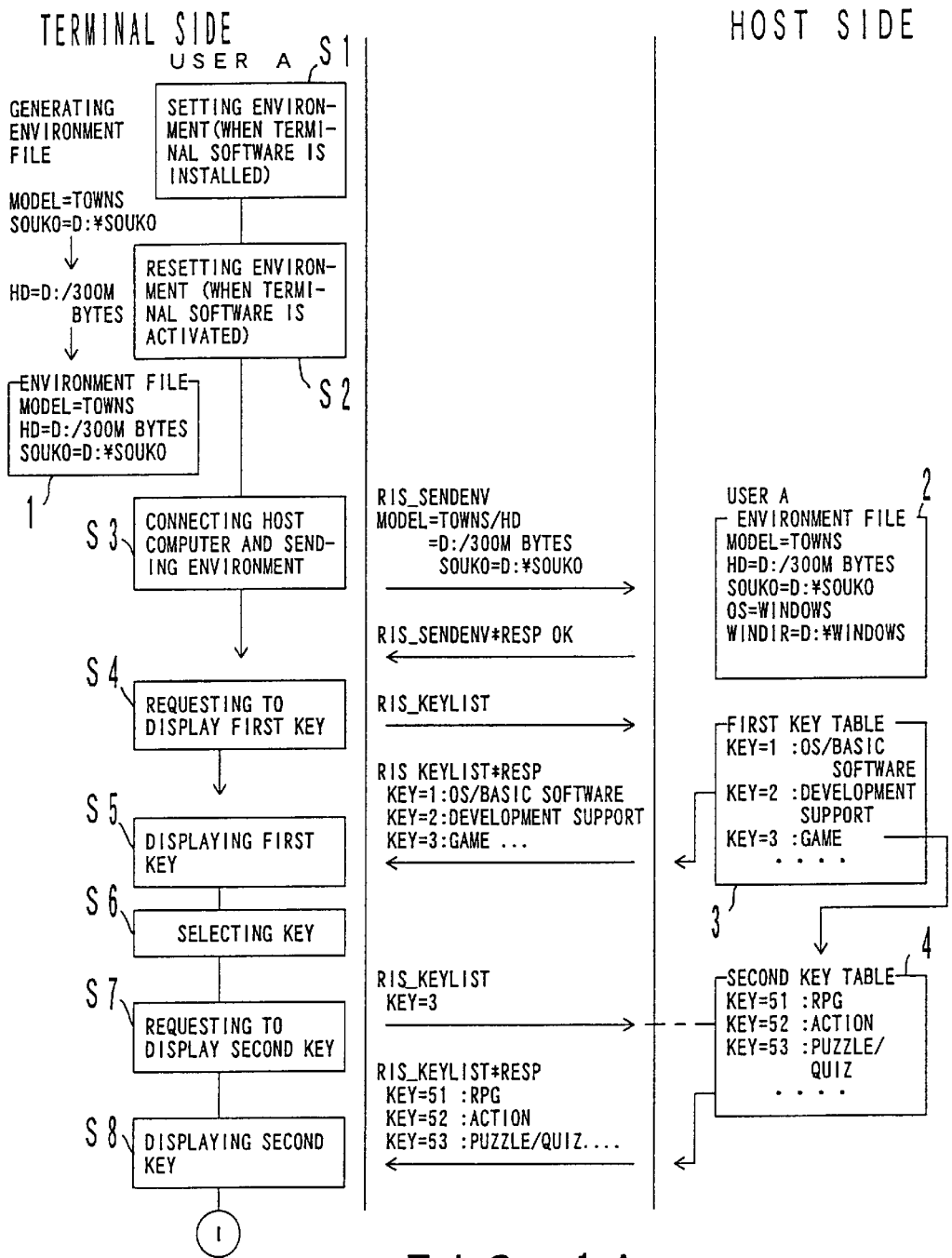
FIG. 1A is a flowchart (1) showing a remote installation system.

The embodiments of the present invention are described in detail below by referring to the attached drawings.

FIG. 5A shows the principle of the service system according to the present invention;

The service system shown in FIG. 5A includes the first, second, third, fourth, fifth, sixth, seventh, eighth, ninth, tenth, and eleventh principles according to the present invention.

According to the first principle of the present invention, the service system comprises an entry unit 80, a key information assignment unit 81, and an encryption unit 82, and provides a software distribution service. The entry unit 80 signs up a client through a secured communications line. The key information assignment unit 81 assigns key information corresponding to the machine identifier of the client in the above described sign-up process. The encryption unit 82 enciphers at least one of the password and the contents of software on the Internet.

Since the key information used in the enciphering process is transmitted through the secured communications line, it is not revealed to other users. By thus enciphering a password according to the assigned confidential key information, the security of the log-in sequence to the remote installation system can be improved through the Internet. Furthermore, by enciphering the contents of the software according to the key information, the security of the remote installment sequence can be improved through the Internet.

According to the second principle, the service system comprises a remote installation system 83 and a browser 88, and provides a software distribution service. The remote installation system 83 automatically distributes the software specified in an anchor file on a home page from a server to a client. The browser 88 automatically activates the remote installation system 83 when the above described anchor file is accessed.

When the browser 88 activates the remote installation system 83, user-specified software is automatically distributed. Therefore, the user can receive a remote installation service on a home page through the Internet without consideration of the remote installation system 83.

According to the third principle of the present invention, the service system comprises an accounting unit 84 and the browser 88, and provides an online shopping service. The accounting unit 84 automatically connects a client to a server, and performs an accounting process on a product or a service specified in an anchor file on a home page. The browser 88 activates the accounting unit 84 when the above described anchor file is accessed.

The accounting unit 84 can be, for example, a remote installation system. When the browser 88 activates the accounting unit 84, an accounting process is performed on a user-specified product or service. As a result, an online shopping service can be realized using the remote installation system through the Internet.

According to the fourth principle of the present invention, the service system comprises a processing unit 85 and the browser 88, and provides a communications service. The processing unit 85 performs an accounting process on the communications service specified in an anchor file on a home page, and automatically transmits, from a server to a client, necessary information for use in applying the communications service. The browser 88 automatically activates the processing unit 85 when the above described anchor file is accessed.

The processing unit 85 can be, for example, a remote installation system. When the browser 88 activates the processing unit 85, an accounting process is performed on a user-specified communications service, and information required to use the service is automatically provided. Therefore, a communications service is realized using the remote installation system through the Internet.

According to the fifth principle of the present invention, the service system comprises a helper unit 86, a processing unit 87, and the browser 88, and provides a transaction service. The browser 88 accesses the Internet. The helper unit 86 is activated by the browser 88 and performs a part of a transaction servicing process. The processing unit 87 is activated by the browser 88 to perform a process relating to an assignment of a use right of a transaction and to accounting in cooperation with the helper unit 86.

The processing unit 87 can be, for example, a remote installation system. The browser 88 activates the helper unit 86 and the processing unit 87. The helper unit 86 cooperates with the processing unit 87 to automatically perform a process of assigning a use right of a transaction and an accounting process for a user. Thus, a transaction service is realized using a remote installation system through the Internet.

According to the sixth principle of the present invention, the service system comprises a processing unit 89 and a transaction unit 91, and provides a transaction service. The transaction unit 91 performs a transaction servicing process. The processing unit 89 is activated by the transaction unit 91, and performs a process relating to an assignment of a use right of a transaction and accounting in cooperation with the transaction unit 91.

The processing unit 89 can be, for example, a remote installation system. The transaction unit 91 activates and cooperates with the processing unit 89 to automatically perform a process of assigning a use right of a transaction and an accounting process for a user. Therefore, a transaction service can be realized using a remote installation system without a browser.

According to the seventh principle of the present invention, the service system comprises a processing unit 90 and the transaction unit 91, and provides a transaction service. The transaction unit 91 performs a transaction servicing process. The processing unit 90 is activated by the transaction unit 91, and automatically connects a client to a server to obtain necessary data for the above described transaction service.

The processing unit 90 can be, for example, a remote installation system. The transaction unit 91 activates the processing unit 90. The processing unit 90 obtains data from the server and transmits the obtained data to the transaction unit 91. The transaction unit 91 performs a transaction servicing process using the data. Thus, a transaction service can be realized using a remote installation system without a browser.

According to the eighth principle of the present invention, the service system comprises a receiving unit 92 and a determination unit 93. The receiving unit 92 receives from a client a machine identifier obtained by combining a server identifier with a client identifier. The determination unit 93 divides the above described machine identifier into a server portion and a client portion, checks a server identifier described in the server portion to determine whether or not a connection between the server and the client is correct.

If the client transmits the machine identifier together with the server identifier, the determination unit 93 can determine to which server the connection request corresponds. Thus, it is determined that the server corresponding to the server identifier is a correct server for the client. Therefore, in an environment where a plurality of servers provides services, a server can correctly identify a corresponding client even if the same client identifier is assigned to two or more clients.

According to the ninth principle of the present invention, the service system comprises a generation unit 94, a storage unit 95, and a connection unit 96. The generation unit 94 generates a machine identifier of a client by combining a server identifier with a client identifier. The storage unit 95 stores the machine identifier. The connection unit 96 connects a client to a server using the machine identifier.

If the generation unit 94 generates a machine identifier including a server identifier and the connection unit 96 connects the client to the server according to the machine identifier, then the server can identify to which server the connection request relates. Therefore, as in the eighth principle of the present invention, the server can correctly identify the client.

According to the tenth principle of the present invention, the service system comprises a communications unit 97 and an authentication unit 98. The communications unit 97 transmits and receives specified information enciphered by a digital signature function based on the authentication key of the server when the communications unit 97 logs into the server. The authentication unit 98 authenticates the server through the specified information.

The server provides, for example, a remote installation service, and enciphers and transmits the information specified by the client using a secret key in the log-in sequence. The authentication unit 98 deciphers the specified information using a corresponding public key and determines whether or not the server is authenticated based on the decryption result. If the deciphered information matches the original specified information, the server is authenticated.

Since only an authenticated server can correctly encipher information, a client can correctly identify the server through the Internet. The similar effect can be obtained by transmitting specified information enciphered using a public key from a client to a server and by deciphering the transmitted information using a secret key and returning it from the server to the client.

According to the eleventh principle of the present invention, the service system comprises a storage unit 99 and a connection unit 100, and provides a remote installation service. The storage unit 99 is provided at the client side, and stores address information about a server through the Internet. The connection unit 100 automatically connects the client to the server according to the above described address information.

Since the address information (a domain name and a port number) about the server of a remote installation system is stored in the storage unit 99, not on a home page, the information is not revealed to other users. Thus, the member-exclusive remote installation service system can be realized through the Internet by storing the address information only in the terminal of a user who is an RIS member.

Thus, according to the service system shown in FIG. 5A, various member-exclusive services can be provided safely and appropriately using the remote installation system through the Internet.

Figure 5B:
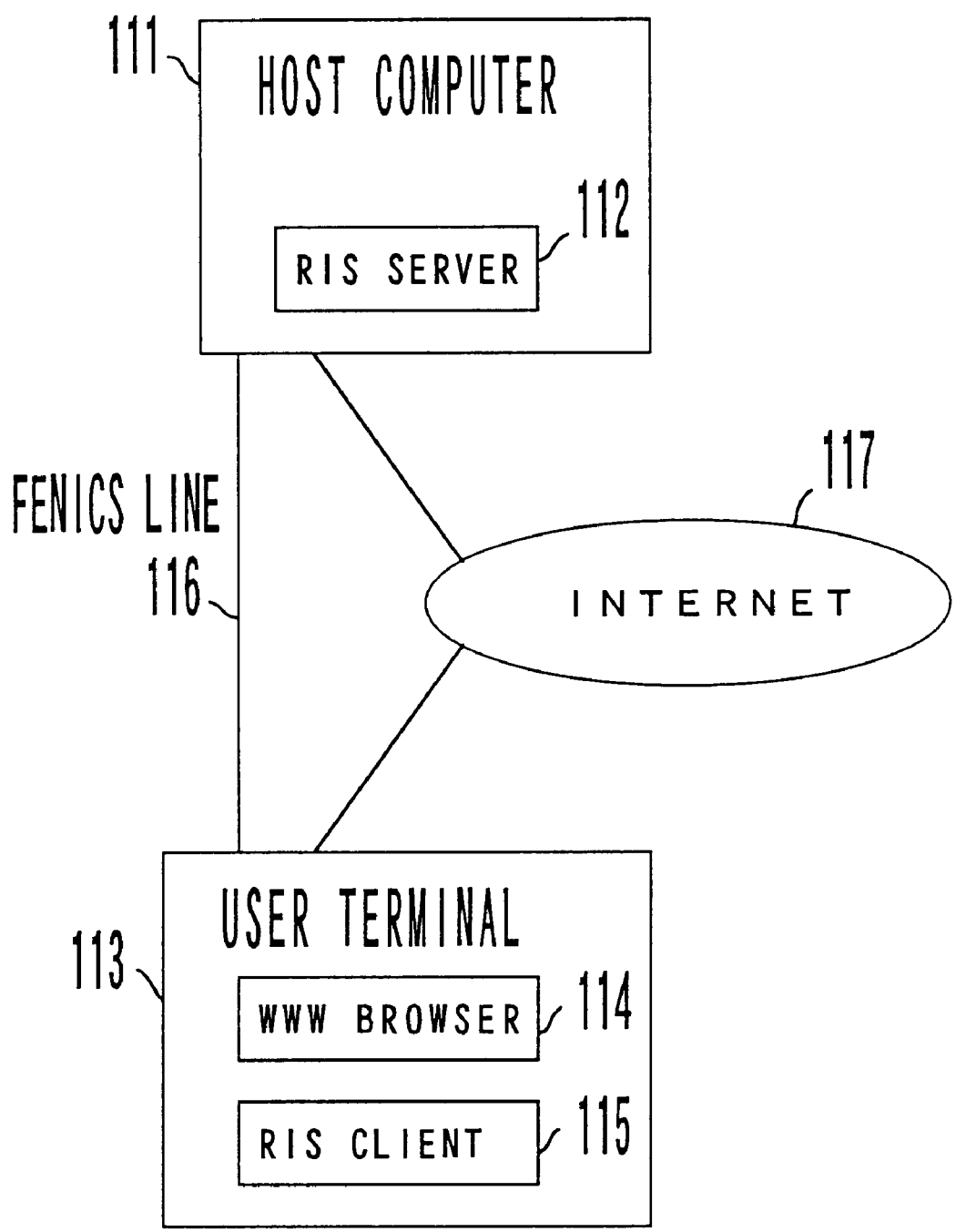
FIG. 5B shows the configuration of the system according to an embodiment of the present invention.

The entry unit 80, key information assignment unit 81, encryption unit 82, remote installation system 83, browser 88, accounting unit 84, processing unit 85, helper unit 86, processing unit 87, processing unit 89, processing unit 90, transaction unit 91, receiving unit 92, determination unit 93, generation unit 94, connection unit 96, storage unit 95, communications unit 97, authentication unit 98, storage unit 99, and connection unit 100 shown in FIG. 5A correspond to the later described functions of a host computer 111 and a user terminal 113 shown in FIG. 5B.

FIG. 5B shows the configuration of the service system according to an embodiment of the present invention. The service system shown in FIG. 5B comprises the host computer 111 connected to Internet 117 and the user terminal 113. The host computer 111 and the user terminal 113 are connected to each other through a FENICS line 116, that is, a secured communications line (pipe), in addition to the Internet 117.

The host computer 111 is equipped with an RIS server 112 as software for providing a remote installation service. The user terminal 113 has, in addition to a WWW browser 114, a RIS client 115 as the software which uses a remote installation system.

Figure 5C:
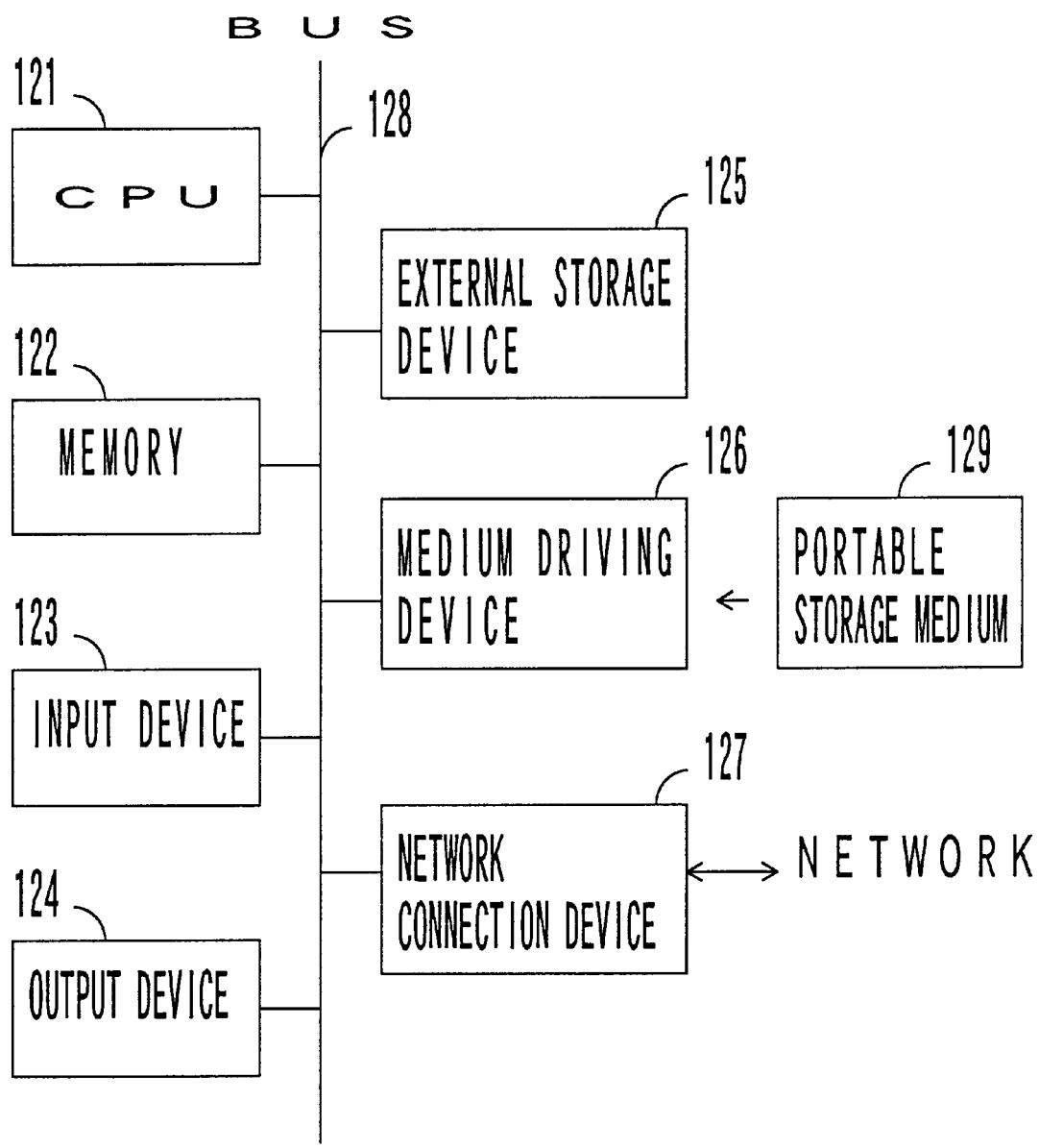
FIG. 5C shows the configuration of an information processing system.

FIG. 5C shows the configuration of the information processing device corresponding to the host computer 111 or the user terminal 113 shown in FIG. 5B. The information processing device shown in FIG. 5C comprises a central processing unit (CPU) 121, memory 122, an input device 123, an output device 124, an external storage device 125, a medium driving device 126, and a network connection device 127. These devices are interconnected via a bus 128.

The CPU 121 executes a program stored in the memory 122 to perform necessary processes for a service. The memory 122 can be, for example, a read-only memory (ROM), a random access memory (RAM), etc.

The input device 123 corresponds to, for example, a keyboard, a pointing device, etc. for use in entering a request and an instruction from a user. The output device 124 corresponds to a display device, printer, etc. for use in outputting information on a service screen, etc. The external storage device 125 can be, for example, a magnetic disk device, an optical disk device, a magneto-optical disk device, etc., to store a program and data. The external storage device 125 can also be used as a database.

The medium driving device 126 drives a portable storage medium 129 to access the data stored therein. The portable storage medium 129 can be any computer readable storage medium, for example, a memory card, a floppy disk, compact disk read-only memory (CD-ROM), optical disk, magneto-optical disk, etc. The portable storage medium 129 stores data and a program for performing a process of the system shown in FIG. 5B.

The network connection device 127 is used for connection to the FENICS line 116 and the Internet 117, and converts communications data, etc. The information processing unit transmits and receives data and programs through the network connection device 127.

According to the present embodiment, an entry procedure to the system (sign up) is necessarily followed through a secured pipe. In the sign-up procedure, the RIS server 112 assigns an encryption key for the Internet corresponding to a machine ID to the RIS client 115 together with a user ID/password and a machine ID/password. Using the encryption key, the password and the contents are enciphered/deciphered through the Internet.

Figure 2A:
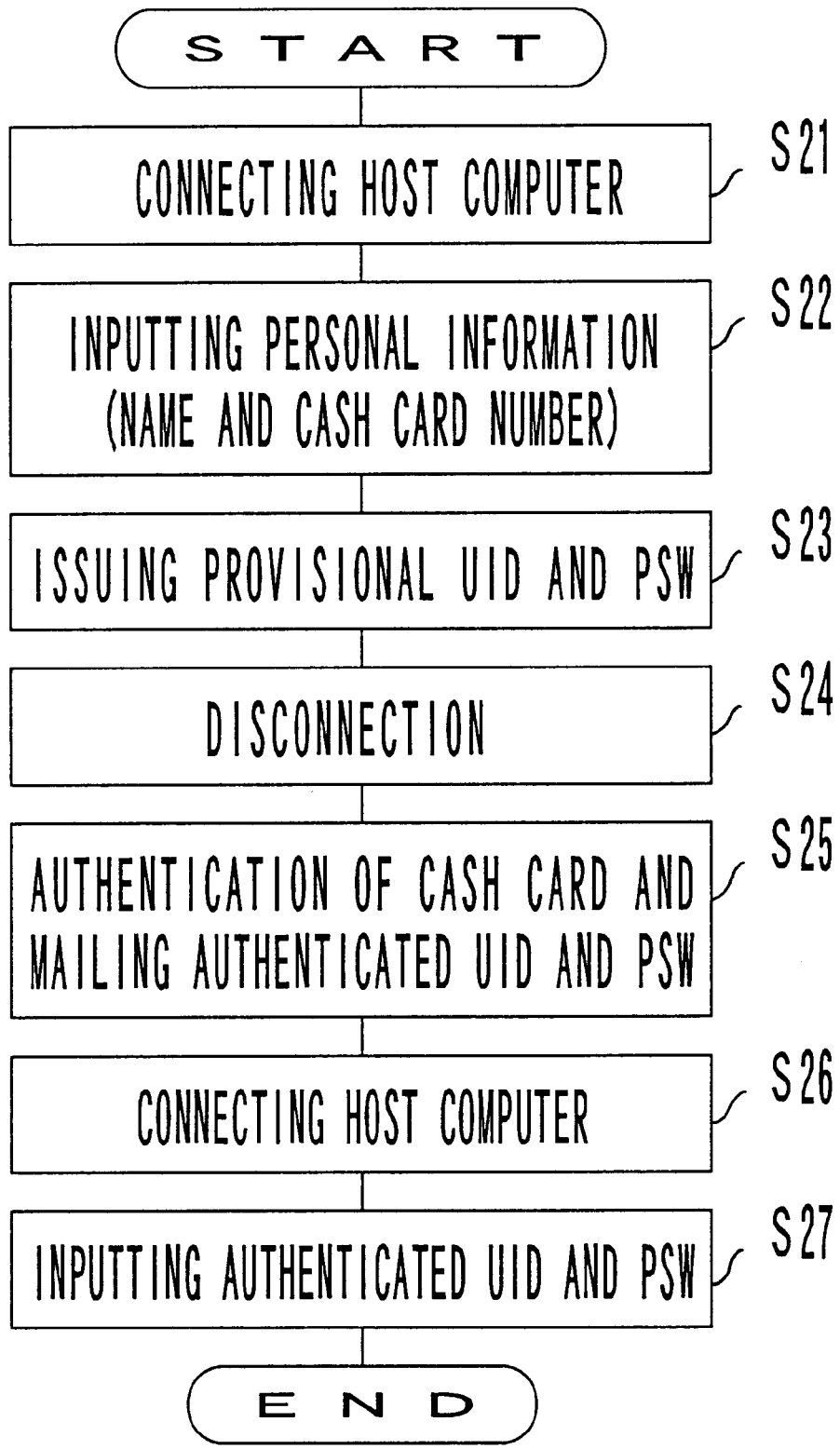
FIG. 2A is a flowchart of entering a user ID.
Figure 2B:
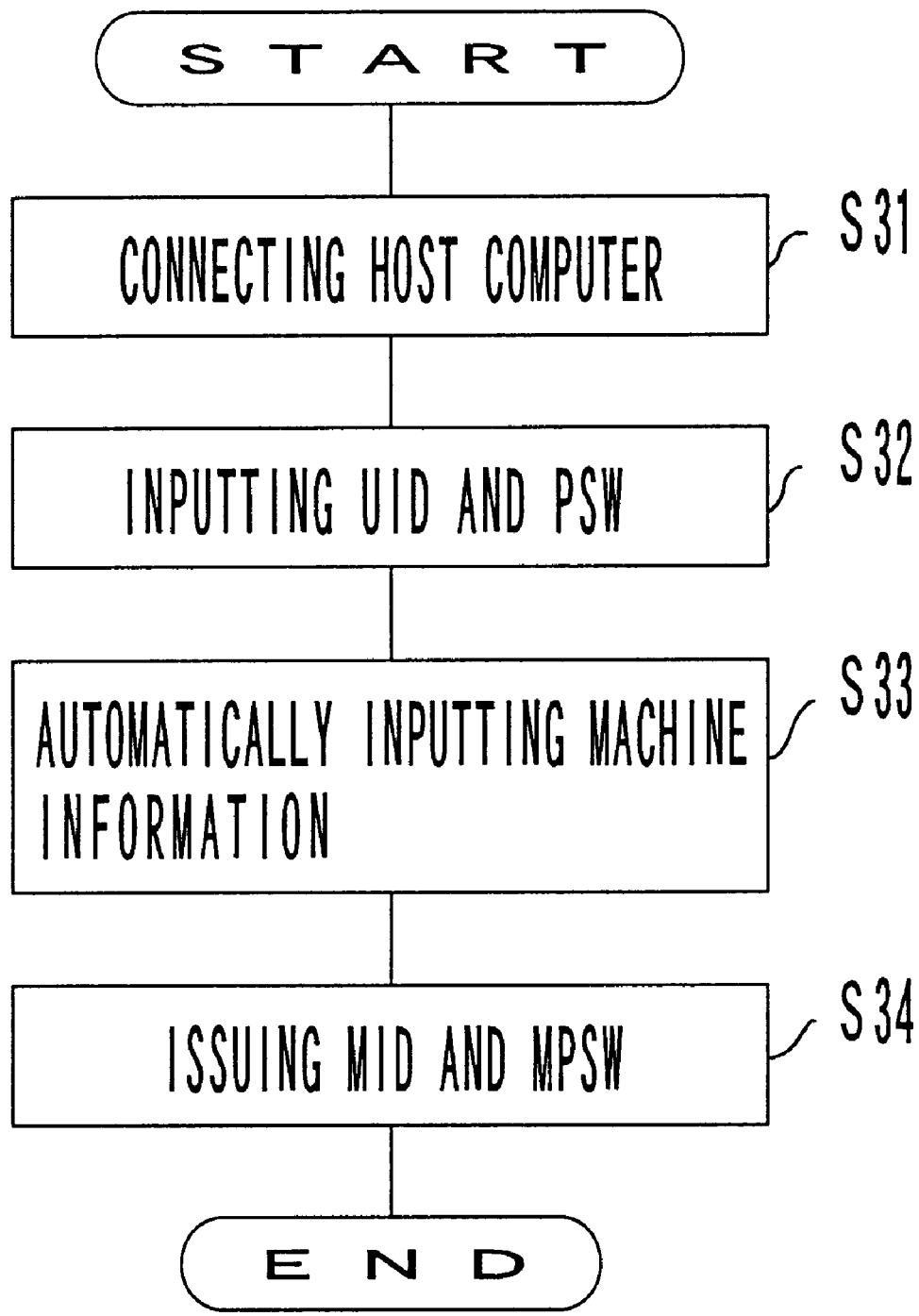
FIG. 2B is a flowchart of entering a terminal ID.
Figure 2C:
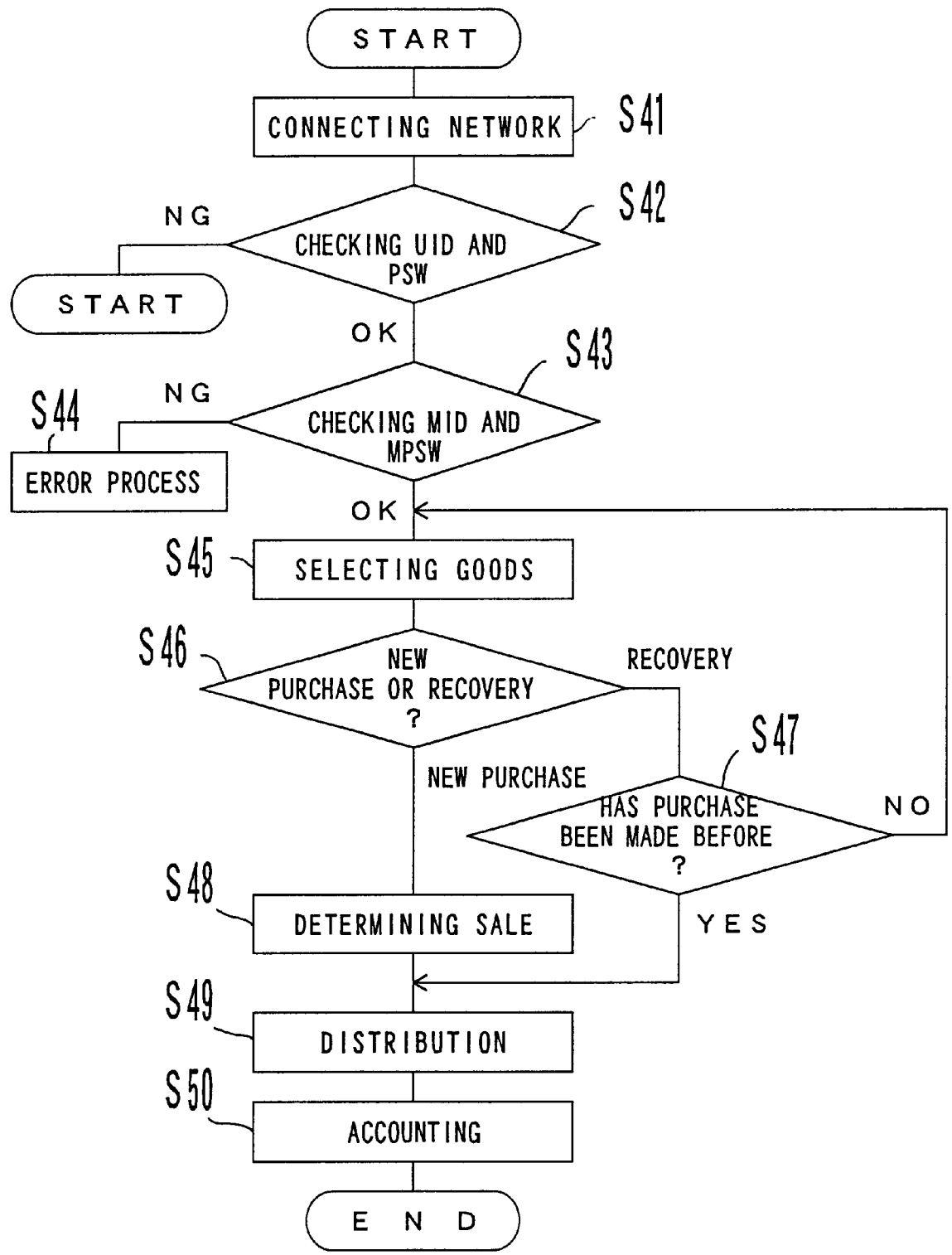
FIG. 2C is a flowchart for sales.
Figure 2D:
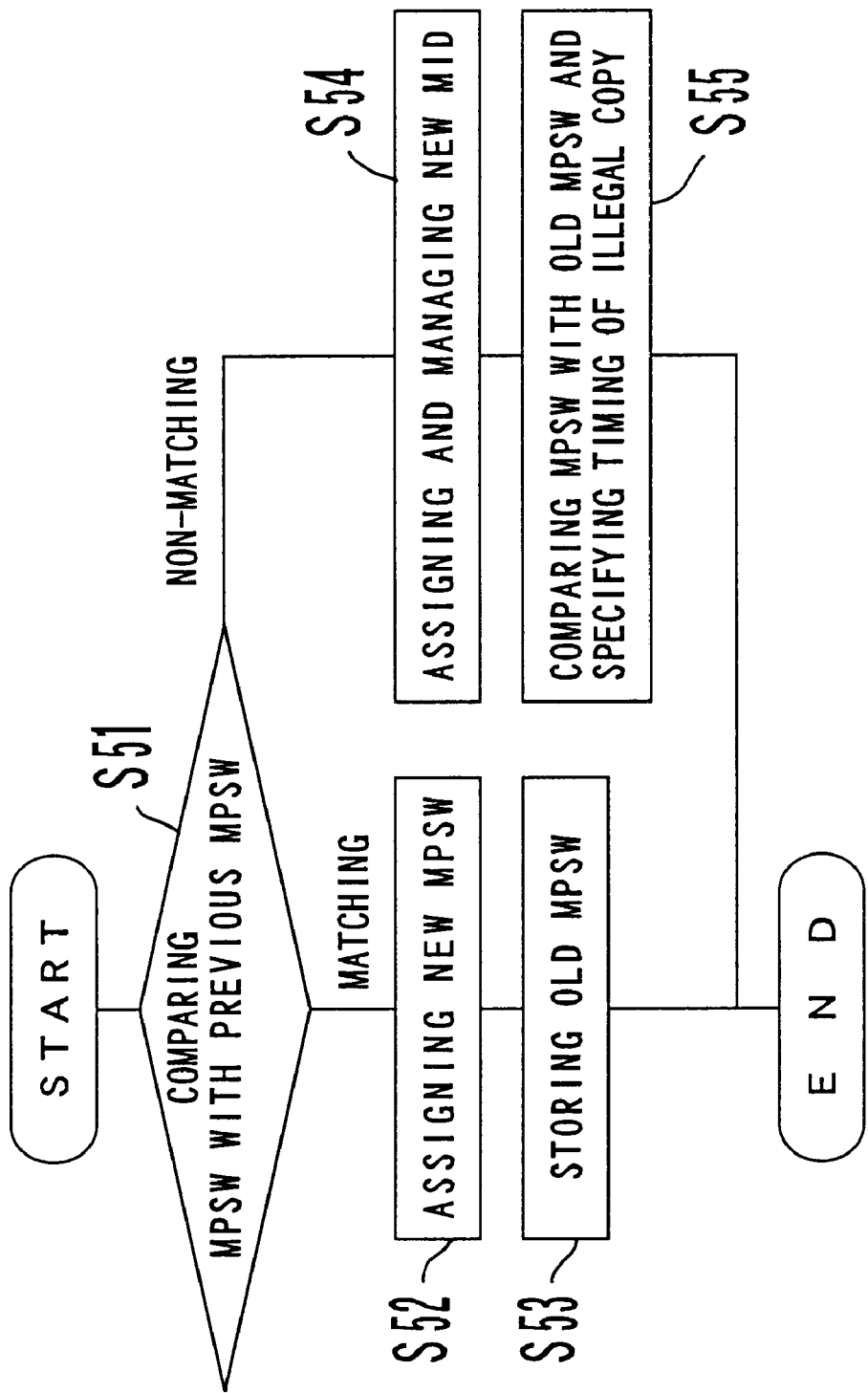
FIG. 2D is a flowchart of checking a terminal password.

To realize the above described services, the sequence shown in FIG. 6A is added to the sign-up sequence shown in FIGS. 2A and 2B. The RIS server 112 assigns a secret key uniquely corresponding to the user terminal (machine) 113 to the user terminal 113.

In FIG. 6A, when the RIS client 115 transmits the command RES_SENDENV to the RIS server 112 without the machine ID (MID), the RIS server 112 sends back a response by referring to a secret key database 131. The secret key database 131 preliminarily stores a correspondence table for MIDs and secret keys.

In this example, MID=1234, MPSWD=ASDF, KEY=9876 are returned as responses to the RIS client 115. Among these responses, KEY corresponds to a secret key. The RIS client 115 writes the received information to an initialization file 132 (RIS. INI) for storage.

Furthermore, the initialization file 132 also describes the address (domain name) for connection to the RIS server 112 through the Internet 117, and the port number of the transmission control protocol/internet protocol (TCP/IP) as shown in FIG. 6B.

This address and port number are written to the initialization file 132 of the user terminal 113 when the user is entered as an RIS member and the RIS client 115 is installed to the user terminal 113. Since the address information is stored by the RIS client 115, not in the Internet, the information is not hacked by users other than the members. Therefore, only the RIS members can access the RIS server 112.

Figure 6C:
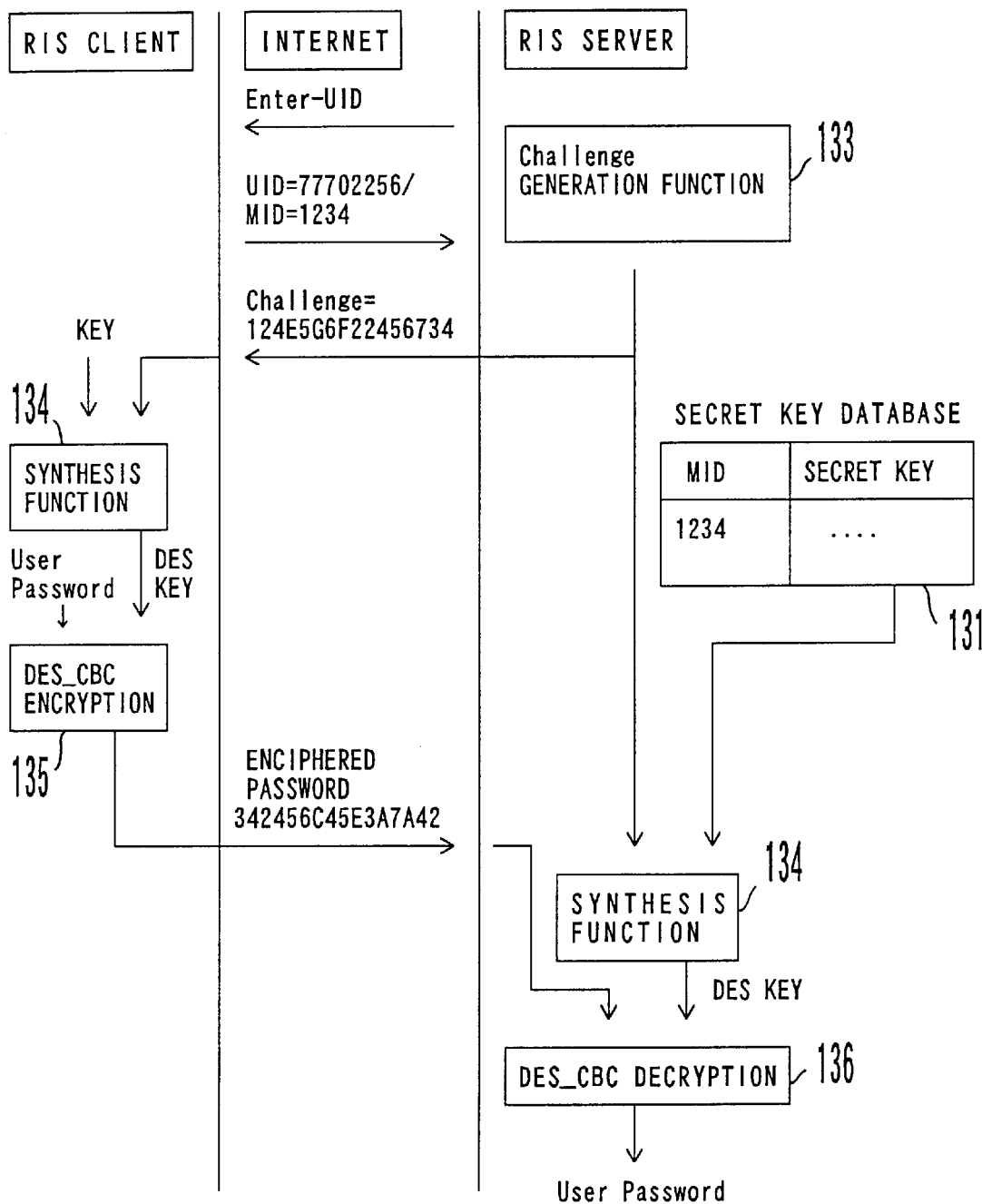
FIG. 6C shows the first log-in sequence.

The log-in is performed in the Internet 117 according to the address information in the sequence shown in FIG. 6C. Upon receipt of an instruction to input a user ID (UID) from the RIS server 112, the RIS client 115 first outputs a UID and an MID.

The RIS server 112 generates a different random number Challenge each time using a challenge generation function 133 and transmits it to the RIS client 115. The random number is transmitted as identification information for the RIS server 112. However, since the random number is different each time it is generated, unauthorized persons cannot hack them. Therefore, other servers cannot pretend to be an RIS server 112.

The RIS client 115 combines the Challenge transmitted from the RIS server 112 with the KEY obtained at the sign-up using a synthesis function 134, thereby generating an encryption key. The synthesis function 134 can be, for example, an exclusive OR (EOR). The encryption key is used as a secret key (DES key) of the data encryption standard (DES) algorithm, and a user password is enciphered by an encryption program 135, and is transmitted to the RIS server 112.

The RIS server 112 similarly synthesizes a DES key by combining the Challenge transmitted to the RIS client 115 with the KEY. A decryption program 136 then deciphers an enciphered user password to confirm the user password. Since the user password is transmitted after having been enciphered, the user password can be protected from being abused at the log-in through the Internet 117.

Figure 1B:
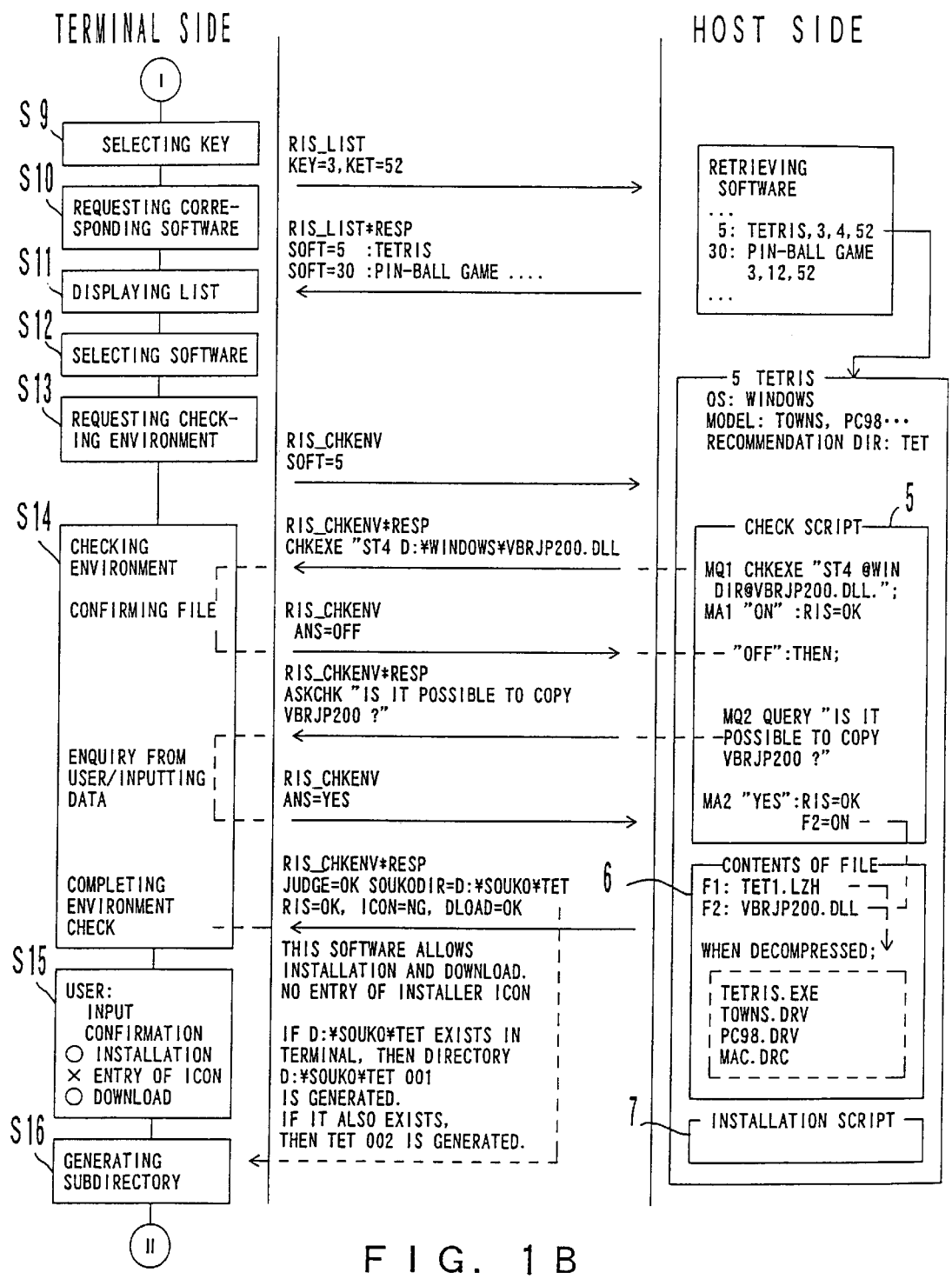
FIG. 1B is a flowchart (2) showing a remote installation system.
Figure 1C:
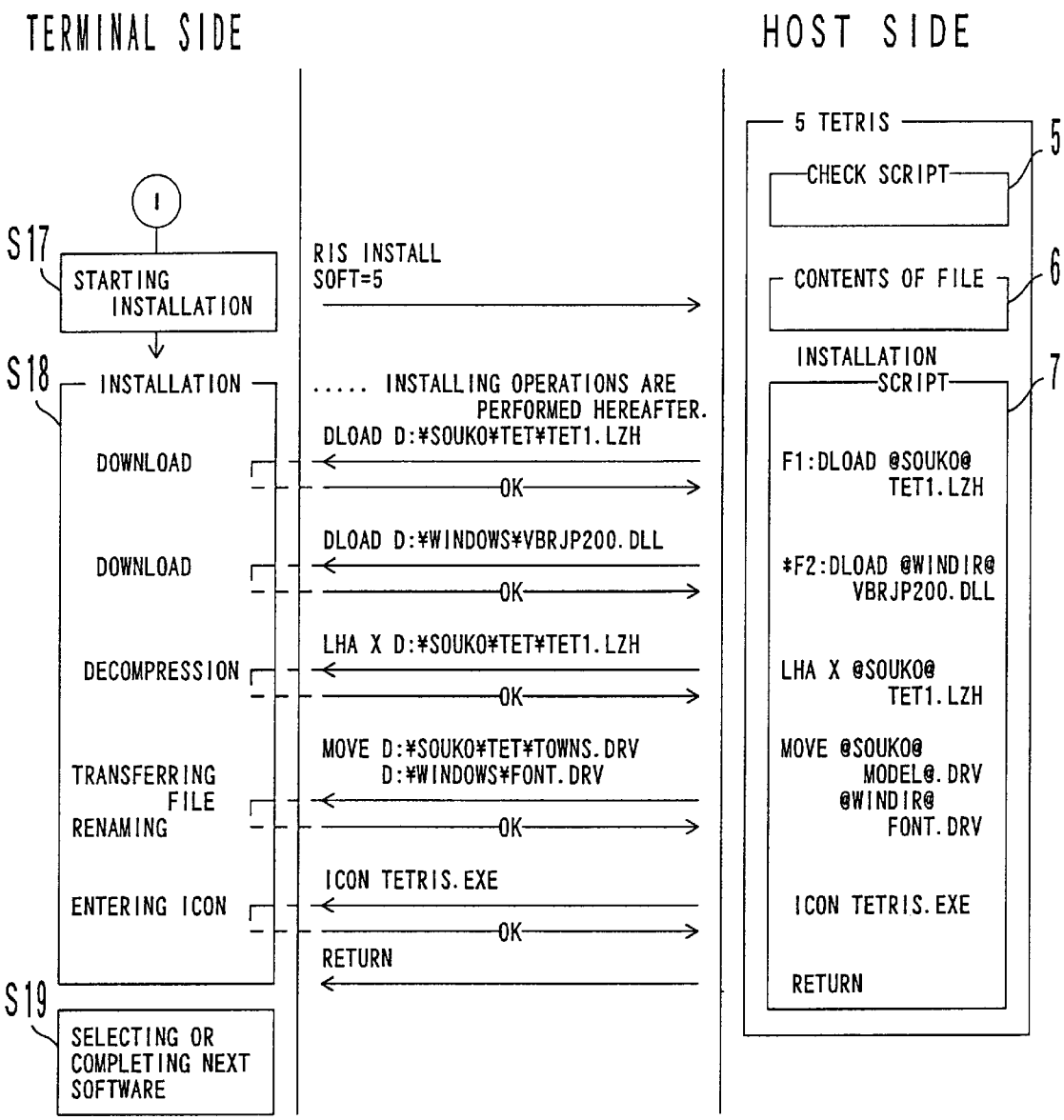
FIG. 1C is a flowchart (3) showing a remote installation system.

When the contents are distributed through the Internet 117, the conventional remote installation method shown in FIGS. 1A, 1B, and 1C is extended as shown in FIG. 7. First, when the RIS client 115 requests the distribution of the contents to be secured through the Internet 117, the RIS server 112 credits the charge.

Then, the RIS server 112 enciphers the compressed contents file ABC. LZH by the encryption program 135 using a secret key corresponding to an MID, downloads the enciphered file to the RIS client 115, and transmits a command for deciphering the enciphered contents file ABC. DES.

The RIS client 115 deciphers the contents file ABC. DES by the decryption program 136 using the stored KEY, and retrieves the file ABC. LZH. Then, it expands the file ABC. LZH according to the command from the RIS server 112 to generate an executable file ABC. EXE. Then, the ABC. DES and the ABC. LZH are automatically deleted.

Thus, a firm (secure) encryption algorithm such as a DES algorithm can be adopted by transmitting a secret key through a preliminarily secured communications line. The encryption algorithm can be any other algorithm using a secret key.

Described next is the remote installation system for distributing specified software by activating a helper application of a browser. In this system, the RIS client 115 is preliminarily entered as a helper application in the WWW browser 114. A helper application refers to a program that can be activated by the WWW browser 114 and can display a file in a format of a function not included therein.

An anchor file can be set on a home page to activate a helper. The user can click the anchor file pointed to by the pointing device, then the RIS client 115 is automatically connected to the RIS server 112, and specified software is distributed.

Figure 3B:
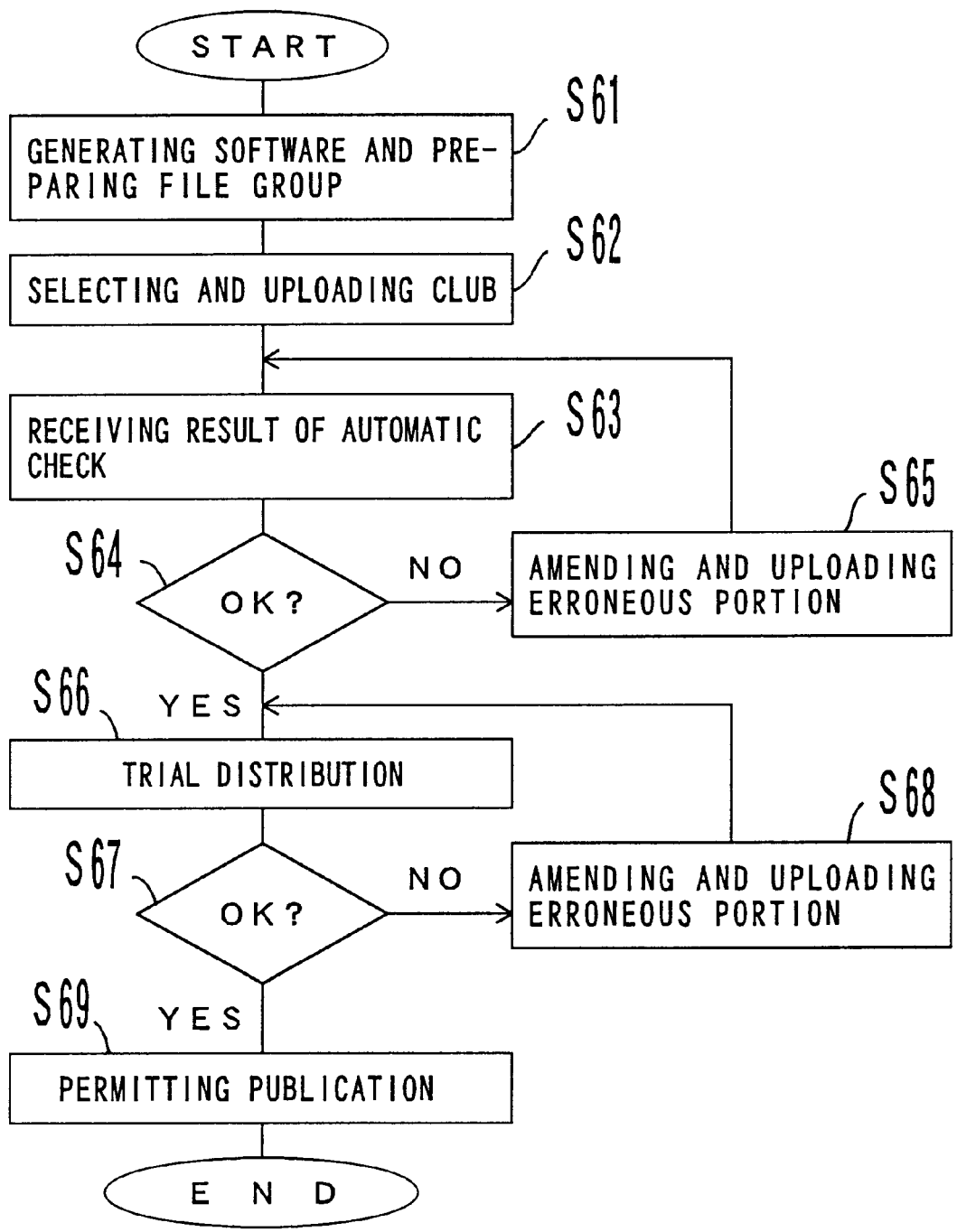
FIG. 3B is a flowchart showing the operation of a creator.
Figure 3D:
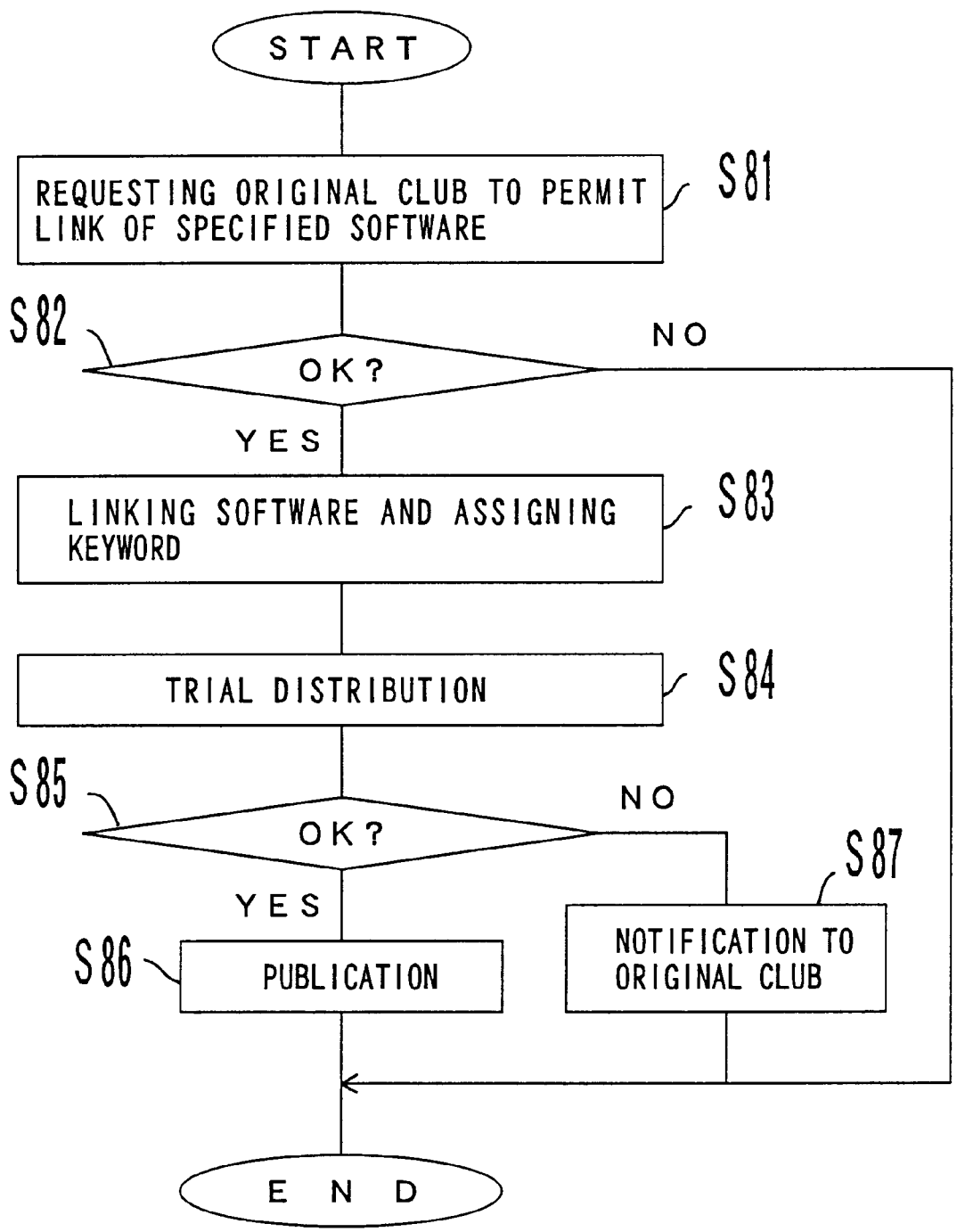
FIG. 3D is a flowchart showing the operation of the supervisor of a linked club.
Figure 4B:
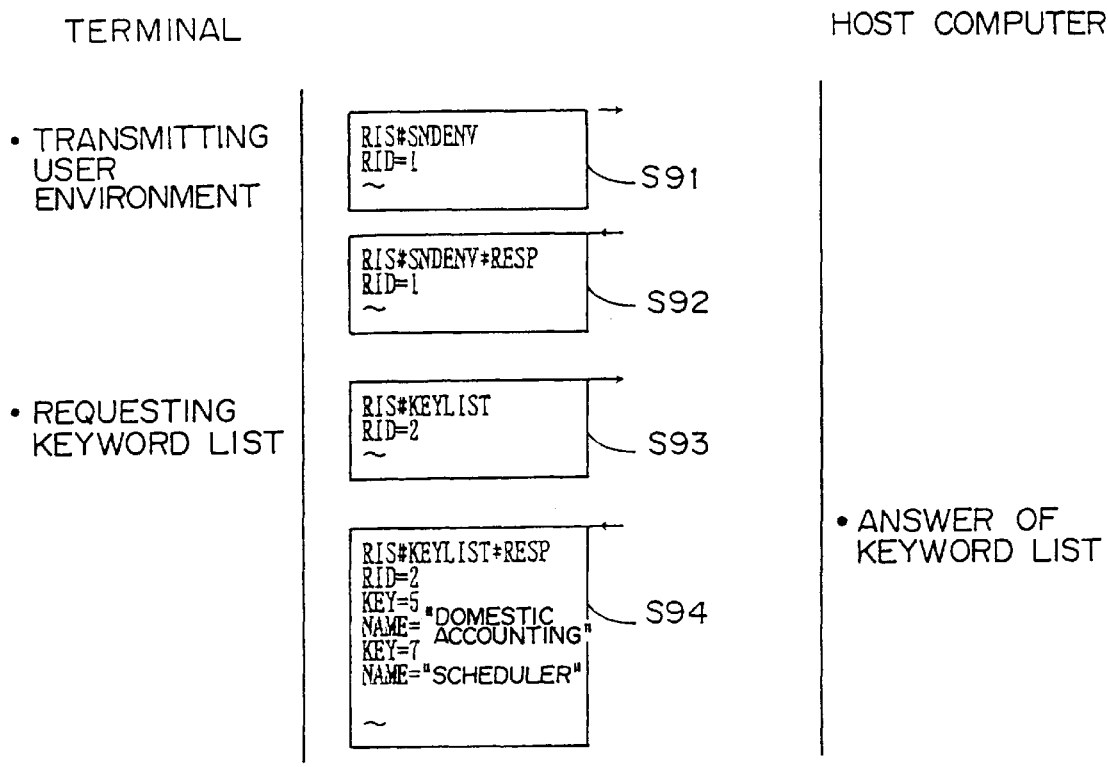
FIG. 4B shows the procedure (1) for shareware.
Figure 4C:
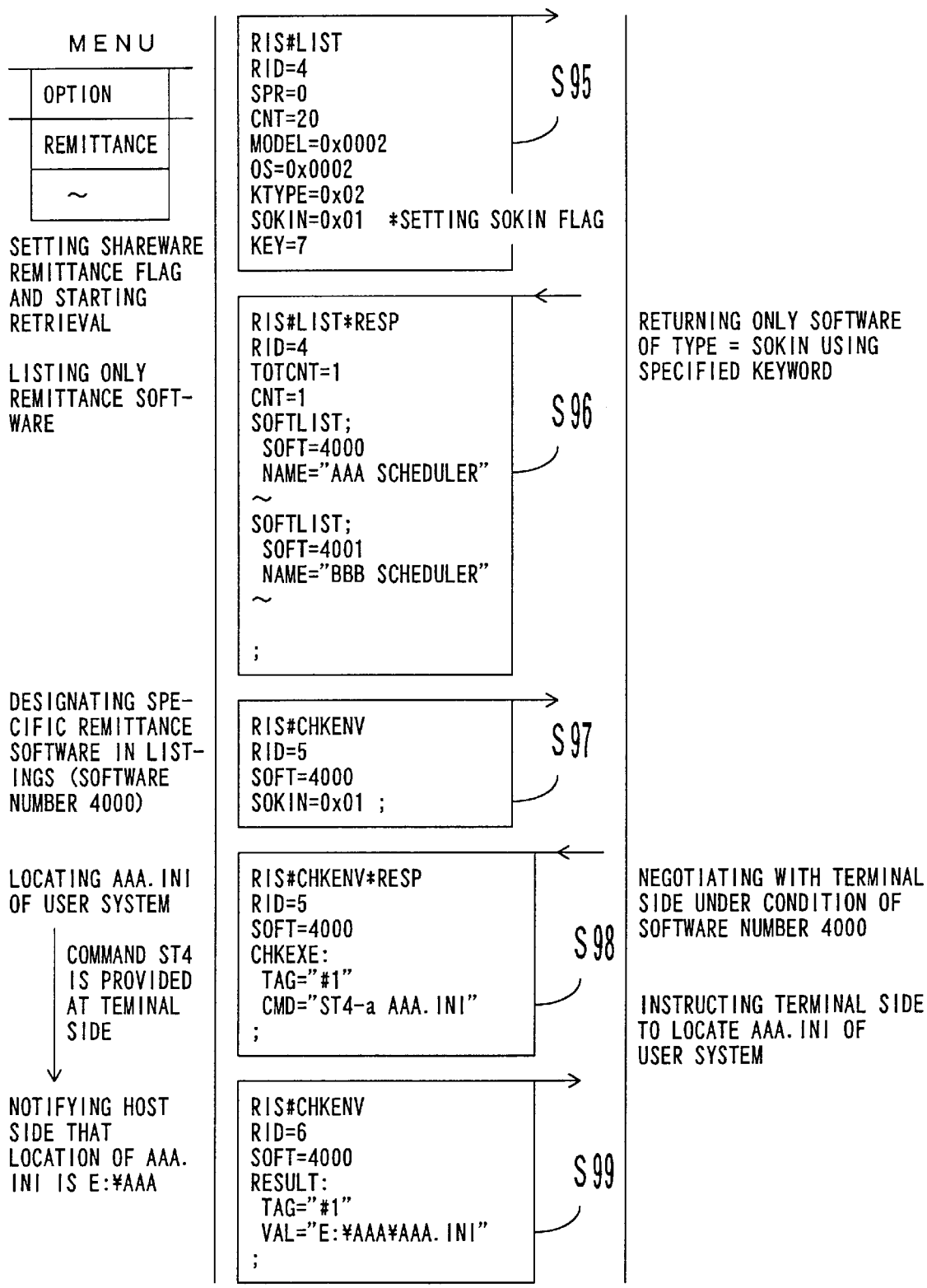
FIG. 4C shows the procedure (2) for shareware.
Figure 4F:
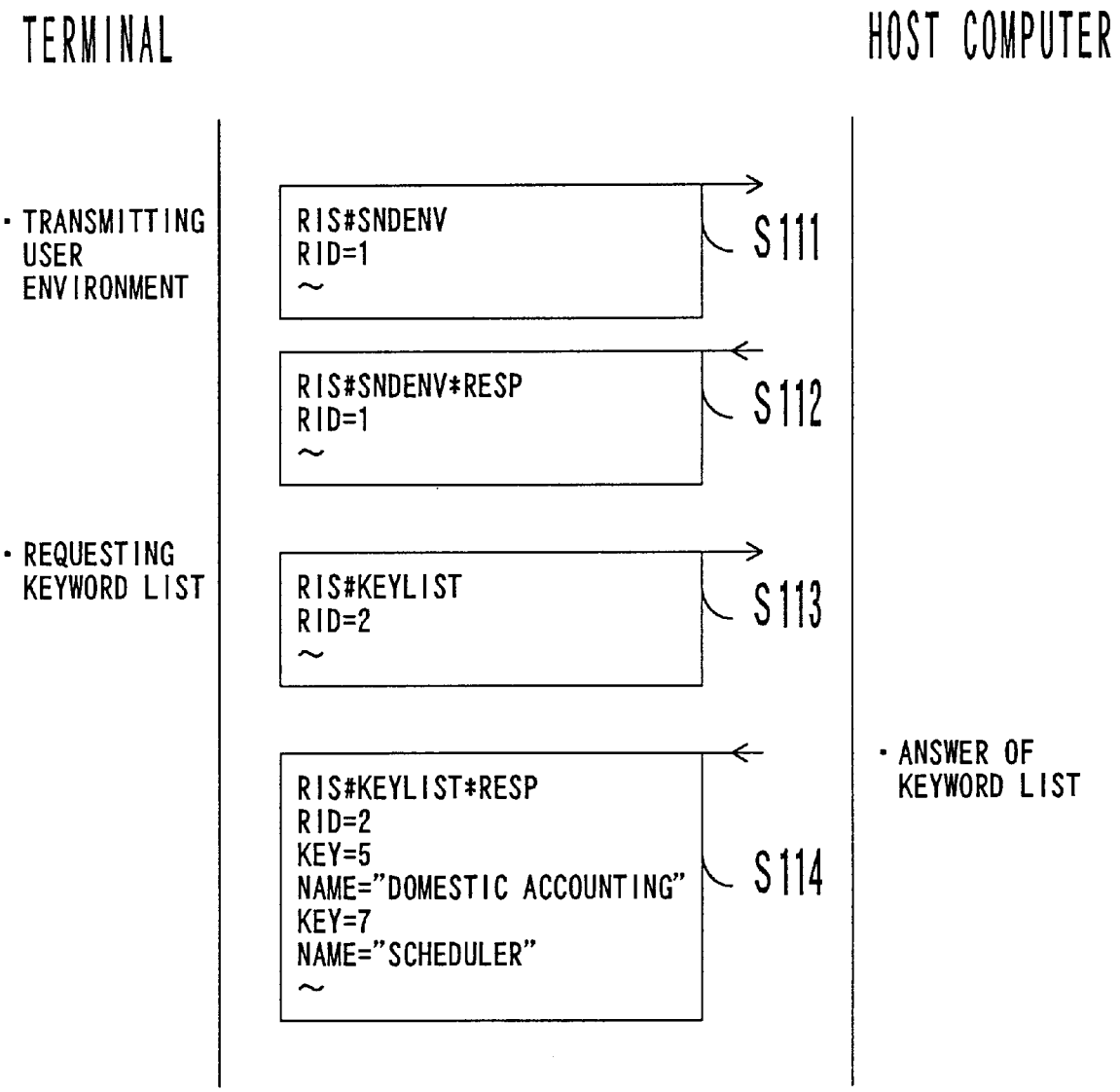
FIG. 4F shows the procedure (1) of withdrawing a charge.

FIG. 8 shows such a software distribution system on the Internet 117. A software creator 141, which is a vendor of software, opens a home page 142 in the Internet 117 to advertise the software developed by the software creator 141 (process P1). Simultaneously, the software developed by the software creator 141 is entered in the RIS server 112 by the above described method shown in FIGS. 3A and 3B.

The hypertext markup language (HTML) file forming part of the home page 142 is described as shown in FIG. 9. Thus, the name of software such as software for guessing a winning horse in a race, software for pin-ball games, etc., and the selection button (Ris icon) for accepting the distribution of the software are displayed. On this Ris button, an anchor file is set as a reference in order to activate a helper.

For example, an anchor file 144 (KEIBA. RIS) as shown in FIG. 10 is linked to an Ris icon 143 of the software for guessing a winning horse in a race. The name and the number of the software (soft) are written in the [RIS] section of the KEIBA. RIS.

The file type RIS corresponds to the multipurpose internet mail extensions (MIME) type application/x-ris to set the MIME for the WWW server in the anchor file 144. The MIME refers to a method of processing various file formats in the WWW. When the WWW browser cites the reference, a corresponding WWW server returns "application/x-ris" as a MIME type.

It is assumed that a user ID/password and a machine ID/password are assigned to a user as an RIS member in the method shown in FIGS. 2A, 2B, and 6A. The RIS client 115 is entered as a helper application in the WWW browser 114.

For example, if Netscape is used as the WWW browser 114, RIS is entered as a file type, and application/x-ris is entered as a MIME type. Simultaneously, C:¥RISW410¥RISWIN32¥RISANC32.EXE is entered as a Launch application for activating the RIS client 115.

Assume that, in this state, the user accesses the home page 142 (process P2), and clicks the Ris icon 143 adjacent to the software for guessing a winning horse in a race pointed to by the pointing device (process P3). At this time, the WWW browser 114 automatically activates the RIS client 115, and passes the contents of the file KEIBA. RIS to the RIS client 115 (process P4).

Figure 11:
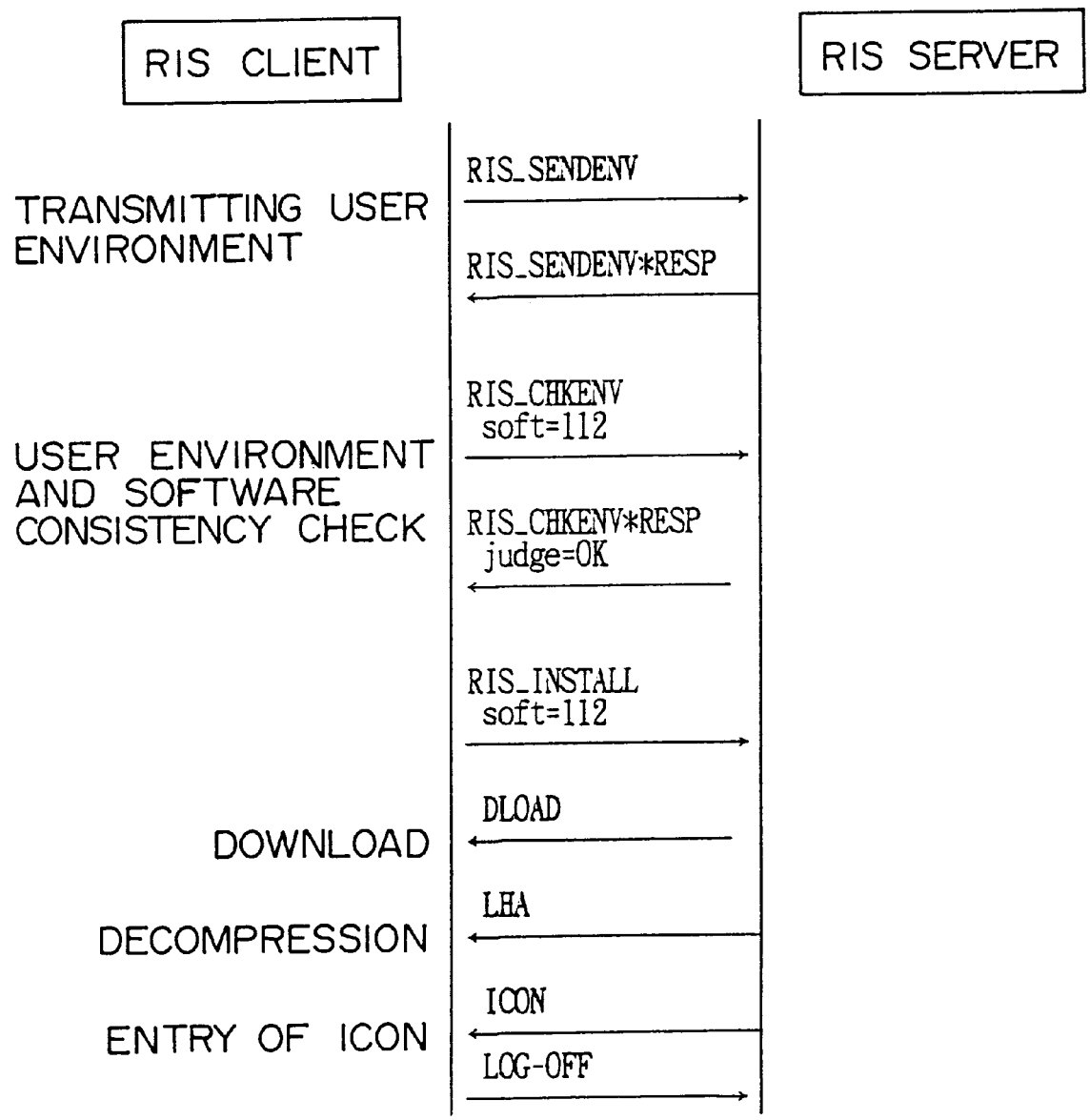
FIG. 11 shows the distribution of software.

The activated RIS client 115 is connected to the RIS server 112 in the method shown in FIG. 6C (process P5). After the log-in, the RIS server 112 distributes the software in the sequence similar to that shown in FIGS. 1A, 1B, and 1C as shown in FIG. 11. At this time, the software number extracted from the file KEIBA. RIS is transmitted from the RIS client 115 to the RIS server 112, and the corresponding software is automatically distributed to the user terminal 113.

After the above described operation, the purchase history described on the purchase table shown in FIG. 12 and the payment table shown in FIG. 13 remain the database in the RIS server 112. Thus, the RIS server 112 collects the charge from the purchaser through a credit company by referring to the purchase table, and pays the charge to the vendor by referring to the payment table (process P6).

Thus, the software distribution system can be realized through the Internet 117 by entering the RIS client 115 as a helper application activated by the WWW browser 114. Instead of entering the RIS client 115 as a helper, the RIS client 115 can be entered as a plug-in (application in the browser window) of the WWW browser 114.

Described below is an online shopping system by which goods can be easily purchased by activating the helper application of the browser. In this system, the RIS client 115 is entered as a helper in the WWW browser 114, and an anchor file is provided on a home page to activate the helper.

If the user clicks the anchor file with the pointing device, then the RIS client 115 is automatically connected to the RIS server 112, and the RIS server 112 automatically performs an accounting process on specified goods and issues a purchase report to the vendor. In response to the report, the vendor sends the goods to the user.

FIG. 14 shows such an online shopping system. An α shop 151, which is a vendor, opens a home page 152 through the Internet 117 and advertises the goods such as a set of towel, handkerchiefs, etc. sold by the α shop 151. Simultaneously, the software for purchasing goods is entered in the RIS server 112 in the method shown in FIGS. 3A and 3B (process P12).

The HTML file on the home page 152 is described in the format similar to the format shown in FIG. 9, and the Ris icon required to select/purchase goods is displayed on the home page 152 (process P13). Setting an anchor file linked to each Ris icon and a MIME, etc. at the user side is similar to that of the above described software distribution system. For example, an anchor file 154 (TOWEL. RIS) is linked to an Ris icon 153.

In this state, assuming that the user accesses the home page 152 of the α store (process P14), and clicks the Ris icon 153 adjacent to the towel set pointed to (process P15). At this time, the WWW browser 114 activates the RIS client 115 entered as a helper, and transmits the contents of the TOWEL. RIS to the RIS client 115 (process P16).

The activated RIS client 115 is connected to the RIS server 112, logs in using an enciphered password, and starts an entered remote installing process (RIS_INSTALL) (process P17). The settings and procedure at the log-in are similar to those of the above described software distribution system.

In the initiated remote installing process, the descriptions of the script should be prepared to set different operations from the distribution of software. Practically, in this case, the process of transmitting a reception slip to the user and the process of transmitting a purchase notification to a vendor are described instead of the software distributing process. The destination of the goods should be specified by a user as necessary.

The reception slip is transmitted to the user in the method similar to that in which software is downloaded (process P18). The purchase notification is transmitted to the vendor as a notification slip of a prescribed format through electronic mail or a private line (process P18). The process of transmitting a purchase notification is the process of accepting an order of products at a vendor side. The purchase notification transmitting process is immediately performed during the remote installation process.

Figure 15:
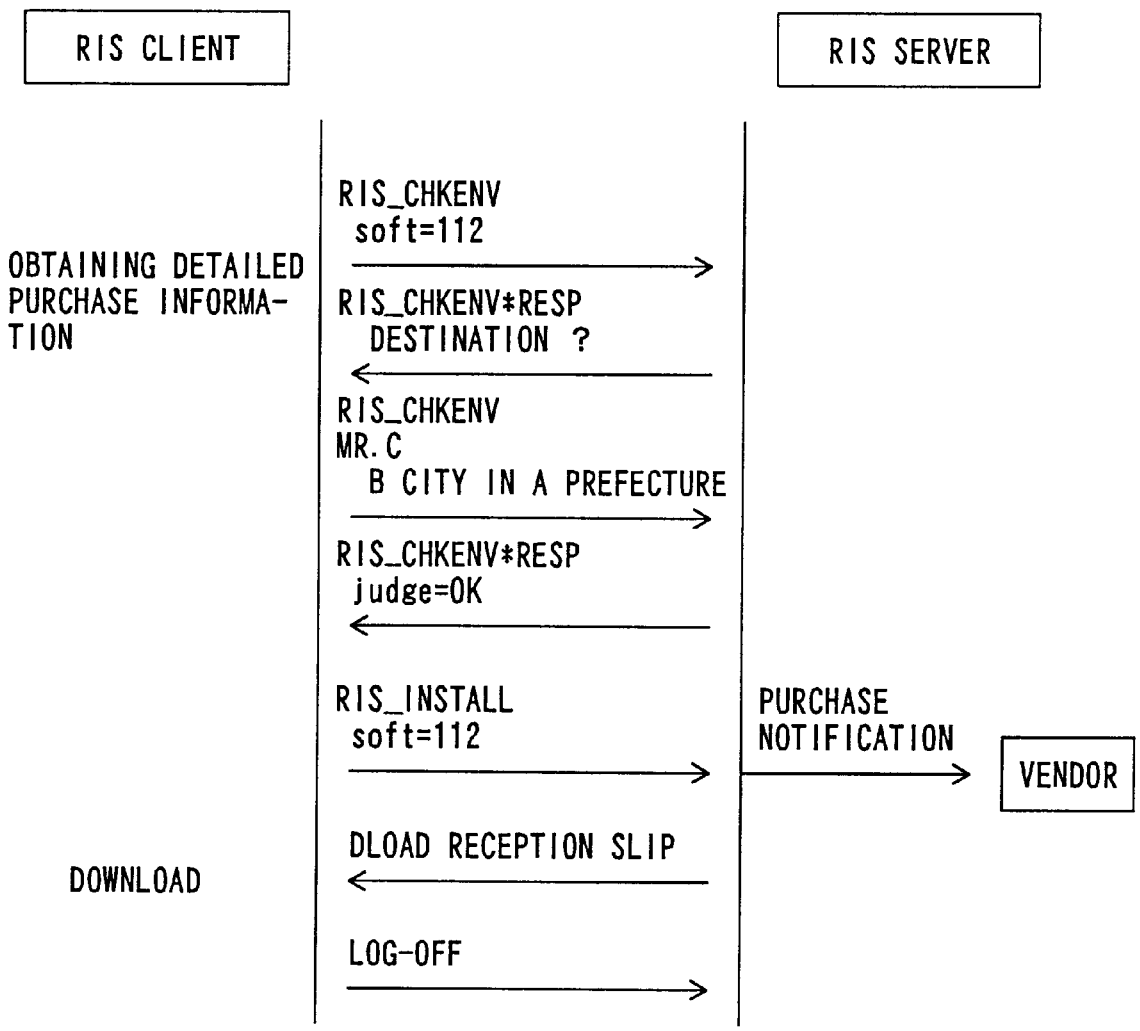
FIG. 15 shows the reception slip/purchase notification sending process.

FIG. 15 shows the sequence of the transmitting process. First, the RIS client 115 transmits the software number extracted from the file TOWEL. RIS to the RIS server 112 as the number of the product to be ordered. At this time, the command RIS_CHKENV is issued.

Next, when the RIS server 112 inquires the user of the delivery destination of the goods in response to the order, the user inputs desired address and name. The input destination is transmitted to the RIS server 112 using the command RIS_CHKENV. If the RIS server 112 returns OK, the RIS client 115 sends the command RIS_INSTALL.

At this time, the RIS server 112 downloads the reception slip, and transmits the purchase notification to the vendor. When the vendor receives the purchase notification, it delivers the products to the user in a predetermined method (process P19). When the process shown in FIG. 15 terminates, the purchase table and the payment table are generated as shown in FIGS. 12 and 13. Therefore, the RIS server 112 collects the charge from the user based on the above described tables and pays the charge to the vendor (process P20).

Thus, an online shopping system can be realized through the Internet 117 by entering the RIS client 115 as a helper application activated by the WWW browser 114. Furthermore, the RIS client 115 can also be entered as a plug-in of the WWW browser 114.

Since user information is preliminarily entered as an RIS member in this system, the user only has to press the button for desired goods when the user purchases goods. Therefore, the user can buy goods in a very simple and easy online shopping method. Furthermore, a destination which is different from a contact address of the user can be individually specified. For example, goods can be distributed as a present for a specified person.

An RIS center can manage a part of the operations related to the sales as an out-sourcing function. Therefore, when goods are sold only to RIS members, the vendor has no trouble of setting up a contract, etc. with each credit card company.

Described next is the online communications service system for notifying of a specific password by activating the helper application of a browser. In this system, the RIS client 115 can be entered as a helper in the WWW browser 114 and an anchor file is provided to activate a helper on a home page.

When the user clicks the anchor file with the pointing device, the RIS client 115 is automatically connected to the RIS server 112. The RIS server 112 performs an accounting process on a specified communications service, provides a purchase report for a vendor, and notifies the user of a password for use of services. The user inputs the password on the screen of the WWW browser 114 to receive the service.

Figure 16:
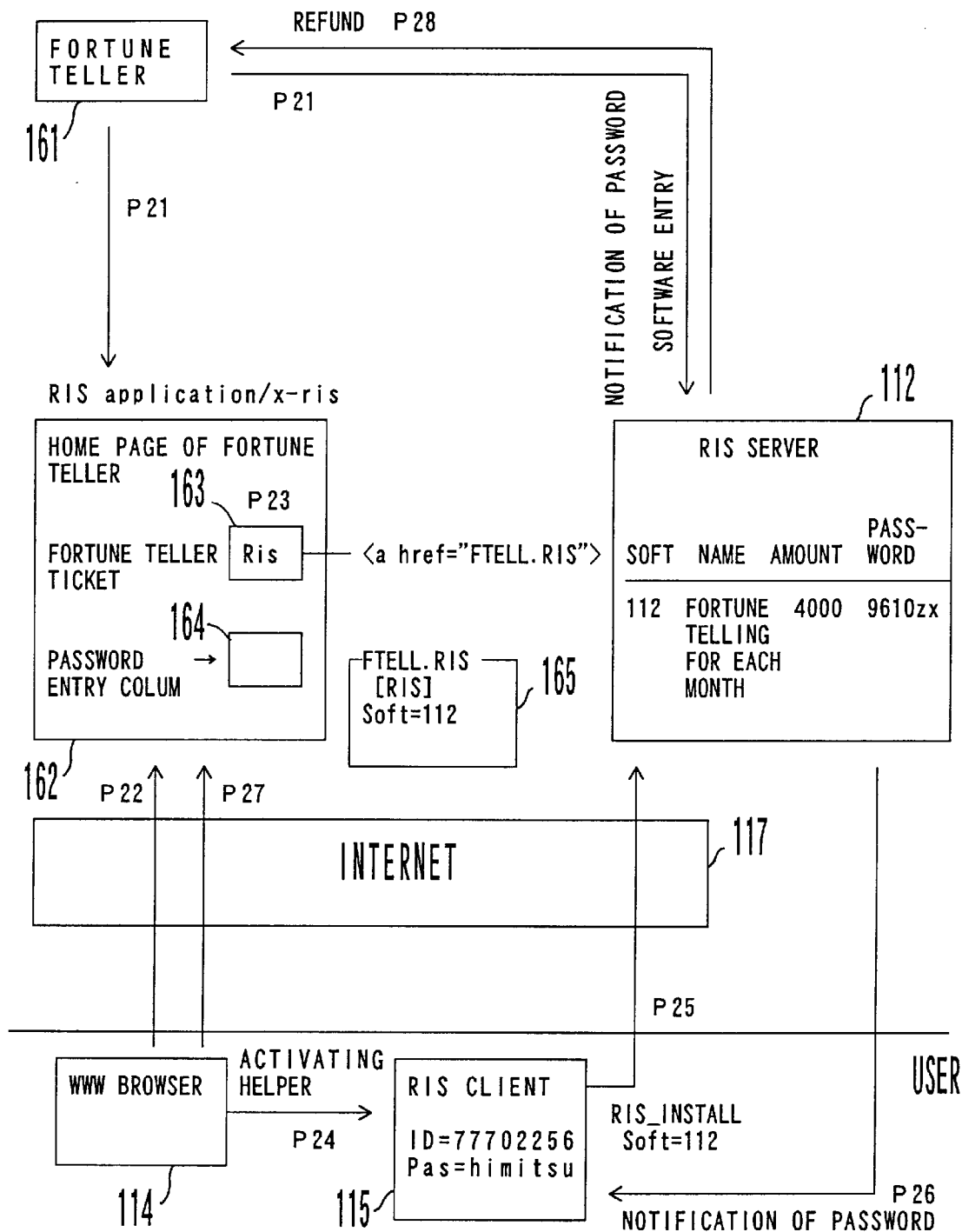
FIG. 16 shows an online communications service system.

FIG. 16 shows the online communications service system. A fortune teller 161 is a vendor of the communications service and opens a home page 162 through the Internet 117 to use it as a reception screen of a fortune telling service from the fortune teller 161 (process P21). The password information, which is a ticket of a use right for a fortune telling service, is entered in the RIS server 112 as a notification to the user in the method shown in FIGS. 3A and 3B (process P21).

The HTML file of the home page 162 is described as shown in FIG. 17. Thus, an Ris icon 163 corresponding to the fortune teller ticket, and a password entry column 164 are displayed. An anchor file 165 (FTEL. RIS) for activating a helper is set as a reference in order to activate a helper in the Ris icon 163.

The [RIS] section of the file FTELL. RIS describes the service name and the software number (Soft) of a fortune telling service as shown in FIG. 18. The software number is used as a service identification number.

The setting of the MIME of the WWW server in the anchor file 165 is the same as that in the above described software distribution system. Thus, when the WWW browser 114 cites the reference, the corresponding WWW server returns application/x-ris as the type of MIME.

As in the above described software distribution system, it is assumed that the user is assigned a user ID/password and a machine ID/password as an RIS member. Furthermore, the RIS client 115 is entered as a helper application in the WWW browser 114.

In this state, assume that the user accesses the home page 162 of the fortune teller (process P22), and clicks the Ris icon 163 adjacent to the fortune teller ticket pointed to by the pointing device (process P23). At this time, the WWW browser 114 activates the RIS client 115, and passes the contents of the file FTELL. RIS to the RIS client 115 (process P24).

The activated RIS client 115 is connected to the RIS server 112 and logs in using an enciphered password. The sequence of the log-in through the Internet 117 and the settings for use of the RIS client 115 are the same as in the method shown in FIGS. 6A, 6B, and 6C.

After the log-in, the RIS client 115 transmits the software number described in the file FTELL. RIS to the RIS server 112 (process P25), and the RIS server 112 performs an accounting process on the purchase amount for the service specified by the number. Then, a password identifying the service purchaser is provided for the user (process P26).

Figure 19:
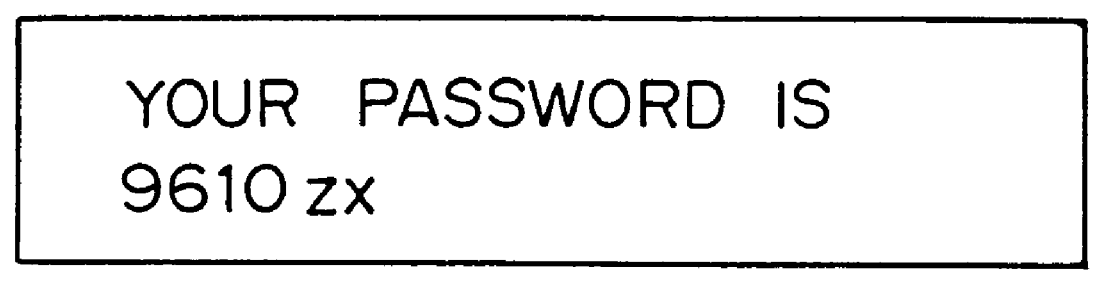

The notification of a password is issued from the RIS center to the user, and is realized by, for example, displaying the screen as shown in FIG. 19 on the user terminal 113 in the format of a message box.

The user can receive a fortune telling service through the corresponding WWW server by inputting the received password to the password entry column 164 displayed on the home page 162 (process P27). Therefore, the WWW server for providing a fortune telling service has the function of confirming the service use right by obtaining the value in the password column.

Figure 20:
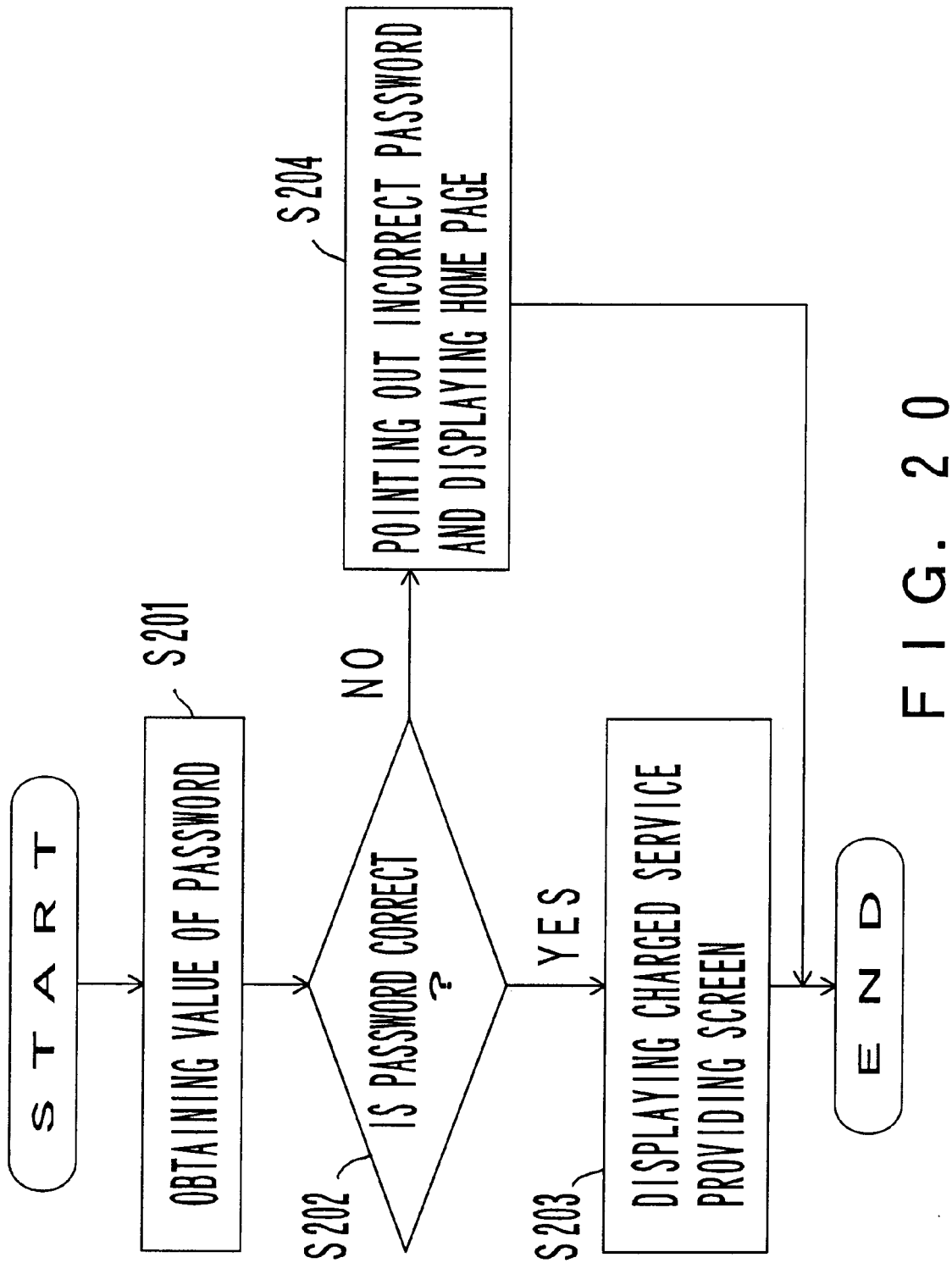
FIG. 20 is a flowchart of the process of confirming the right to use services.

To realize the function, the script file ura. cgi of the common gateway interface (CGI) described in the HTML file shown in FIG. 17 is used. The file ura. cgi describes the logic of confirming the service use right as shown in FIG. 20.

When the confirming process starts, the CGI process in the WWW server first obtains an input password value (step S201), compares the value with the password entered in the RIS server 112, and determines whether or not the password is correct (step S202).

If the password is correct, then the user is assumed to be imposed with a charge, and the fortune telling service providing screen is displayed (step S203) with charge, thus terminating the process. Unless the password is correct, an error pointing out message is displayed on the home page 162 (step S204), and the process terminates.

A method of processing a password in the above described communications service can be followed by assigning a common password to all users. To prevent a password from being revealed among users or illegally used by guessing any password, or to limit the period in which services are provided, a password can be altered at predetermined time intervals (every several minutes, hours, days, etc.), or a unique password can be assigned to each user. These password protecting methods can also be used in combination.

Furthermore, a password can be dynamically generated using a specific computation algorithm at the entry in the RIS server 112 without using a password as fixed information.

According to the above described operations, the service purchase history as shown in FIGS. 12 and 13 remains in the database of the RIS server 112. Based on the service purchase history, the purchase expenses are determined in a procedure similar to that in the above described software distribution system (process P28).

Thus, an online communications system can be realized through the Internet 117 by entering the RIS client 115 as a helper applications activated by the WWW browser 114. The RIS client 115 can also be entered as a plug-in of the WWW browser 114.

In the system shown in FIG. 16, a user is allowed to have the right to use a communications service by obtaining a password. Or, a user can also be notified of a uniform resource locator (URL) to receive a service. A URL refers to identification information uniformly representing the resources in a network.

In this case, the RIS server 112 notifies the user of the URL of the communications service after an accounting process. The URL is set to be disclosed to a user who has finished an accounting process. For example, if the URL is frequently altered, the user has to buy a ticket to know the latest URL.

Figure 21:
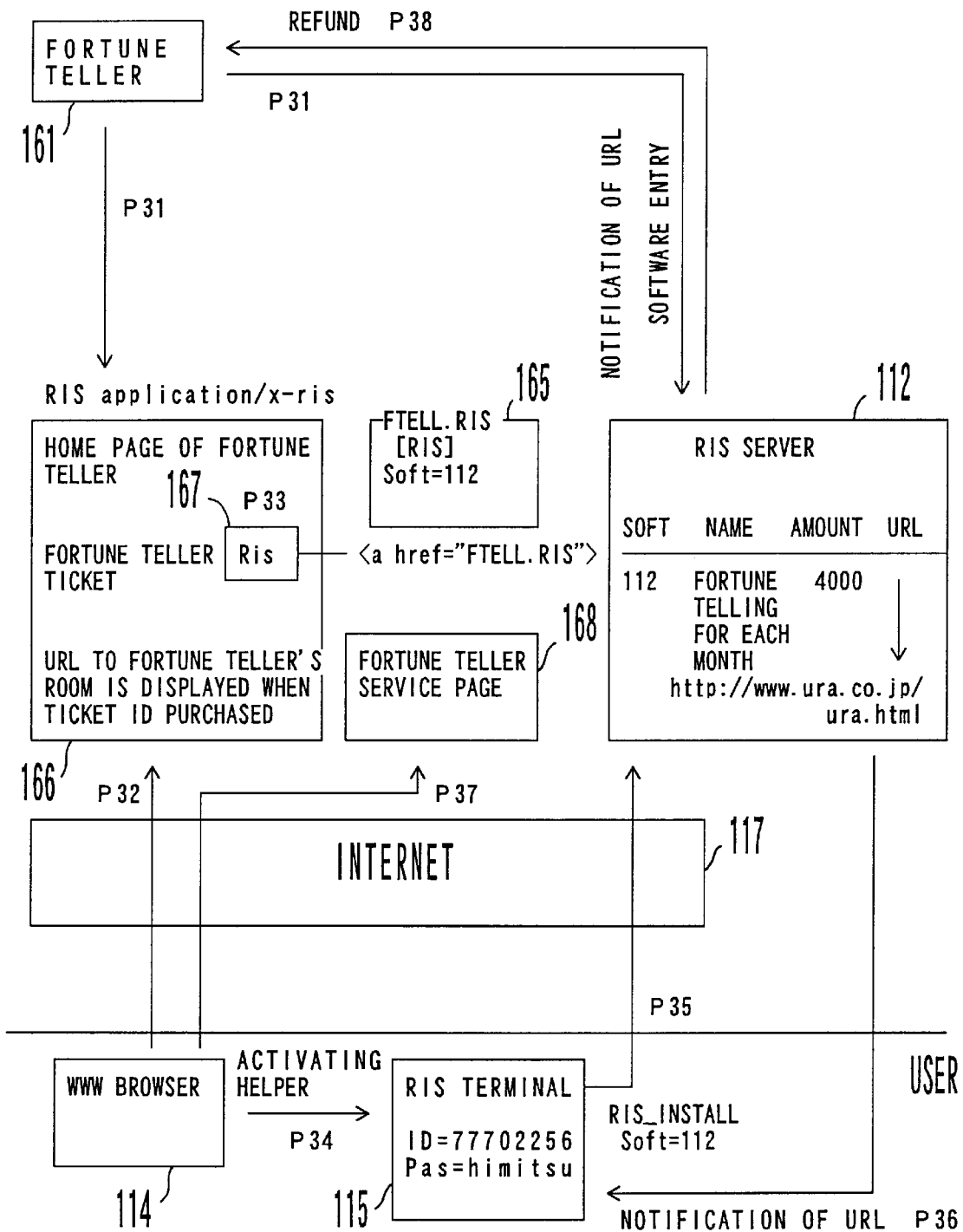
FIG. 21 shows the communications service system for giving a notification of a URL.

FIG. 21 shows such communications service system. The operations of the system is basically the same as those of the system shown in FIG. 16. First, the fortune teller 161 opens a home page 166 through the Internet 117, and sets the home page 166 as a reception screen of the fortune teller 161 (process P31). Furthermore, the URL information which is a fortune teller ticket is entered in the RIS server 112 in the method shown in FIGS. 3A and 3B (process P31).

On the home page 166, an Ris icon 167 corresponding to a fortune teller ticket and a message "When a user buys the ticket, the URL is displayed to enter the fortune teller's." are displayed. The anchor file 165 (FTELL. RIS shown in FIG. 18) for activating a helper is set in the Ris icon 167 to activate a helper.

Assume that the user has accessed the home page 166 (process P32), and has clicked the Ris icon 167 adjacent to the fortune teller ticket pointed to by the pointing device (process P33). At this time, the WWW browser 114 activates the RIS client 115, and transmits the contents of the file FTELL. RIS to the RIS client 115 (process P34).

The activated RIS client 115 is connected to the RIS server 112, logs in using an enciphered password, and transmits the software number described on the file FTELL-.RIS to the RIS server 112 (process P35). The RIS server 112 performs an accounting process for the purchase amount of the service specified by the number, and then notifies the user of the URL on a fortune telling service page 168 (Process P36). The URL is notified of using the message box similar to that shown in FIG. 19.

The user accesses the fortune telling service page 168 and receives the service by specifying on the WWW browser 114 the URL to the fortune telling service informed of through the notification (process P37).

In the system shown in FIG. 21, the browser for referring to a URL can be automatically activated instead of notifying the user of the URL. In this case, the service screen corresponding to the URL can be accessed by activating the browser by software using a URL notification from the RIS center as a trigger without a direct input of the URL by the user.

If an already activated WWW browser 114 can automatically obtain a specified URL using an external event according to the implementation of the WWW browser 114, then the RIS client 115 notifies the WWW browser 114 of the URL in a readable format. The method can be realized by, for example, writing a URL to a specified file in the WWW browser 114, and transmitting a software signal to the active WWW browser 114.

For example, with WIN95 (Windows 95), the file WORK. URL as shown in FIG. 22 is generated. The URL notified of by the RIS server 112 is written to the file WORK. URL depending on the type of browser such as mosaic, NETSCAPE, etc.

The RIS client 115 starts up the WWW browser 114 using the application programming interface (API) of WIN95. An API refers to a programming interface provided by the operating system.

The API in this case is described as, for example, ShellExecute ("WORK. URL",). Thus, the WWW browser 114 automatically obtains the URL from the file WORK. URL and accesses a corresponding service screen.

When the WWW browser 114 cannot automatically obtain the specified URL through software in the above described method, a predetermined URL is provided as an initial URL argument to independently activate the WWW browser 114 from the RIS client 115. If it is disadvantageous for a plurality of WWW browsers to be simultaneously operating in parallel, then the WWW browser 114 that has been operated is stopped, and then activated again later.

Described below is the transaction process system comprising a transaction helper and an RIS system. In this system, a transaction helper is provided and a transaction use right is entered in the RIS system. When the RIS system activated as a helper works in cooperation with another helper used for a transaction, a transaction use right distributing process and an accounting process are performed.

Figure 23:
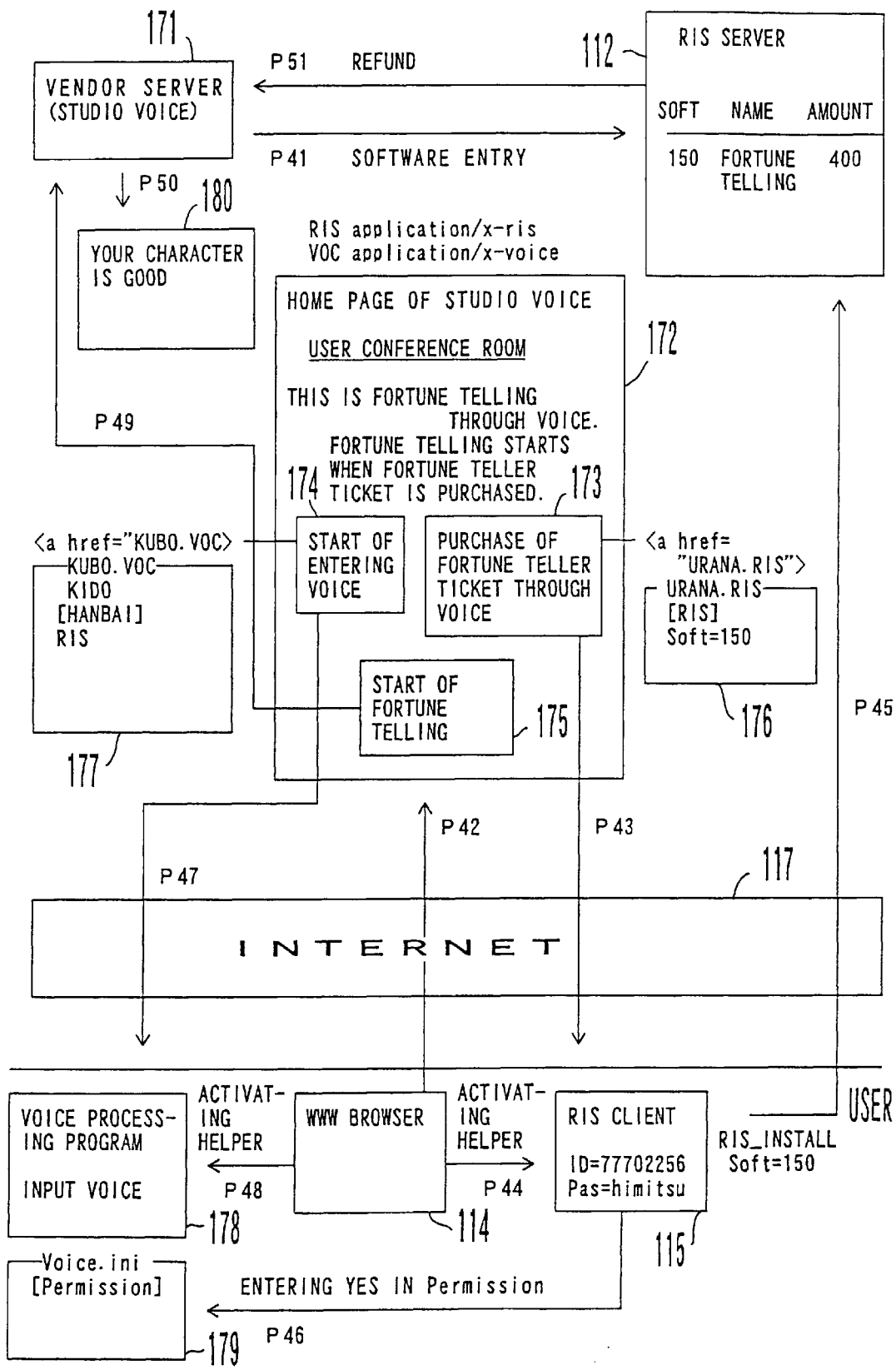
FIG. 23 shows the first transaction service system.

FIG. 23 shows the above described transaction process system. A WWW server 171 of a studio VOICE which is a vendor provides a fortune telling service based on voice. That is, the fortune telling service is provided based on the input voice of a user. First, the WWW server 171 opens a home page 172 for a fortune telling service based on voice through the Internet 117, and enters as software a fortune teller ticket representing a use right of the transaction service in the RIS server 112 (process P41).

Additionally, in the user terminal 113, the RIS client 115 and a voice processing program 178 are entered as helpers of the WWW browser 114. The voice processing program 178 is unique software which receives input voice from a user, performs various filtering processes, and generates a voice file. It is generated and distributed by the studio VOICE.

The user first accesses the home page 172 of the studio VOICE from the WWW browser 114 (process P42), and clicks an icon 173 for selling a fortune teller ticket based on voice pointed to by the pointing device (process P43).

An anchor file 176 (URANA. RIS) for use in activating the RIS client 115 is set as a reference in the icon 173. The WWW browser 114 activates the RIS client 115, and transmits the contents of the file URANA. RIS (process P44). The setting of MIME in the file URANA. RIS is the same as that of the system shown in FIG. 8.

The activated RIS client 115 is connected to the RIS server 112 through the Internet 117 (process P45) to directly distribute a fortune teller ticket.

In this example, the RIS client 115 rewrites the information about an initialization file 179 (Voice. ini) of the voice processing program 178 as a distribution process (process P46). For example, 'YES' is input to the [Permission] section of the file voice. ini to distribute a fortune teller ticket and assign a service use right to a user.

Then, the user clicks an icon 174 for starting inputting voice on the home page 172 pointed to by the pointing device (process P47). An anchor file 177 (KUBO.VOC) for activating the voice processing program 178 is set as a reference in the icon 174. The WWW browser 114 activates the voice processing program 178 (process P48). The setting of MIME in the anchor file 177 is the file type VOC corresponding to the MIME type application/x-voice.

Figure 24:
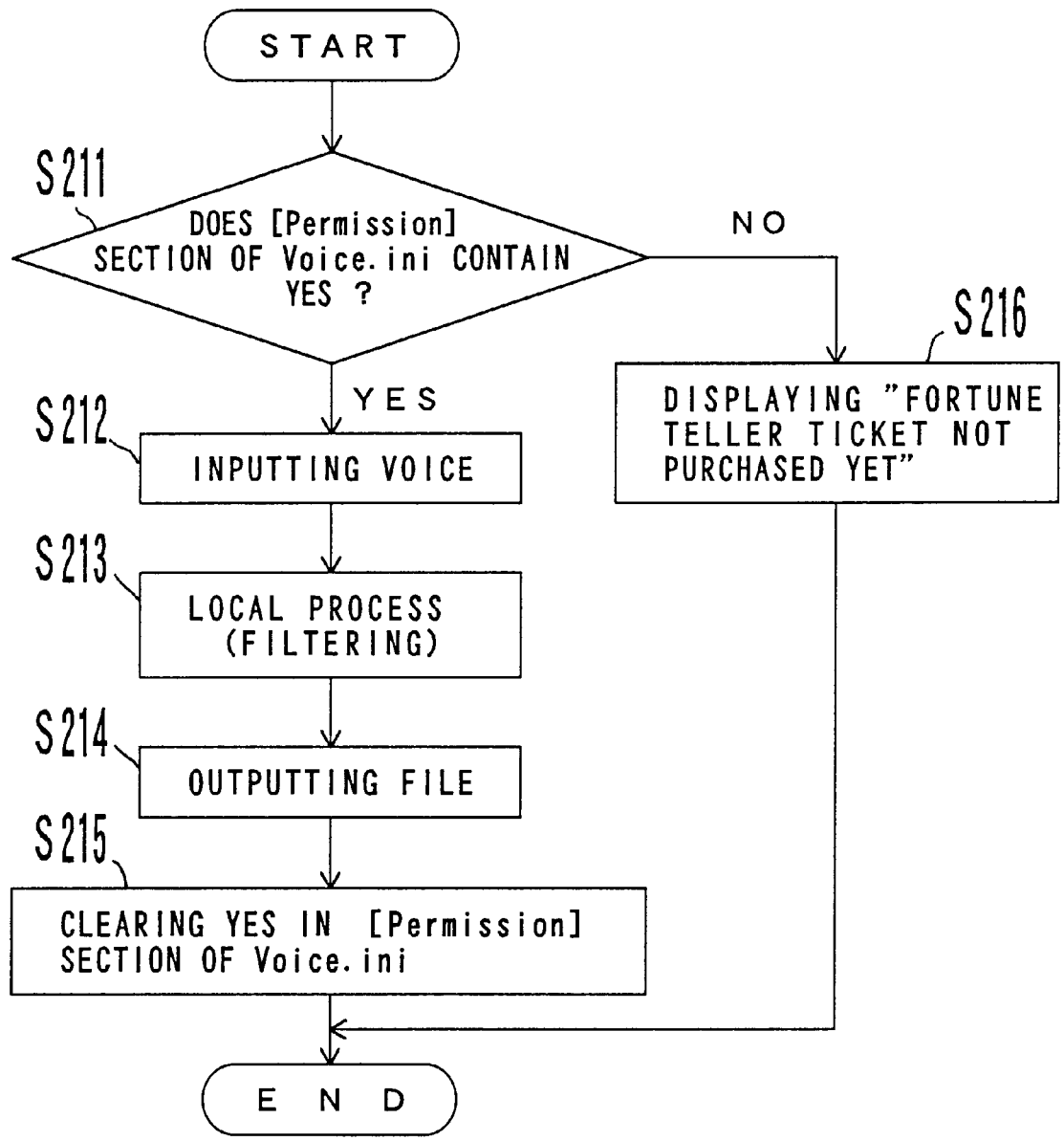
FIG. 24 is a flowchart of the first voice processing program.

The activated voice processing program 178 performs the process as shown in FIG. 24. The voice processing program 178 first checks whether or not YES is input to the [Permission] section of the initialization file 179 (step S211). Unless the section contains YES, the message "fortune teller ticket has not been purchased yet." is displayed (step S216), thereby terminating the process.

If the section contains YES, then the voice inputting operation is started (step S212), and various local processes such as filtering input voice, etc. are performed (step S213) to generate/output a voice file (not shown in FIG. 24) (step S214). Then, YES in the [Permission] section of the file Voice. ini is deleted (step S215), thereby terminating he process.

Figure 25:
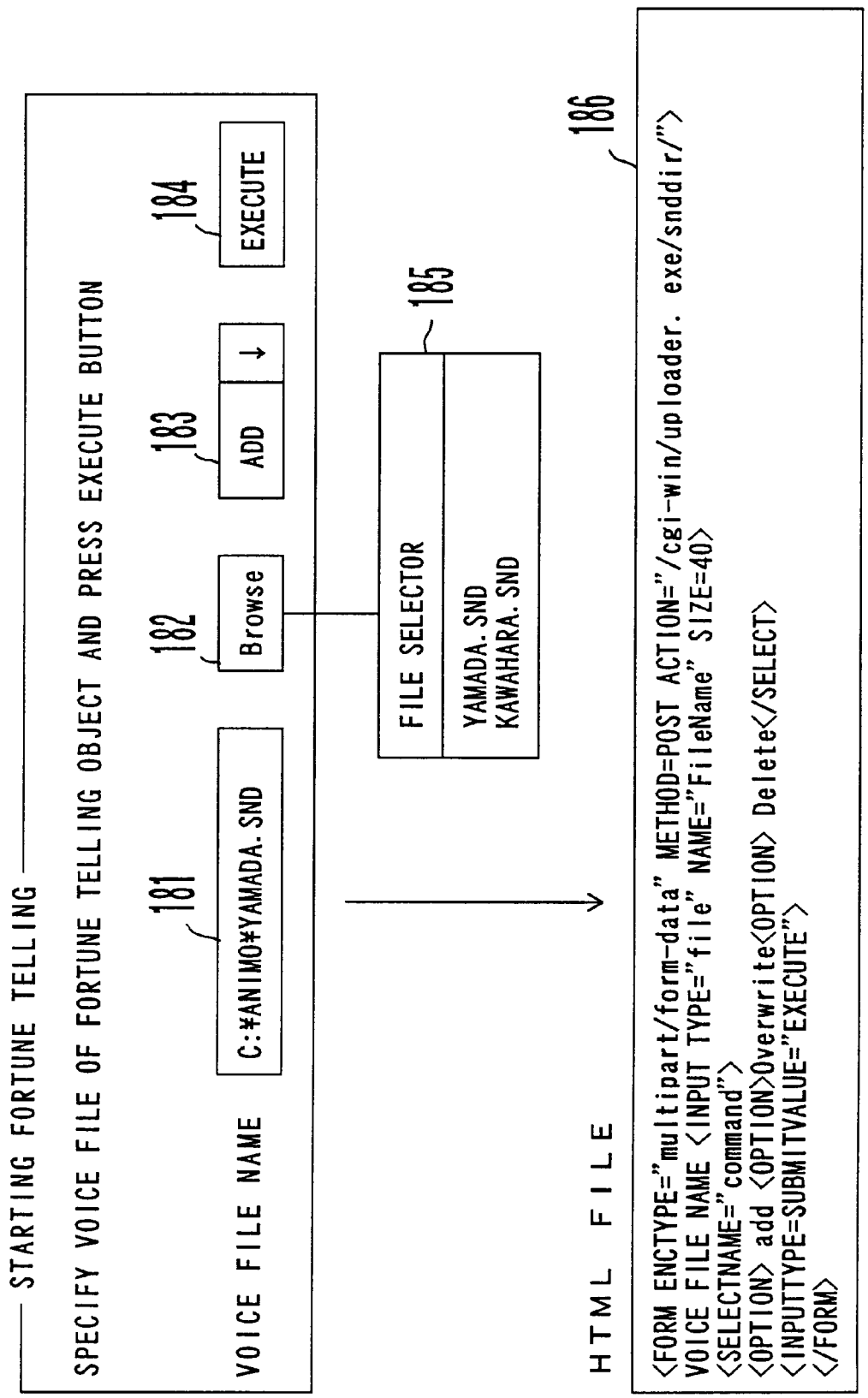
FIG. 25 shows the initial screen of a fortune telling.

When the voice file is thus output, the user clicks an icon 175 for starting a fortune telling pointed to by the pointing device, and executes the fortune telling service (process P49). The start of fortune telling page is designed as shown in FIG. 25. In FIG. 25, a voice file name input column 181, a Browse icon 182, an ADD icon 183, and an execution icon 184 are displayed.

When the user clicks the Browse icon 182 pointed to by the pointing device, a file selector 185 is opened and a selected voice file name is automatically input to the voice file name input column 181. The ADD icon 183 is used when an input voice file is added. An HTML file 186 indicates the method of describing the start of fortune telling page.

When the user input the voice file name and clicks the execution icon 184 pointed to by the pointing device, the specified voice file is uploaded to the WWW server 171 for providing a fortune telling service. The voice file is uploaded by the well-known HTML file uploading function. The WWW server 171 processes the uploaded voice file, and returns a fortune telling result 180 to the WWW browser 114 (process P50).

The fee for the fortune telling through voice is charged when the RIS client 115 is connected to the RIS server 112, and then transmitted from the RIS server 112 to the studio VOICE (process P51).

The transaction use right distributing process and the accounting process can be performed in the manner shown in FIG. 23 by directly activating the RIS client 115 from a local transaction processing program using the above described initialization file 179.

Figure 26:
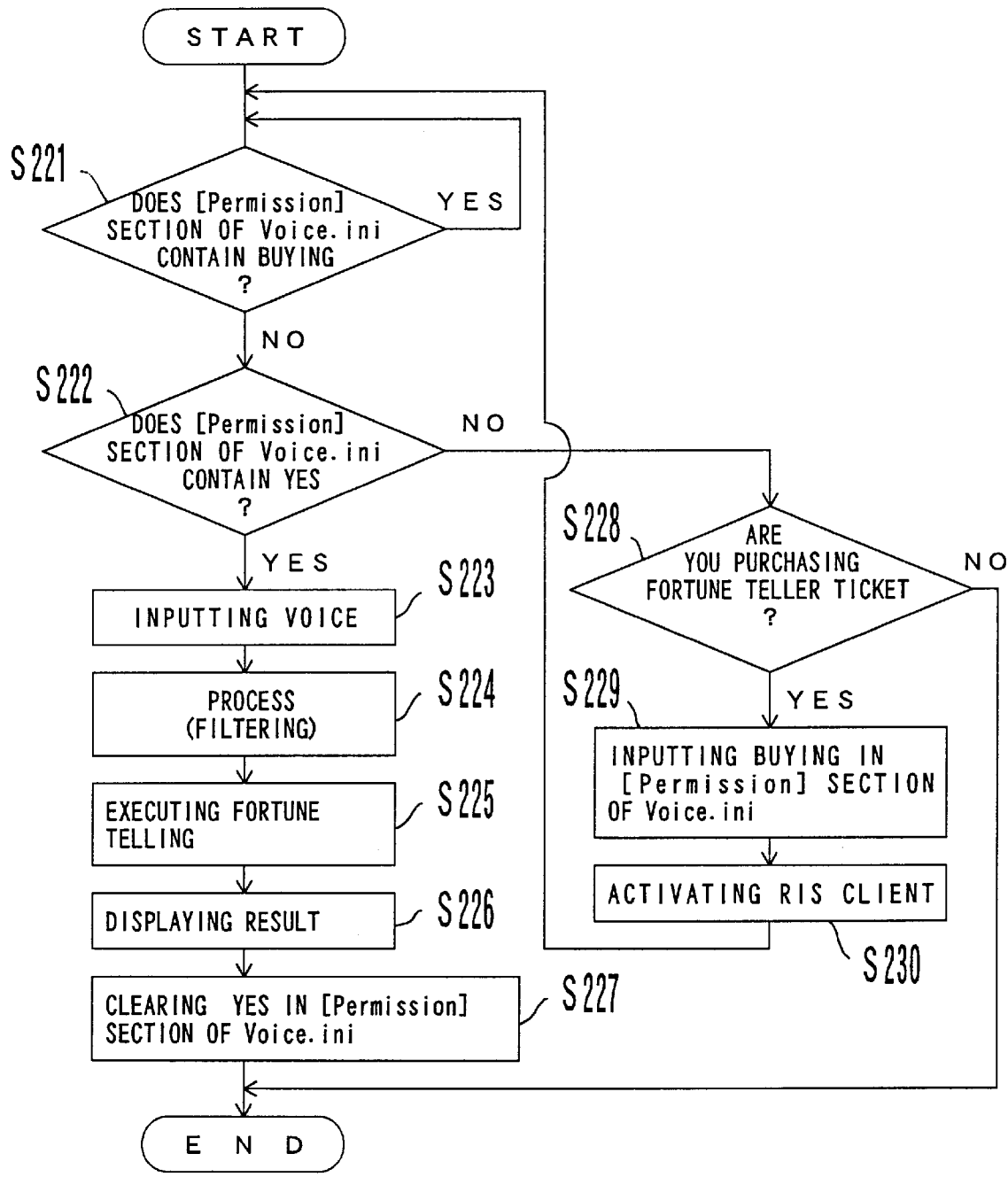
FIG. 26 is a flowchart of a transaction processing program.

In this case, the transaction processing program is designed as shown by the flowchart in FIG. 26. The transaction processing program first checks whether or not the [Permission] section of the file Voice. ini contains the information BUYING indicating that a service use right is being purchased (step S221).

If the section contains BUYING, then the determination is repeated until it disappears. Unless the section contains BUYING, it is checked whether or not the [Permission] section contains the information YES indicating that the right is purchased (step S222).

Unless the section contains YES, it indicates that the service use right (fortune teller ticket) is not being purchased nor have been purchased. Therefore, the transaction processing program inquires the user whether or not the user buys the fortune teller ticket (step S228). Unless the user selects to buy the fortune teller ticket, the process terminates.

If the user selects to purchase the fortune teller ticket, the transaction processing program writes BUYING to the [Permission] section of the file Voice. ini (step S229), activates the RIS client 115 (step S230), and repeats the processes in and after step S228.

The activated RIS client 115 is connected to the RIS server 112 by the method of the system shown in FIG. 23, and purchases the fortune teller ticket. When the fortune teller ticket has been purchased, the RIS client 115 replaces BUYING in the [Permission] section of the file Voice. ini with YES.

At this time, the determination result of step S221 is NO, and the determination result of step S222 is YES. The transaction processing program then starts the voice inputting operation (step S223), and performs the process of filtering input voice (step S224), etc., thereby performing fortune telling (step S225).

After displaying the fortune telling result (step S226) and clearing YES in the [Permission] section of the file Voice. ini (step S227), the process terminates. By clearing YES in the [Permission] section, the transaction process recovers to its initial state.

Thus, the RIS system can be used without the WWW browser 114 by providing the RIS system and the cooperative transaction processing program on the user terminal 113.

In the transaction service system shown in FIG. 23, a use right for a plurality of times for using a service can be purchased. In this case, a use right for a plurality of times is entered in the RIS server 112, and the count of the initialization file can be decremented by 1 for each transaction performed by the voice processing program 178.

Figure 27:
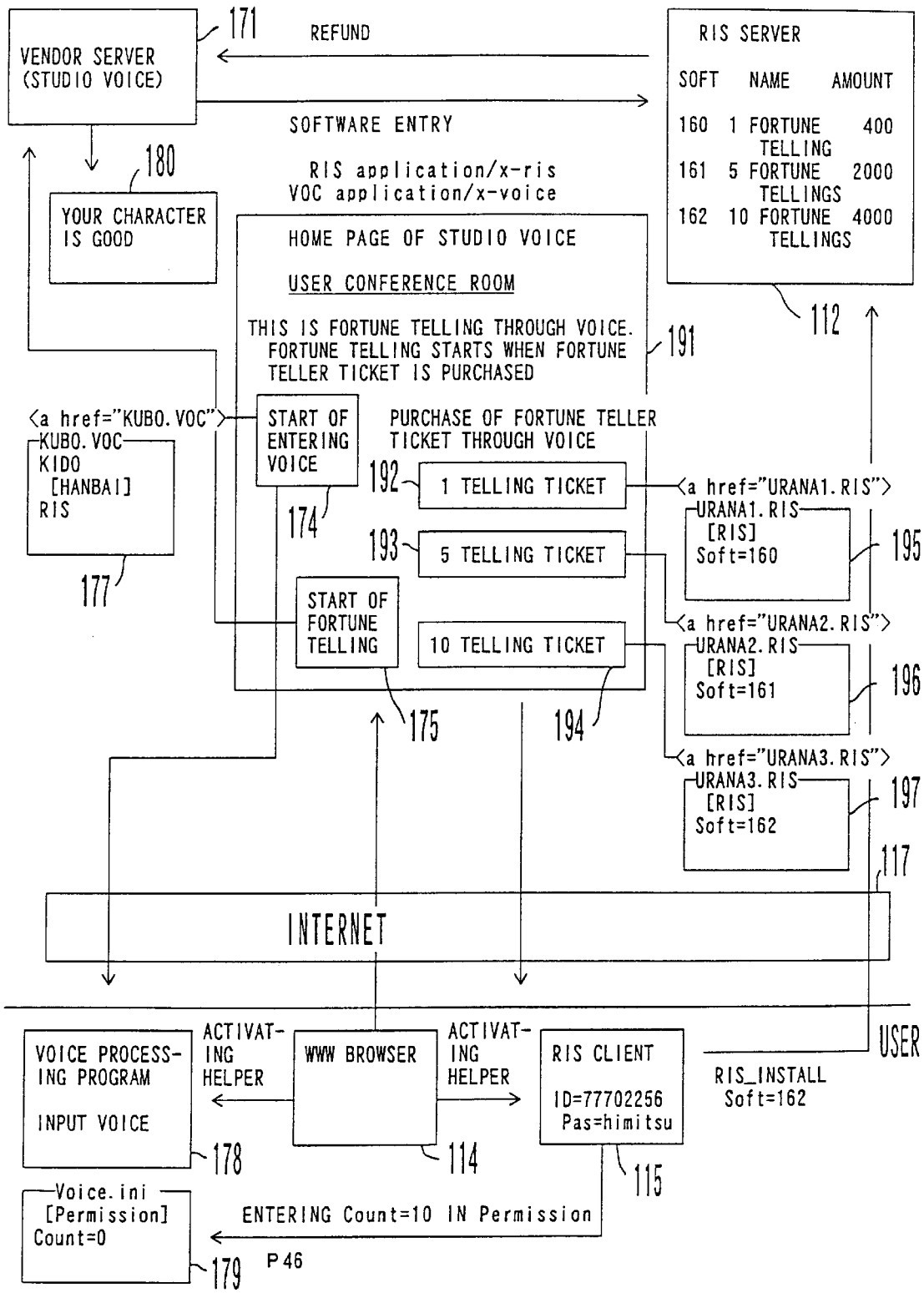
FIG. 27 shows the second transaction processing program.

FIG. 27 shows the above described transaction service system. In the system shown in FIG. 27, three types (for one, five, and ten services) of fortune teller tickets are entered corresponding to the software number 160, 161, and 162 respectively in the RIS server 112. Icons 192, 193, and 194 for selling fortune teller tickets for 1, 5, and 10 services respectively are displayed on a home page 191 of the studio VOICE of the vendor.

Anchor files 195 (URANA. RIS), 196 (URANA2. RIS), and 197 (URANA3. RIS) are set as references respectively in these icons 192, 193, and 194. The software number 160 is described in the file URARIS. RIS. The software number 161 is described in the file URANA2. RIS. The software number 162 is described in the file URANA3. RIS.

When the user selects any fortune teller ticket and clicks a corresponding icon pointed to by the pointing device, the RIS client 115 transmits the software number of the anchor file linked to the icon to the RIS server 112 and inputs the corresponding count (Count) to the [Permission] section of the initialization file 179. For example, when 10 service tickets are purchased, the Count indicates 10. Thus, a plural service use right is assigned to the user terminal 113.

Figure 28:
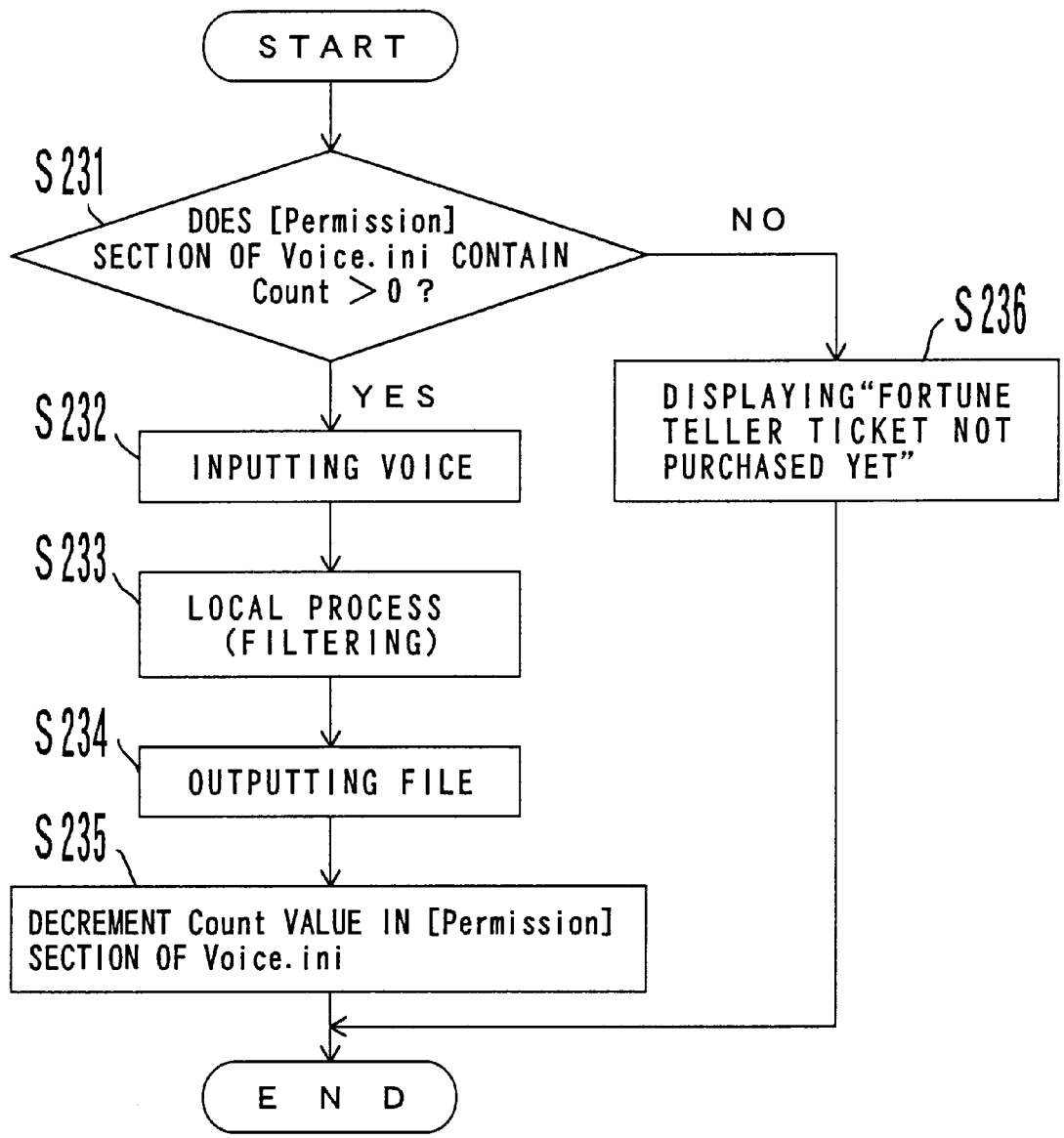
FIG. 28 is a flowchart of the a second voice processing program.

FIG. 28 is a flowchart showing the process of the voice processing program 178 in this system. The voice processing program 178 first checks whether or not the count value of the [Permission] section of the initialization file 179 is 0 (step S231). If the count value is 0, the message "A fortune teller ticket has not been purchased yet." is displayed (step S236), and the process terminates.

If the count value is larger than 0, the voice inputting operation is started (step S232), and various local processes such as filtering input voice, etc. are performed (step S233), thereby generating/outputting a voice file (step S234). Then, the count value of the [Permission] section of the file Voice. ini is decremented by 1 (step S235), thereby terminating the process.

Using the voice processing program 178, the user can receive the number of services according to the purchased service use right. Other settings and operations in the system shown in FIG. 27 are the same as those in the system shown in FIG. 23.

Described next is the system for obtaining data and performing an accounting process by combination use of the local transaction processing program and the RIS system. In this system, the RIS client 115 is activated directly from the transaction processing program to obtain the data for processing a transaction by the method shown in FIG. 23.

Figure 29:
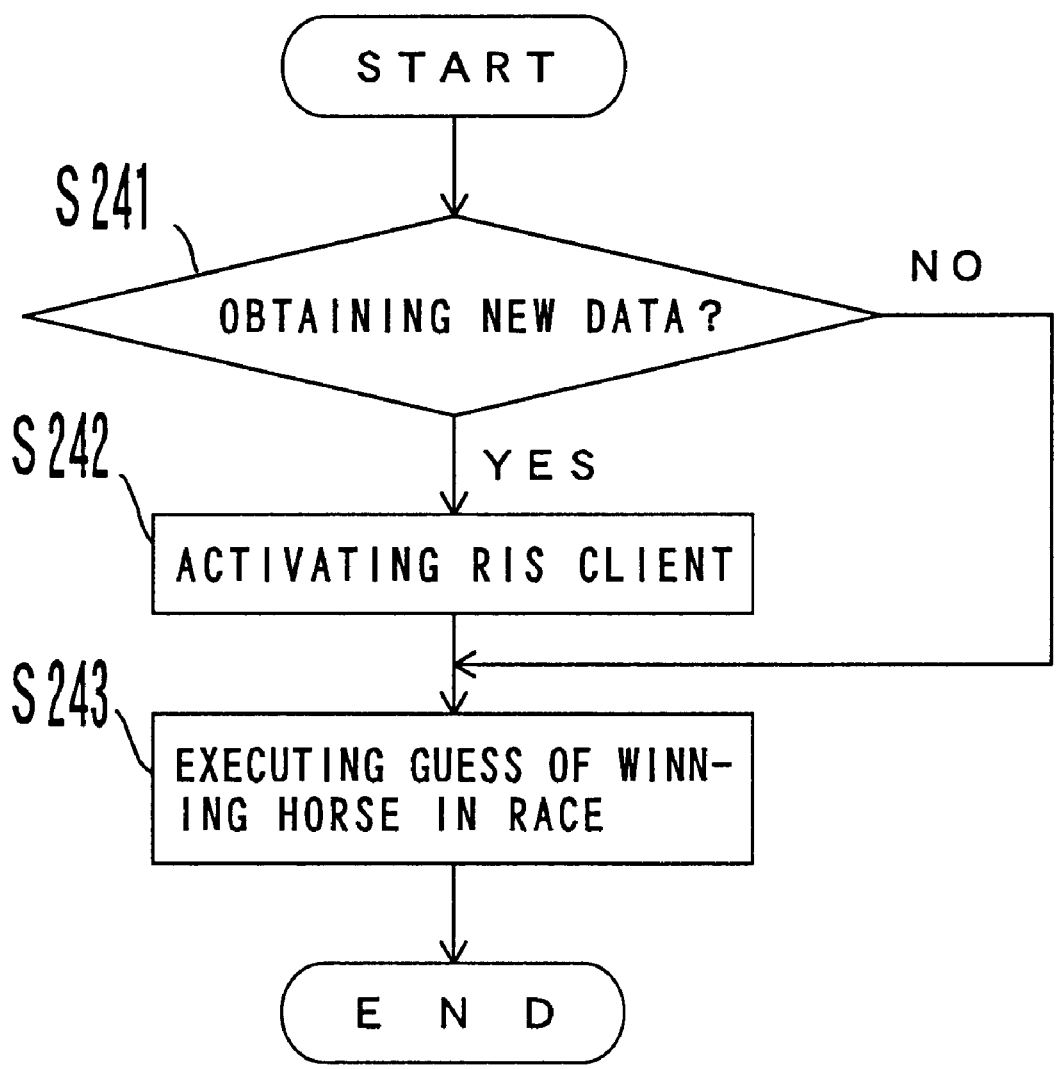
FIG. 29 is a flowchart of the first process of guessing a winning horse in a race.

For example, when the transaction processing program is software for guessing a winning horse in a race, refer to the flowchart in FIG. 29. The software for guessing a winning horse in a race inquires the user whether or not new data should be obtained (step S241).

If the user has determined not to obtain new data, then a guess is made based on the existing horse racing data (step 243), thereby terminating the process. If the user has determined to obtain new data, then the user activates the RIS client 115 (step S242).

The RIS client 115 accesses the RIS server 112 according to the software number. The horse racing data is preliminarily entered in the RIS server 112 as shown in FIG. 30, and the horse racing data is directly distributed by the method shown in FIG. 8. The software for guessing a winning horse in a race works with the distributed horse racing data (step S243), thereby terminating the process.

Figure 31:
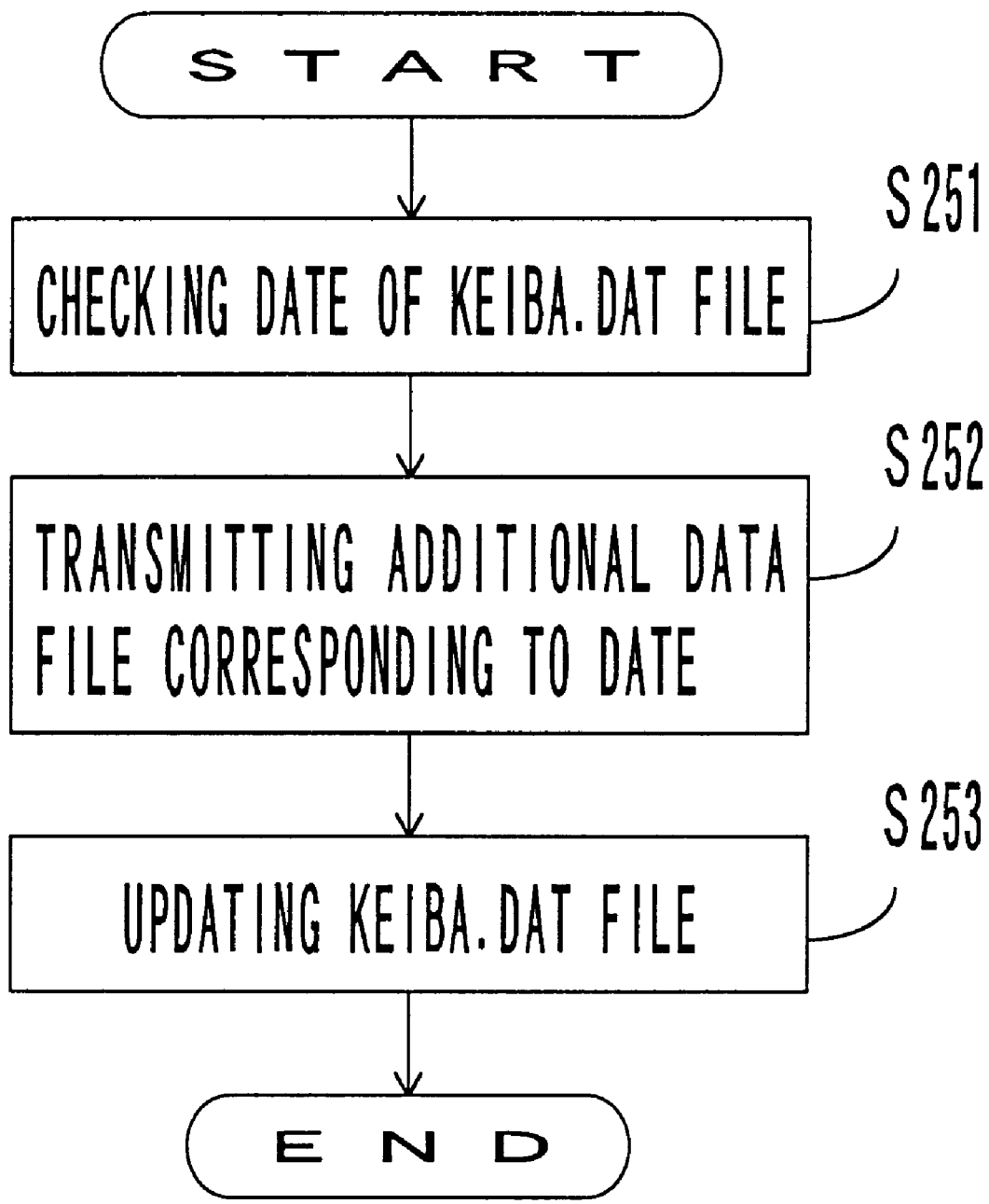
FIG. 31 is a flowchart of a data distribution process.
Figure 32:
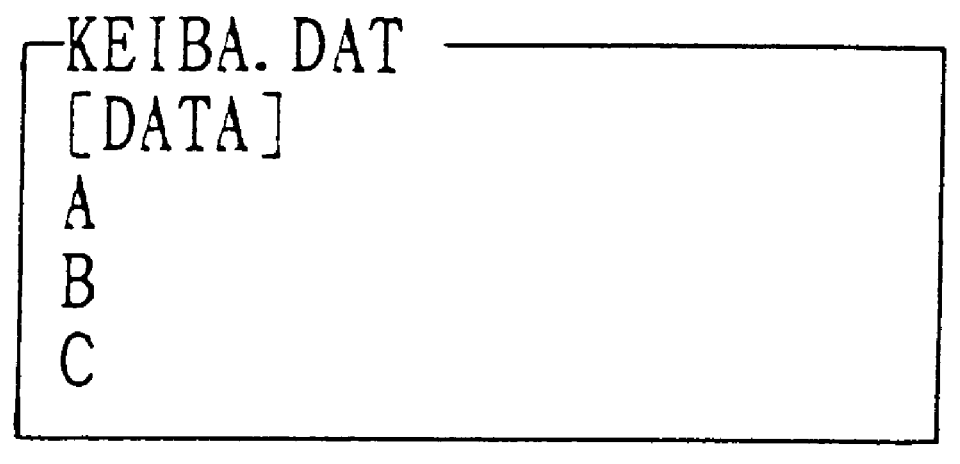

FIG. 31 shows the process of distributing the horse racing data between the RIS client 115 and the RIS server 112. This process is performed by the method shown in FIGS. 1A, 1B, and 1C. First, the RIS client 115 checks the date of the horse racing data file KEIBA. DAT pertaining to the software for guessing a winning horse in a race, and sends the obtained value to the RIS server 112 (step S251). The file KEIBA. DAT stores data A, B, and C for guessing a winning horse in a race, etc. as shown in FIG. 32.

The RIS server 112 refers to the date and file name correspondence table as shown in FIG. 33, retrieves the file name corresponding to the transmission date, and transmits the file corresponding to the retrieved name as an additional data file to the RIS client 115 (step S252). Then, the RIS server 112 adds the contents to the file KEIBA. DAT, updates the file KEIBA. DAT (step S253), thereby terminating the process.

Figure 34:
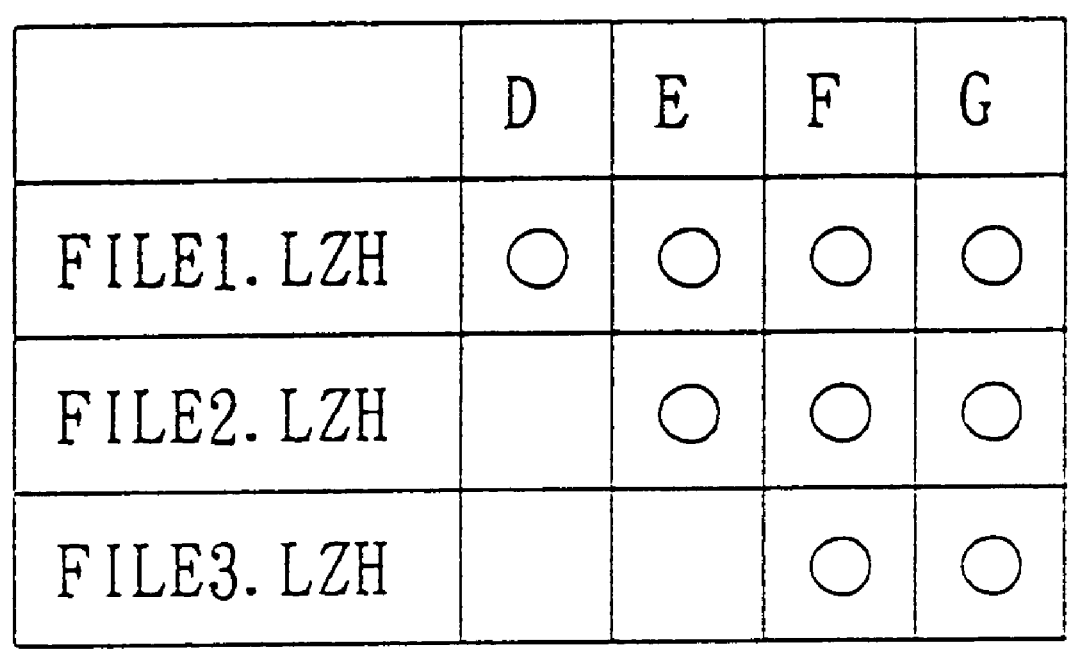

The date and file name correspondence table shown in FIG. 33 is preliminarily entered in the RIS server 112, and is updated as necessary. The file FILE1. LZH, FILE2. LZH, and FILE3. LZH described on the date and file name correspondence table contain a combination of data as shown in FIG. 34.

For example, the file FILE1. LZH contains data D, E, F, and G. The file FILE2. LZH contains data E, F, and G. The file FILE3. LZH contains data F and G. Thus, a different combination of data in each file allows a file KEIBA. DAT with an older date can be provided with more additional data.

According to the transaction processing program shown in FIG. 29, necessary data for a service can be distributed using the RIS system without the WWW browser 114.

In a possible application of such a system, only if the transaction processing program checks the date of the data file at the activation, and a predetermined period has passed since the data was previously updated, is the program connected to the RIS server 112 to obtain data. In this case, if the current date indicates the passage over a predetermined date, then the transaction processing program is connected to the RIS server 112 to update the data file using the latest data.

FIG. 35 is a flowchart of the software for guessing a winning horse in a race. A software for guessing a winning horse in a race computes the difference between the current date and the date of the data file KEIBA. DAT at the activation, and determines whether or not the difference exceeds two months (step S261).

Unless the difference exceeds two months, a guess is made using the existing data (step S263), thereby terminating the process. If the difference exceeds two months, the RIS client 115 is activated and new data is obtained from the RIS server 112 (step S262). Then, a guess is made using the file KEIBA. DAT updated with the distributed data (step S263), and then the process terminates.

Described next is the RIS system for preventing a user terminal by including a server identifier in the machine ID (MID) of the user terminal (client machine) from being misrecognized by a server in the network environment having a plurality of RIS servers.

In this system, a server identifier is combined with the identifier of a client machine to generate an MID identifying the client machine. Then, the server divides the MID received from the client into a server portion and a client portion, and disconnects the server from the client if the server portion does not match the server identifier.

The method of identifying a client by the conventional RIS system is based on that there is a single server. On the other hand, according to the present embodiment of the present invention, a plurality of servers provide services, and a client is prevented from being misrecognized by the servers even if one client is connected to each of the servers.

In this system, a plurality of different servers have unique identifiers, and the MID of a client is generated using the identifier of the server to be accessed. Therefore, the MID depends on the server even for the same client machine.

Figure 36:
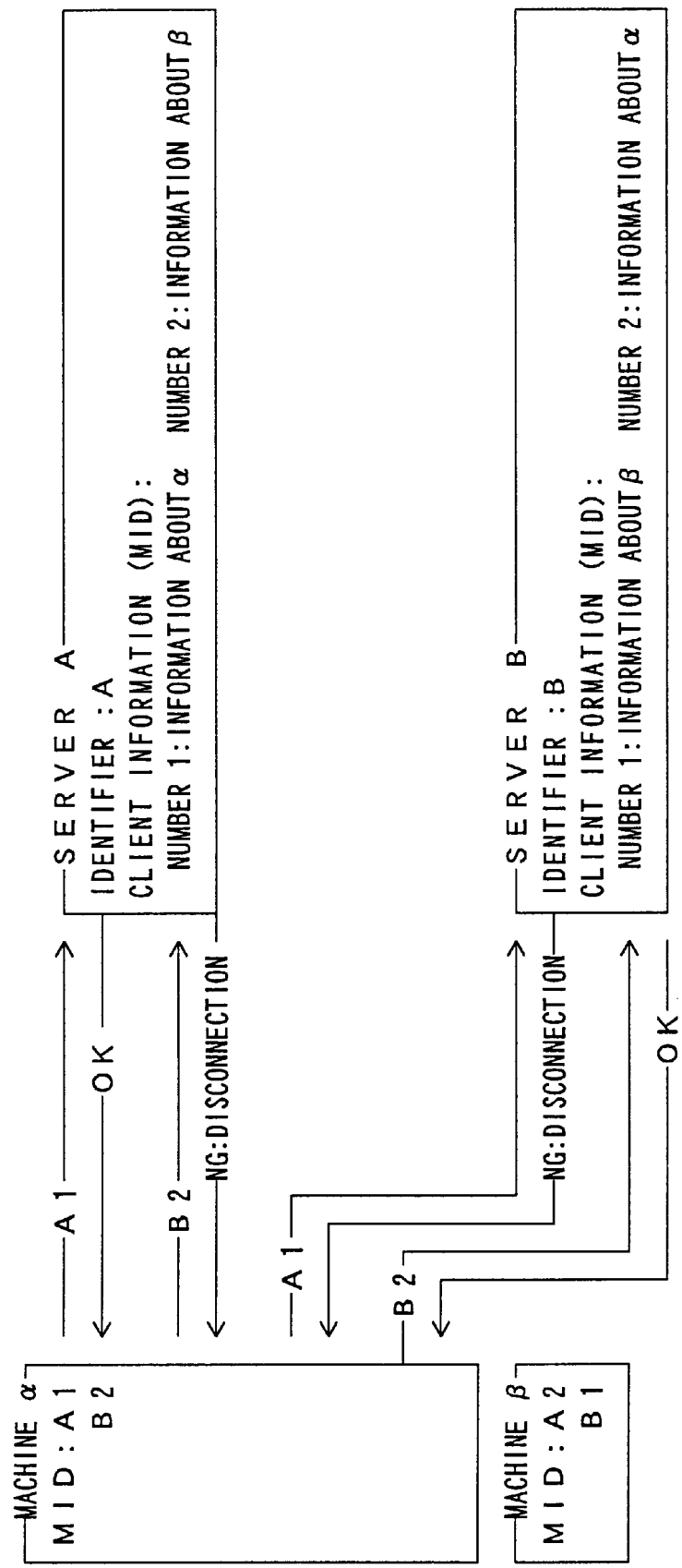
FIG. 36 shows the system including a plurality of servers.

FIG. 36 shows the system including servers A and B, and client machines α and β. In this system, server A holds the information (directory information, memory capacity, etc.) about machine α for the client number 1, and holds the information about machine β for the client number 2. Another server B holds the information (directory information, memory capacity, etc.) about machine α for the client number 2, and holds the information about machine β for the client number 1.

In the conventional method shown in FIG. 2B, the client number itself has been used as an MID. If this method is applied as is to the system shown in FIG. 36 and machine α connects the client number 1 as an MID to server B, then the server recognizes the MID as related to machine β and can accidentally overwrite the information transmitted from machine α on the information about machine β.

However, when a client identifier is combined with a server identifier to generate an MID and the client is connected to the server using a wrong identifier, the server checks the connection and detects the error. Thus, the server can prevent an accidental overwrite on the machine information, and notifies the client of the error.

For example, machine α accesses servers A and B using the MID A1 and B2 respectively whereas machine β accesses servers A and B using the MID A2 and B1 respectively.

If machine α mistakenly accesses server A using B2 as an MID, then server A first divides the MID into a server portion B and a client portion 2 and checks the identifier of the server portion. In this case, the server portion B is different from the identifier of its own identifier. Therefore it determines that the access is mistakenly gained, and disconnects the connection to machine α.

Similarly, when machine α mistakenly accesses server B using A1 as an MID, an error is detected and the connection to machine α is disconnected. In this example, the client is notified of an erroneous access as a disconnection, which can be replaces with an error message, etc.

It is desired that the server identifier of the system refers to a worldwide unique name such as the domain name ris. gmsnet. or. jp. With such unique names, double server identifiers can be prevented, and a client can be correctly identified. Therefore, the machine information about a client can be protected from being mixed up even if a plurality of servers work for a single client.

With a plurality of servers, an initialization file corresponding to each server can be provided at the client side. In this case, the initialization file of a basic server should contain extended information indicating whether or not the initialization files exist for other servers.

For example, the file RIS. INI shown in FIG. 37 is used as the basic initialization file, and the file RIS2. INI shown in FIG. 38 is used as the initialization file of another server. Thus, if a different initialization file is used for each server, completely different user ID/passwords and MIDs can be processed as indicated by an arrow.

An [EXTENSION] section is provided in the file RIS. INI shown in FIG. 37 to indicate whether or not another initialization file can be set active. In this example, the file RIS. INI and RIS2. INI is set active (ON). When the system is operated, another file RIS2. INI is automatically referred to.

In the method shown in FIG. 36, the information about a client machine can be correctly handled at the server side. Next, it is to be confirmed whether or not the client has been connected to the correct server. When a plurality of servers exist, a client may be mistakenly connected to a malicious server.

Described next is the RIS system for identifying a correct server. In this system, a log-in session is established through the function of a digital signature using a Rivest-Shamir-Adleman (RSA) encryption. The RSA encryption is an asymmetric encryption system in which different key information is used between encryption and decryption.

In this log-in session, the server transmits predetermined information to the client using a secret key, and the client deciphers the information using a public key to authenticate the server. Thus, the client can determine whether or not the log-in has been made to a correct server.

Figure 39:
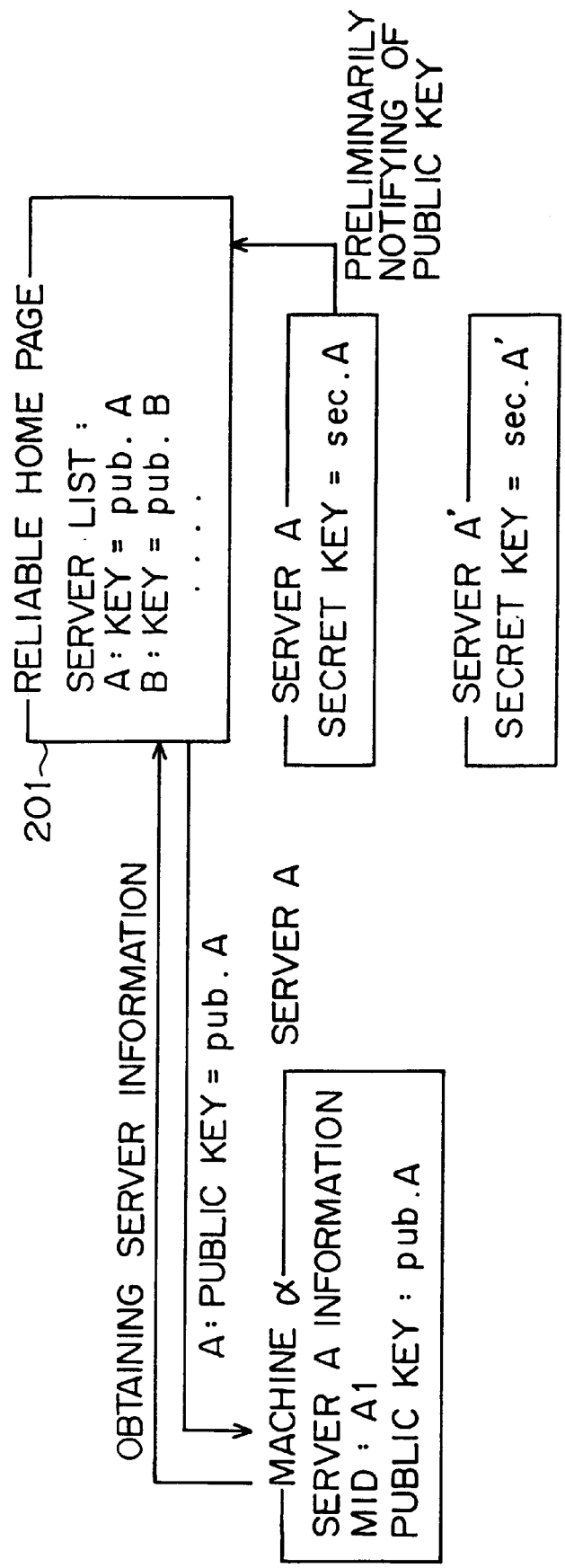
FIG. 39 shows a server identification system.

FIG. 39 shows the server identification system. In FIG. 39, each server holds the secret key of the RSA, and a corresponding public key is entered in a home page 201. It is the user that determines whether or not the home page 201 displaying a server list is reliable. Otherwise, the URL of the reliable home page 201 can be preliminarily embedded in the client.

The server receives optional information represented as a plain text from the client when they are connected. When the server returns the information to the client after enciphering the information using a secret key, the client can correctly restore the enciphered information to the plain text using a public key. Correctly restoring the information indicates that the server holds a secret key which is the pair to the public key, and that the client is connected to the correct server.

In FIG. 39, machine α obtains the server information such as its own identifier A, a public key pub.A, etc. from the home page 201 before being connected to server A, and generates MID A1. At this time, the information about other servers are obtained if necessary.

Figure 40:
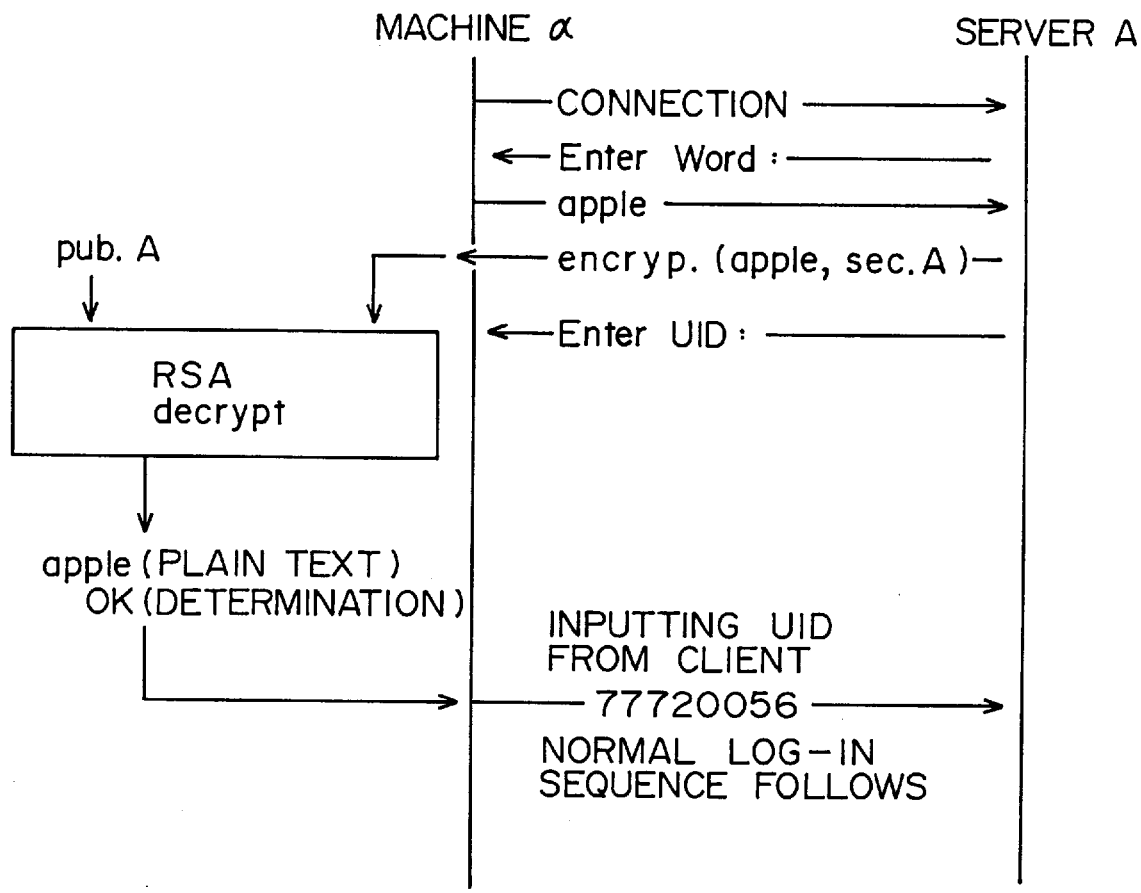
FIG. 40 shows the second log-in sequence.

In this state, the log-in sequence in which machine α identifies server A is shown in FIG. 40. When machine α is connected to server A, server A inquires machine a of the information (Word) for identifying a server. When machine α sends the information 'apple' in plain text, server A enciphers the text using a secret key sec.A and transmits it as encryp. (apple, sec.A).

Machine α deciphers encryp. (apple, sec.A) using the public key pub.A and obtains the information 'apple'. Since the information matches the previously transmitted information, it is determined that the machine is connected to a correct server A. Then, the user inputs the UID, and machine α enters a normal log-in sequence.

Figure 41:
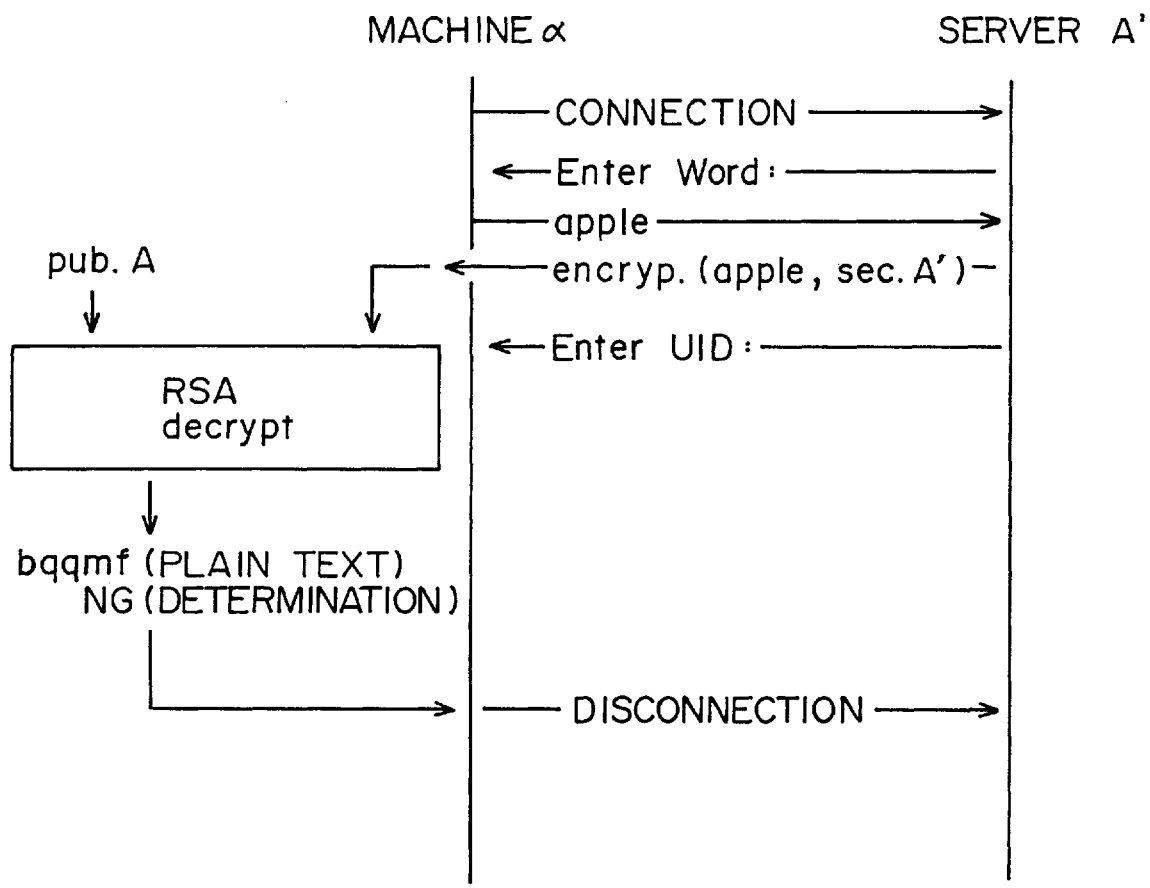
FIG. 41 shows the third log-in sequence.

On the other hand, the log-in sequence in which server A' pretends to be server A is shown in FIG. 41. Machine α is connected to server A' and transmits the information 'apple' to server A' as shown in FIG. 40. Then, server A enciphers the received information using an appropriately set secret key sec.A', and sends the information as encryp. (apple, sec.A').

However, when machine α deciphers the encryp. (apple, sec.A') using the public key pub.A, the plain text bqqmf is retrieved. Since the information is different from the previously transmitted information, it is determined that machine α is not connected to a correct server A, thereby disconnecting the wrong connection. Thus, the wrong server A' can be detected.

Unlike the sequence shown in FIGS. 40 and 41, the client may transmit the information enciphered using the server's public key to the server, and the server may decipher the information using a secret key and send back the deciphered information as plain text to the client, resulting in the similar effect. In this case, the client recognizes the server as a correct server if the plain text sent back from the server is correct.

In the server identification system shown in FIG. 39, the encryption may be deciphered if operations are continued with the fixed public key and secret key for the authentication of a server. Therefore, these keys should be periodically updated to guarantee the security of the encryption. Since it is inconvenient to renew the server information at the client side each time a public key is altered, the process is designed to be automatically performed to obtain the server information each time the client logs into the server.

By the method shown in FIG. 8, the RIS client 115 is activated from the home page. In this case, the anchor file linked to the Ris icon is extended as shown in FIG. 42, a server identifier is described in its [SERVER] section, and a public key is described in its [OKEY] section.

Figure 43:
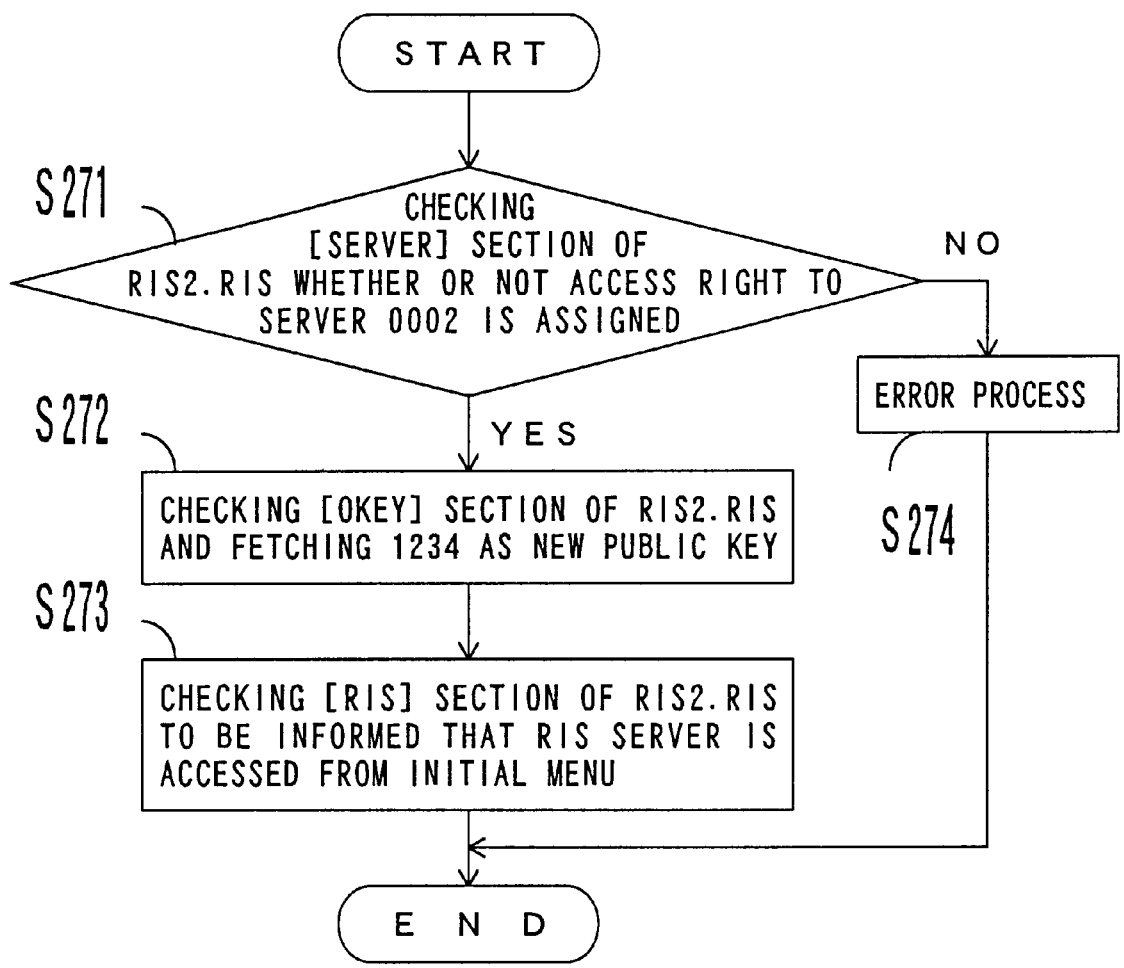
FIG. 43 is a flowchart showing the process of a client.

The RIS client 115 activated from the WWW browser 114 performs the process shown in FIG. 43 before being connected to the RIS server. The RIS client 115 first checks the [SERVER] section of the anchor file RIS2. RIS shown in FIG. 42 for the access right to the RIS server 0002 (step S271).

If the server identifier 0002 is described in this section, it is determined that the access right is assigned, and a new public key 1234 is fetched from the [OKEY] section (step S272). It is indicated that Start=menu, not a software number, is described in the [RIS] section. Thus, it is recognized that no software is requested, but the RIS server 0002 is to be accessed from the initial menu (step S273), and then the process terminates.

If it is determined that the right to access the server 0002 is not allowed in step S271, an error message is displayed (step S274), and the process terminates. Thus, when the file RIS2. RIS is completely read, the RIS client 115 starts the log-in session as shown in FIG. 40.

In the above described embodiments of the present invention, the encryption algorithm is not limited to the DES or RSA, but any other algorithm can be optionally used. In the online shopping system shown in FIG. 14, arbitrary goods or commodities other than a set of towel and handkerchiefs can be purchased, and any communications services other than fortune telling services can be provided in the communications service system shown in FIGS. 16 and 21. In the transaction service system in FIGS. 23 and 27, any transaction services other than the fortune telling service through voice can be provided.

According to the present invention, various member-exclusive services such as a software distribution service, online shopping, communications service, transaction service, etc. can be provided in the remote installation system through the Internet. The connection destination through the Internet is authenticated, and passwords and contents are enciphered, thereby guaranteeing the security of services.

What is claimed is:

1. A software distribution system comprising:
   an entry device signing up a client through a secured communications line;
   a key database preliminarily storing a correspondence table for key information and a plurality of machine identifiers of clients;
   a key information assignment device assigning key information uniquely corresponding to a machine identifier of the client in a sign-up process; and
   an encryption device enciphering at least one of a password and software contents on Internet using the key information to distribute software contents through the Internet.

2. A software distribution system comprising:
   a remote installation device automatically distributing, from a server to a client, software specified in a file on a home page displayed on a screen; and
   a browser device preliminarily entering said remote installation device as an application device to display information in a different format, and automatically activating said remote installation device and passing contents of the file to said remote installation device when the file is accessed on the home page.

3. The software distribution system according to claim 2, wherein
   said remote installation device is entered as a helper application of an Internet browser, and is automatically activated when an area corresponding to the file on the home page is accessed.

4. An online shopping system comprising:
   an accounting device automatically connecting a client to a server and performing an accounting process on a product or service specified in a file on a home page; and
   a browser device automatically activating said accounting device and passing contents of the file to said accounting device when the file is accessed.

5. The online shopping system according to claim 4, wherein
   said accounting device includes a remote installation system for automatically distributing information from the server to the client.

6. The online shopping system according to claim 4, wherein
   said accounting device is entered as a helper application of an Internet browser, and is automatically activated when an area corresponding to the file on the home page is accessed.

7. The online shopping system according to claim 4, wherein
   said accounting device transmits a purchase notification to a vendor of the product or service.

8. A communications service system comprising:
   a processing device performing and accounting process on a communications service specified in a file on a home page displayed on a screen, and automatically transmitting, from a server to a client, necessary information in utilizing the communications service; and
   a browser device preliminarily entering said processing device as an application device to display information in a different format, and automatically activating said processing device and passing contents of the file to said processing device when the file is accessed on the home page.

9. The online shopping system according to claim 8, wherein
   said processing device includes a remote installation system for automatically distributing information from the server to the client.

10. The online shopping system according to claim 8, wherein
    said processing device is entered as a helper application of an Internet browser, and is automatically activated when an area corresponding to the file on the home page is accessed.

11. The online shopping system according to claim 8, wherein
    said processing device notifies a user of password information as the necessary information; and
    said user inputs the password information to said browser device to use the communications service.

12. The online shopping system according to claim 8, wherein
    said processing device notifies a user of uniform resource locator information about the communications service as the necessary information; and
    said user inputs the uniform resource locator information to said browser device to utilize the communications service.

13. A communications service system comprising:
    a processing device performing an accounting process on a communications service specified in a file on a home page displayed on a screen, and automatically activating a browser for referring to a uniform resource locator of the communications service; and
    a browser device preliminarily entering said processing device as an application device to display information in a different format, and automatically activating said processing device and passing contents of the file to said processing device when the file is accessed on the home page.

14. An online shopping method, comprising:
    preliminarily entering a remote installation system as a helper of a browser to display information in a different format;
    providing a file for activating the helper on a home page displayed on a screen; and
    automatically passing contents of the file to a client and connecting the client to a server when the file is accessed on the home page, and performing an accounting process on a specified product or service.

15. A communications service method, comprising:
    preliminarily entering a remote installation system as a helper of a browser to display information in a different format;
    providing a file for activating the helper on a home page displayed on a screen; and passing contents of the file to a client and performing an accounting process on a specified communications service when the file is accessed on the home page, and automatically transmitting, from a server to the client, necessary information used to receive the communications service.

16. A communications service method, comprising:

preliminarily entering a remote installation system as a helper of a browser to display information in a different format;

providing a file for activating the helper on a home page displayed on a screen; and passing contents of the file to a client and performing an accounting process on a specified communications service when the file is accessed on the home page, and automatically activating a browser for referring to a uniform resource locator of the communications service.

17. A computer-readable storage medium used to direct a computer to perform:

preliminarily storing a correspondence table for key information and a plurality of machine identifiers of clients in a key database;

signing up a client through a secured communications line;

assigning key information in the key database uniquely corresponding to a machine identifier of the client to the client; and enciphering at least one of a password and software contents on Internet using the key information to distribute the software contents through the Internet.

18. A computer-readable storage medium used to direct a computer to perform:

activating a remote installation system preliminarily entered as a helper of a browser to display information in a different format and passing contents of a file to said remote installation system when the file is accessed on a home page displayed on a screen; and automatically distributing specified software to a client.

19. A computer-readable storage medium used to direct a computer to perform:

activating a remote installation system preliminarily entered as a helper of a browser to display information in a different format and passing contents of a file to said remote installation system when the file is accessed on a home page displayed on a screen; and automatically performing an accounting process on a specified product or service.

20. A computer-readable storage medium used to direct a computer to perform:

activating a remote installation system preliminary entered as a helper of a browser to display information in a different format and passing contents of a file to said remote installation system when the file is accessed on a home page displayed on a screen;

performing an accounting process on a specified communications service; and automatically transmitting to a client necessary information used to receive the communications service.

21. A computer-readable storage medium used to direct a computer to perform:

activating a remote installation system preliminarily entered as a helper of a browser to display information in a different format and passing contents of a file to said remote installation system when the file is accessed on a home page displayed on a screen;

performing an accounting process on a specified communications service; and automatically activating the browser for referring to a uniform resource locator of the communications service.

22. A method for distributing a software program from a vendor to a user comprising:

requesting the software program by the user to the vendor;

sending machine identifier data from the user to the vendor;

generating a unique key based on the machine identifier data by the vendor;

encrypting the software program based on the unique key by the vendor;

encrypting the unique key by the vendor;

sending the encrypted unique key from the vendor to the user;

sending the encrypted software program from the vendor to the user;

decrypting the unique key by the user; and decrypting the encrypted software program with the unique key by the user.

23. A method for distributing a software program from a vendor to a user comprising:

generating a unique key based on machine identifier data of the user; and encrypting the software program using the unique key.

24. A software distribution system for distributing software over a communications network comprising:

entry means for signing up a client through the communications network;

key information assignment means for assigning key information uniquely corresponding to a machine identifier of the client in a sign-up process; and encryption means for encrypting software contents using the key information.

25. A communications service system comprising:

processing means for performing an accounting process on a communications service specified in a file on a home page displayed on a screen, and automatically activating a browser for referring to a uniform resource locator of the communications service; and browser means for preliminary entering said processing device as an application device to display information in a different format, and automatically activating said processing means and passing contents of the file to said processing device when the file is accessed on the home page.

* * * * *